US012407871B2

(12) United States Patent
Deshpande et al.

(10) Patent No.: US 12,407,871 B2
(45) Date of Patent: Sep. 2, 2025

(54) SYSTEMS AND METHODS FOR SIGNALING NEURAL NETWORK POST-FILTER FRAME RATE UPSAMPLING INFORMATION IN VIDEO CODING

(71) Applicant: SHARP KABUSHIKI KAISHA, Sakai (JP)

(72) Inventors: Sachin G. Deshpande, Camas, WA (US); Ahmed Cheikh Sidiya, Morgantown, WV (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/671,980

(22) Filed: May 22, 2024

(65) Prior Publication Data

US 2024/0340457 A1 Oct. 10, 2024

Related U.S. Application Data

(63) Continuation of application No. 17/964,856, filed on Oct. 12, 2022, now Pat. No. 12,034,976.

(51) Int. Cl.

| | |
|---|---|
| ***H04N 19/70*** | (2014.01) |
| ***H04N 19/42*** | (2014.01) |
| ***H04N 19/80*** | (2014.01) |
| ***H04N 19/85*** | (2014.01) |

(52) U.S. Cl.

CPC ............. *H04N 19/70* (2014.11); *H04N 19/42* (2014.11); *H04N 19/80* (2014.11); *H04N 19/85* (2014.11)

(58) Field of Classification Search

None

See application file for complete search history.

(56) References Cited

U.S. PATENT DOCUMENTS

| | | | |
|---|---|---|---|
| 2022/0217403 | A1 | 7/2022 | Choi et al. |
| 2022/0256227 | A1 | 8/2022 | Rezazadegan Tavakoli et al. |
| 2023/0007246 | A1 | 1/2023 | Li et al. |

OTHER PUBLICATIONS

Sean McCarthy et al., "Additional SEI messages for VSEI (Draft 2)", Document: JVET-AA2006-v2, Joint Video Experts Team (JVET) of ITU-T SG 16 WP 3 and ISO/IEC JTC 1/SC 29, 27th Meeting, by teleconference, Jul. 13-22, 2022.

Maria Santamaria et al., "AHGII: Content-adaptive neural network post-filter", Document: JVET-Z0082-v1, Joint Video Experts Team (JVET) of ITU-T SG 16 WP 3 and ISO/IEC JTC 1/SC 29, 26th Meeting, by teleconference, Apr. 20-29, 2022.

ISO/IEC JTC 1/SC 29/WG 04, N0179. "Test Model of Incremental Compression of Neural Networks for Multimedia Content Description and Analysis INCTM)," Feb. 4, 2022.

(Continued)

*Primary Examiner* — Rebecca A Volentine

(74) *Attorney, Agent, or Firm* — ScienBiziP, P.C.

(57) ABSTRACT

A device may be configured to perform frame rate upsampling based on information included in a neural network post-filter characteristics message. In one example, the neural network post-filter characteristics message includes a syntax element specifying a number of input pictures to be used as input for a neural network post-filter picture interpolation process and a syntax element having a value specifying a manner in which input pictures are concatenated before being input into the neural network post-filter picture interpolation process.

3 Claims, 7 Drawing Sheets

(56) References Cited

OTHER PUBLICATIONS

Miska M. Hannuksela et al., "AHG9: NNR post-filter SEI message", Document: JVET-Z0052-v1, Joint Video Experts Team (JVET) of ITU-T SG 16 WP 3 and ISO/IEC JTC I/SC 29, 26th Meeting, by teleconference, Apr. 20-29, 2022.
Jill Boyce et al., "Additional SEI messages for VSEI (Draft 6)", Document: JVET-Y2006-vl, Joint Video Experts Team (JVET) of ITU-T SG 16 WP 3 and ISO/IEC JTC 1/SC 29, 25th Meeting, by teleconference, Jan. 12-21, 2022.
ITU-T, "Versatile supplemental enhancement information messages for coded video bitstreams", H.274 (Aug. 2020).
ITU-T, "Coding-independent code point for video signal type identification", H.273 (Jul. 2021).
Jianle Chen et al., "Algorithm Description of Joint Exploration Test Model 7 (JEM 7)", Document: JVET-GIO0I-v1, Joint Video Exploration Team (JVET) ofITU-T SG 16 WP 3 and 1S0/IEC JTC 1/SC 29/WG 11, 7th Meeting: Torino, IT, Jul. 13-21, 2017.
Benjamin Bross, "Versatile Video Coding (Draft 1)", Document: JVET-11001-v2, Joint Video Experts Team (JVET) of ITU-T SG 16 WP 3 and ISO/IEC JTC 1/SC 29/WG 11, 10th Meeting: San Diego, US, Apr. 10-20, 2018.
Benjamin Bross et al., "Verastile Video Coding Editorial Refinements on Draft 10)", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020.
ITU-T, "High efficiency video coding" H.265 (Dec. 2016).
ITU-T, "Advanced video coding for generic audiovisual services" H.264 (Oct. 2016).
1SO/IEC 15938-17:2020(E), ISO JTC 1/SC 29 /WG 11, Secretariat: JISC,"Information technology—Multimedia content description interface—Part 17: Compression of neural networks for multimedia content description and analysis".
Notice of Allowance and Fees Due issued on Feb. 29, 2024 for U.S. Appl. No. 17/964,856.

SYSTEMS AND METHODS FOR SIGNALING NEURAL NETWORK POST-FILTER FRAME RATE UPSAMPLING INFORMATION IN VIDEO CODING

CROSS-REFERENCE TO RELATED APPLICATIONS

This application is a continuation of U.S. patent application Ser. No. 17/964,856, filed on Oct. 12, 2022, the entire contents of the above-identified application are hereby incorporated by reference.

TECHNICAL FIELD

This disclosure relates to video coding and more particularly to techniques for signaling neural network post-filter parameter information for coded video.

BACKGROUND

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) have standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, CA, document JVET-J1001-v2, which is incorporated by reference herein, and referred to as JVET-J1001. This development of a video coding standard by the VCEG and MPEG is referred to as the Versatile Video Coding (VVC) project. "Versatile Video Coding (Draft 10)," 20th Meeting of ISO/IEC JTC1/SC29/WG11 7-16 Oct. 2020, Teleconference, document JVET-T2001-v2, which is incorporated by reference herein, and referred to as JVET-T2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY

In general, this disclosure describes various techniques for coding video data. In particular, this disclosure describes techniques for signaling neural network post-filter parameter information for coded video data. It should be noted that although techniques of this disclosure are described with respect to ITU-T H.264, ITU-T H.265, JEM, and JVET-T2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-T2001. Thus, reference to ITU-T H.264, ITU-T H.265, JEM, and/or JVET-T2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of coding video data comprises signaling a neural network post-filter characteristics message, signaling a first syntax element in the neural network post-filter characteristics specifying a number of input pictures to be used as input for a neural network post-filter picture interpolation process, and signaling a second syntax element in the neural network post-filter characteristics message having a value specifying a manner in which input pictures are concatenated before being input into the neural network post-filter picture interpolation process.

In one example, a device comprises one or more processors configured to signal a neural network post-filter characteristics message, signal a first syntax element in the neural network post-filter characteristics specifying a number of input pictures to be used as input for a neural network post-filter picture interpolation process, and signal a second syntax element in the neural network post-filter characteristics message having a value specifying a manner in which input pictures are concatenated before being input into the neural network post-filter picture interpolation process.

In one example, a non-transitory computer-readable storage medium comprises instructions stored thereon that, when executed, cause one or more processors of a device to signal a neural network post-filter characteristics message, signal a first syntax element in the neural network post-filter characteristics specifying a number of input pictures to be used as input for a neural network post-filter picture interpolation process, and signal a second syntax element in the neural network post-filter characteristics message having a value specifying a manner in which input pictures are concatenated before being input into the neural network post-filter picture interpolation process.

In one example, an apparatus comprises means for signaling a first syntax element in the neural network post-filter characteristics specifying a number of input pictures to be used as input for a neural network post-filter picture interpolation process, and means for signaling a second syntax element in the neural network post-filter characteristics message having a value specifying a manner in which input pictures are concatenated before being input into the neural network post-filter picture interpolation process.

In one example, a method of decoding video data comprises receiving a neural network post-filter characteristics message, parsing a first syntax element from the neural network post-filter characteristics specifying a number of input pictures to be used as input for a neural network post-filter picture interpolation process, parsing a second syntax element from the neural network post-filter characteristics message having a value specifying a manner in which input pictures are concatenated before being input into the neural network post-filter picture interpolation process, and concatenating input pictures based on the value of the second syntax element.

In one example, a device comprises one or more processors configured to receive a neural network post-filter characteristics message, parse a first syntax element from the neural network post-filter characteristics specifying a number of input pictures to be used as input for a neural network post-filter picture interpolation process, parse a second syntax element from the neural network post-filter characteristics message having a value specifying a manner in which input pictures are concatenated before being input into the neural network post-filter picture interpolation process, and concatenate input pictures based on the value of the second syntax element.

In one example, a non-transitory computer-readable storage medium comprises instructions stored thereon that, when executed, cause one or more processors of a device to receive a neural network post-filter characteristics message, parse a first syntax element from the neural network post-filter characteristics specifying a number of input pictures to be used as input for a neural network post-filter picture interpolation process, parse a second syntax element from the neural network post-filter characteristics message having a value specifying a manner in which input pictures are concatenated before being input into the neural network post-filter picture interpolation process, and concatenate input pictures based on the value of the second syntax element.

In one example, an apparatus comprises means for receiving a neural network post-filter characteristics message, means for parsing a first syntax element from the neural network post-filter characteristics specifying a number of input pictures to be used as input for a neural network post-filter picture interpolation process, means for parsing a second syntax element from the neural network post-filter characteristics message having a value specifying a manner in which input pictures are concatenated before being input into the neural network post-filter picture interpolation process, and means for concatenating input pictures based on the value of the second syntax element.

The details of one or more examples are set forth in the accompanying drawings and the description below. Other features, objects, and advantages will be apparent from the description and drawings, and from the claims.

DETAILED DESCRIPTION

Figure 1:
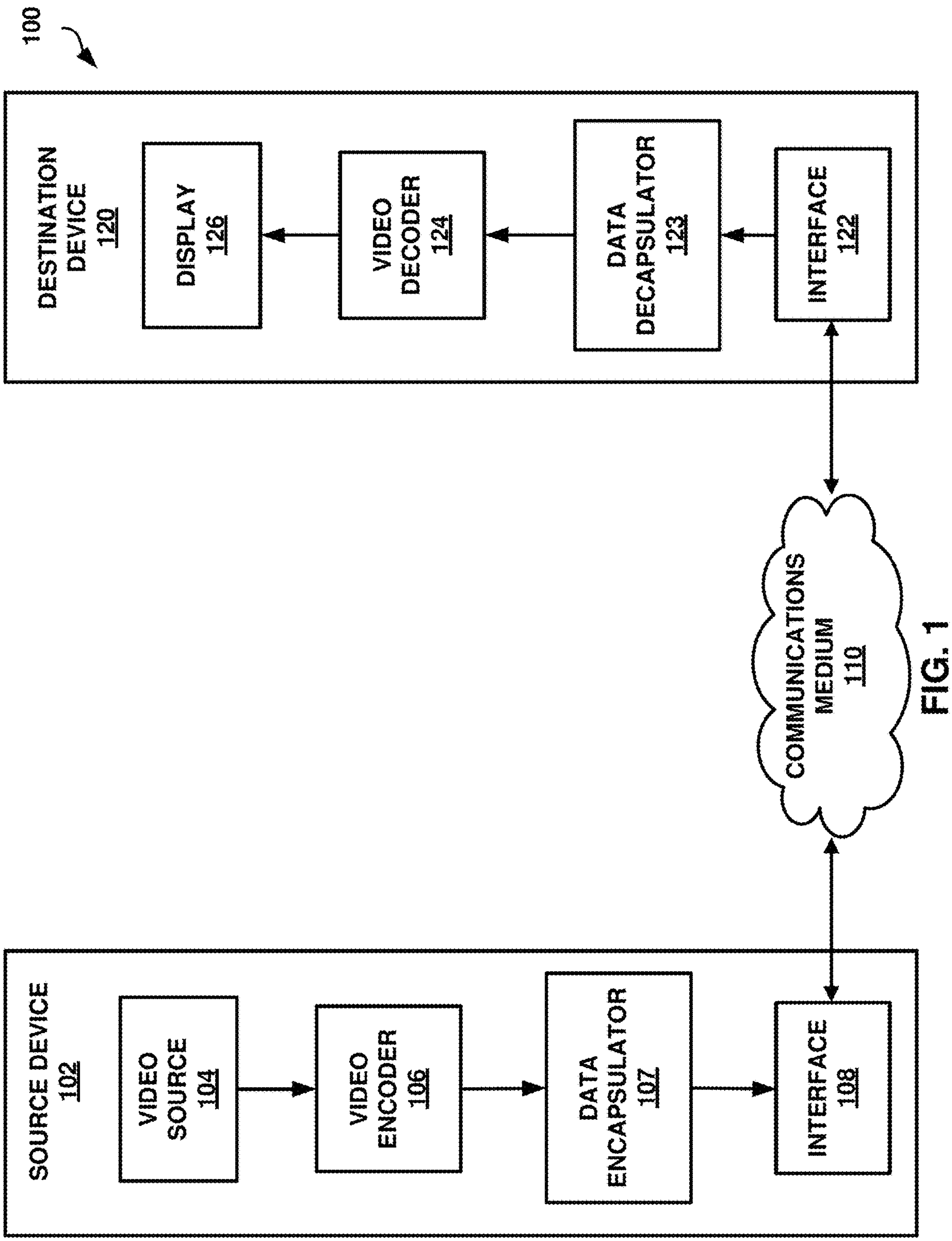
FIG. 1 is a block diagram illustrating an example of a system that may be configured to encode and decode video data according to one or more techniques of this disclosure.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-T2001, CTUs are partitioned according a quadtree plus multi-type tree (QTMT or QT+MTT) structure. The QTMT in JVET-T2001 is similar to the QTBT in JEM. However, in JVET-T2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-T2001, slices are required to consist of an integer number of complete tiles or an integer number of consecutive complete CTU rows within a tile, instead of only being required to consist of an integer number of CTUs. It should be noted that in JVET-T2001, the slice design does not include slice segments (i.e., no independent/dependent slice segments). Thus, in JVET-T2001, a picture may include a single tile, where the single tile is contained within a single slice or a picture may include multiple tiles where the multiple tiles (or CTU rows thereof) may be contained within one or more slices. In JVET-T2001, the partitioning of a picture into tiles is specified by specifying respective heights for tile rows and respective widths for tile columns. Thus, in JVET-T2001 a tile is a rectangular region of CTUs within a particular tile row and a particular tile column position. Further, it should be noted that JVET-T2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
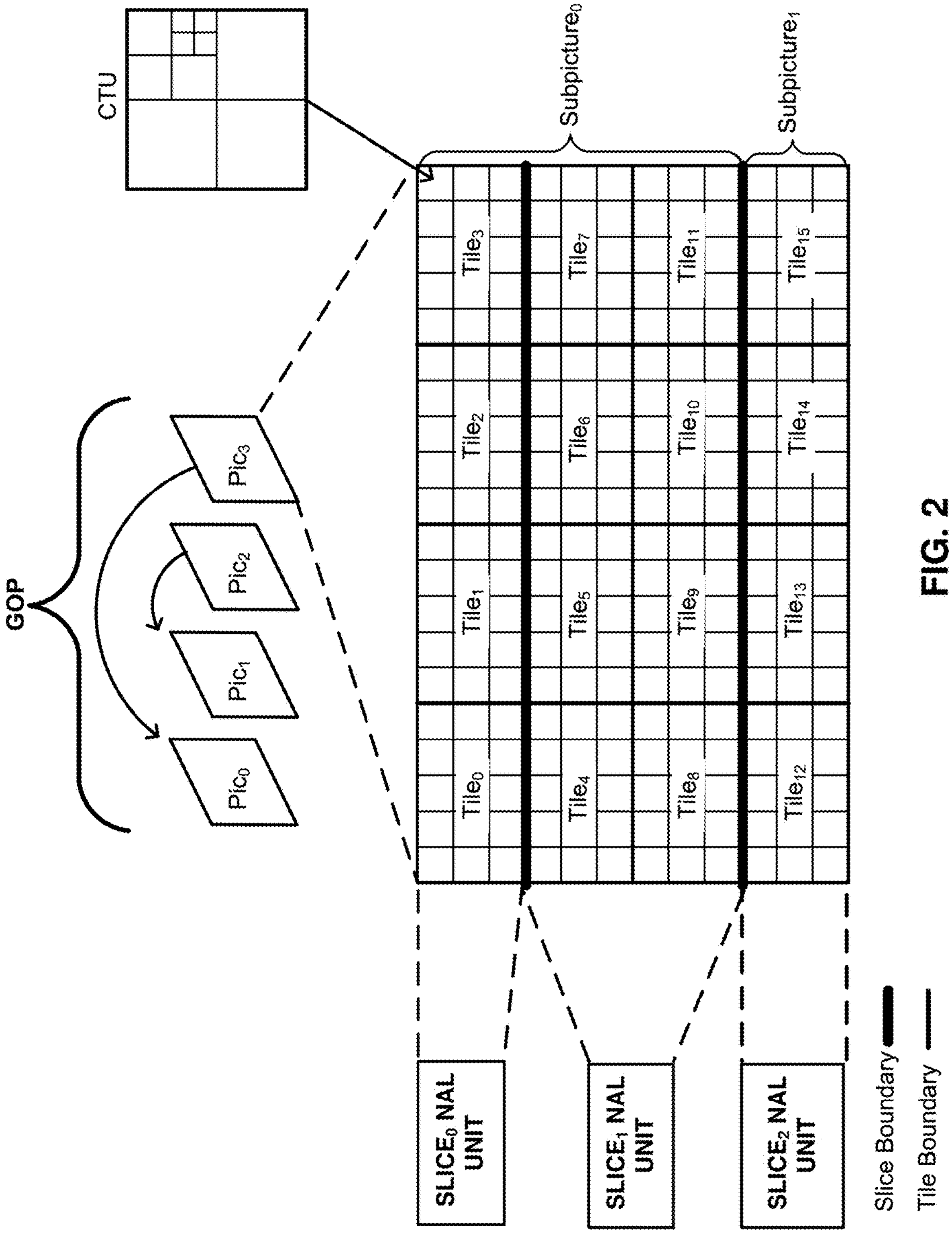
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By organizing a picture into subpictures in this manner, a viewer may be able to disable the display of the scrolling banner. That is, through a sub-bitstream extraction process, $Slice_2$ NAL unit may be removed from a bitstream (and thus not decoded and/or displayed) and $Slice_0$ NAL unit and Slice NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., MVx), a vertical displacement component of the motion vector (i.e., MVy), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_1$. Similarly, Pics is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-T2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

As described above, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and the reconstructed block and/or minimize artifacts introduced by the video coding process. Such modifications may generally be referred to as filtering. It should be noted that filtering may occur as part of an in-loop filtering process or a post-loop (or post-filtering) filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output and would not be used for subsequent decoding.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. JVET-T2001 provides where a deblocking filter is applied to reconstructed sample values as part of an in-loop filtering process. In addition to applying a deblocking filter as part of an in-loop filtering process, JVET-T2001 provides where Sample Adaptive Offset (SAO) filtering may be applied in the in-loop filtering process. In general an SAO is a process that modifies the deblocked sample values in a region by conditionally adding an offset value. Another type of filtering process includes the so-called adaptive loop filter (ALF). An ALF with block-based adaption is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled. JVET-T2001 specifies deblocking, SAO, and ALF filters which can be described as being generally based on the deblocking, SAO, and ALF filters provided in ITU-T H.265 and JEM.

It should be noted that JVET-T2001 is referred to as the pre-published version of ITU-T H.266 and thus, is the nearly finalized draft of the video coding standard resulting from the VVC project and as such, may be referred to as the first version of the VVC standard (or VVC or VVC version 1 or ITU-H.266). It should be noted that during the VVC project, Convolutional Neural Networks (CNN)-based techniques, showing potential in artifact removal and objective quality improvement, were investigated, but it was decided not to include such techniques in the VVC standard. However, CNN based techniques are currently being considered for extensions and/or improvements for VVC. Some CNN based-techniques relate to post-filtering. For example, "AHG11: Content-adaptive neural network post-filter," 26th Meeting of ISO/IEC JTC1/SC29/WG11 20-29 Apr. 2022, Teleconference, document JVET-Z0082-v2, (referred to herein as JVET-Z0082) describes a content adaptive neural network based post-filter. It should be noted that in JVET-Z0082 the content adaption is achieved by overfitting the NN post-filter on test video. Further, it should be noted that the result of the overfitting process in JVET-Z0082 is a weight-update. JVET-Z0082 describes where the weight-update is coded with ISO/IEC FDIS 15938-17. Information technology-Multimedia content description interface-Part 17: Compression of neural networks for multimedia content description and analysis and Test Model of Incremental Compression of Neural Networks for Multimedia Content Description and Analysis (INCTM), N0179. February 2022, which may be collectively referred to as the MPEG NNR (Neural Network Representation) or Neural Network Coding (NNC) standard. JVET-Z0082 further describes where the coded weight-update signaled within the video bitstream as an NNR post-filter SEI message. "AHG9: NNR post-filter SEI message," 26th Meeting of ISO/IEC JTC1/SC29/WG11 20-29 Apr. 2022, Teleconference, document JVET-Z0052-v1, (referred to herein as JVET-Z0052) describes the NNR post-filter SEI message utilized by JVET-Z0082. Elements of the NN post-filter described in JVET-Z0082 and the NNR post-filter SEI message described in JVET-Z0052 were adopted in "Additional SEI messages for VSEI (Draft 2)" 27th Meeting of ISO/IEC JTC1/SC29/WG11 13-22 Jul. 2022, Teleconference, document JVET-AA2006-v2, (referred to herein as JVET-AA2006). JVET-AA2006 provides versatile supplemental enhancement information messages for coded video bitstreams (VSEI). JVET-AA2006 specifies the syntax and semantics for a Neural network post-filter characteristics SEI message and for a Neural-network post-filter activation SEI message. A Neural network post-filter characteristics SEI message specifies a neural network that may be used as a post-processing filter. The use of specified post-processing filters for specific pictures is indicated with Neural-network post-filter activation SEI messages. JVET-AA2006 is described in further detail below. The techniques described herein provide techniques for signaling of neural network post-filter messages.

With respect to the equations used herein, the following arithmetic operators may be used:

+ Addition

− Subtraction

* Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

x/y Used to denote division in mathematical equations where no truncation or rounding is intended.

Further, the following mathematical functions may be used:

Log 2(x) the base-2 logarithm of x;

$$\mathrm{Min}(x, y) = \begin{cases} x & ; \; x <= y \\ y & ; \; x > y \end{cases};$$

$$\mathrm{Max}(x, y) = \begin{cases} x & ; \; x >= y \\ y & ; \; x < y \end{cases}$$

Ceil(x) the smallest integer greater than or equal to x.

With respect to the example syntax used herein, the following definitions of logical operators may be applied:

x && y Boolean logical "and" of x and y x||y Boolean logical "or" of x and y

! Boolean logical "not"

x?y:z If x is TRUE or not equal to 0, evaluates to the value of y; otherwise, evaluates to the value of z.

Further, the following relational operators may be applied:

> Greater than

>= Greater than or equal to

< Less than

<= Less than or equal to

== Equal to

!= Not equal to

Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to max Val bits with max Val defined in the semantics of the symtax element.

tu(v): truncated unary using up to max Val bits with max Val defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of pictures and each picture may be divided into one or more regions. In JVET-T2001, a coded representation of a picture comprises VCL NAL units of a particular layer within an AU and contains all CTUs of the picture. For example, referring again to FIG. 2, the coded representation of Pic$_3$ is encapsulated in three coded slice NAL units (i.e., Slice$_0$ NAL unit, Slice$_1$ NAL unit, and Slice$_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-T2001, a NAL unit may be a VCL NAL unit or a non-VCL NAL unit. It should be noted that a VCL NAL unit includes slice header data, which provides information used for decoding the particular slice. Thus, in JVET-T2001, information used for decoding video data, which may be referred to as metadata in some cases, is not limited to being included in non-VCL NAL units. JVET-T2001 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. JVET-T2001 further provides where a layer is a set of VCL NAL units that all have a particular value of a layer identifier and the associated non-VCL NAL units. Further, in JVET-T2001, a PU consists of zero or one PH NAL units, one coded picture, which comprises of one or more VCL NAL units, and zero or more other non-VCL NAL units. Further, in JVET-T2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In JVET-T2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-T2001, a bitstream may be described as including a sequence of AUs forming one or more CVSs.

Multi-layer video coding enables a video presentation to be decoded/displayed as a presentation corresponding to a base layer of video data and decoded/displayed as one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-T2001, each of a video sequence, a GOP, a picture, a slice, and CTU may be associated with metadata that describes video coding properties and some types of metadata an encapsulated in non-VCL NAL units. JVET-T2001 defines parameters sets that may be used to describe video data and/or video coding properties. In particular, JVET-T2001 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, an APS applies to zero or more slices, and a VPS may be optionally referenced by a SPS. A PPS applies to an individual coded picture that refers to it. In JVET-T2001, parameter sets may be encapsulated as a non-VCL NAL unit and/or may be signaled as a message. JVET-T2001 also includes a picture header (PH) which is encapsulated as a non-VCL NAL unit. In JVET-T2001, a picture header applies to all slices of a coded picture. JVET-T2001 further enables decoding capability information (DCI) and supplemental enhancement information (SEI) messages to be signaled. In JVET-T2001, DCI and SEI messages assist in processes related to decoding, display, or other purposes, however, DCI and SEI messages may not be required for constructing the luma or chroma samples according to a decoding process. In JVET-T2001, DCI and SEI messages may be signaled in a bitstream using non-VCL NAL units. Further, DCI and SEI messages may be conveyed by some mechanism other than by being present in the bitstream (i.e., signaled out-of-band).

Figure 3:
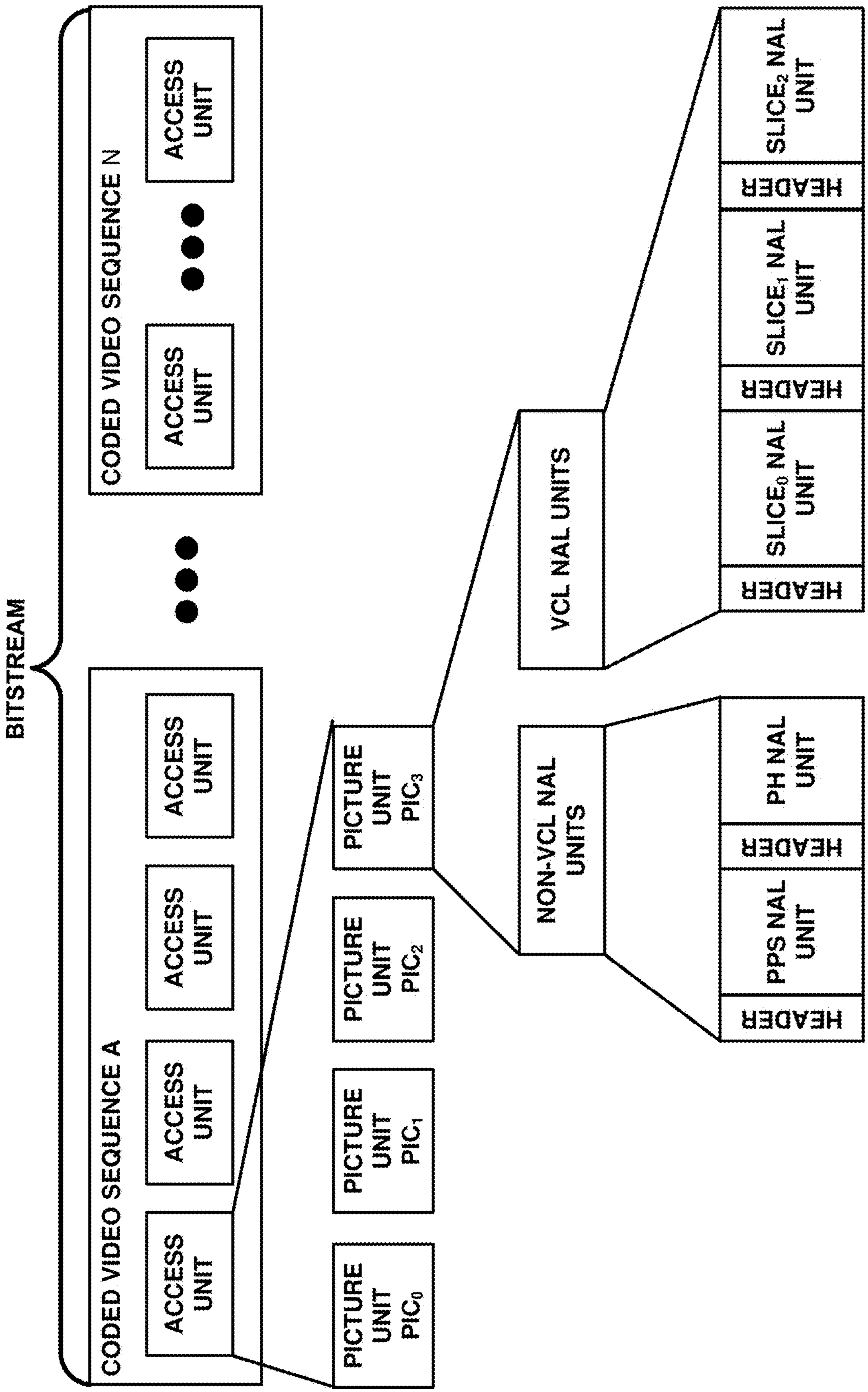
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, Slice NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. As described in further detail below, in JVET-T2001, a PH syntax structure may be present in the slice header of a VCL NAL unit or in a PH NAL unit of the current PU.

JVET-T2001 defines NAL unit header semantics that specify the type of Raw Byte Sequence Payload (RBSP) data structure included in the NAL unit. Table 1 illustrates the syntax of the NAL unit header provided in JVET-T2001.

TABLE 1

| | Descriptor |
|---|---|
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

JVET-T2001 provides the following definitions for the respective syntax elements illustrated in Table 1.

forbidden_zero_bit shall be equal to 0.

nuh_reserved_zero_bit shall be equal to 0. The value 1 of nuh_reserved_zero_bit could be specified in the future by ITU-T|ISO/IEC. Although the value of nuh_reserved_zero_bit is required to be equal to 0 in this version of this Specification, decoders conforming to this version of this Specification shall allow the value of nuh_reserved_zero_bit equal to 1 to appear in the syntax and shall ignore (i.e. remove from the bitstream and discard) NAL units with nuh_reserved_zero_bit equal to 1.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. Although the value of nuh_layer_id is required to be the range of 0 to 55, inclusive, in this version of this Specification, decoders conforming to this version of this Specification shall allow the value of nuh_layer_id to be greater than 55 to appear in the syntax and shall ignore (i.e. remove from the bitstream and discard) NAL units with nuh_layer_id greater than 55.

The value of nuh_layer_id shall be the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, or FD_NUT, nuh_layer_id shall be equal to the nuh_layer_id of associated VCL NAL unit.

When nal_unit_type is equal to EOS_NUT, nuh_layer_id shall be equal to one of the nuh_layer_id values of the layers present in the CVS.

NOTE—The value of nuh_layer_id for DCI, OPI, VPS, AUD, and EOB NAL units is not constrained.

nuh_temporal_id_plus1 minus 1 specifies a temporal identifier for the NAL unit.

The value of nuh_temporal_id_plus1 shall not be equal to 0.

The variable TemporalId is derived as follows:

$$TemporalId = nuh\_temporal\_id\_plus1 - 1$$

When nal_unit_type is in the range of IDR_W_RADL to RSV_IRAP_11, inclusive, TemporalId shall be equal to 0.

When nal_unit_type is equal to STSA_NUT and vps_independent_layer_flag[GeneralLayerIdx[nuh_layer_id] ] is equal to 1, TemporalId shall be greater than 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:

If nal_unit_type is equal to DCI_NUT, OPI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId could be greater than or equal to the TemporalId of the containing AU, as all PPSs and APSs could be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

NAL units that have nal_unit_type in the range of UNSPEC28 . . . . UNSPEC31, inclusive, for which semantics are not specified, shall not affect the decoding process specified in this Specification.

NOTE—NAL unit types in the range of UNSPEC_28 . . . . UNSPEC_31 could be used as determined by the application. No decoding process for these values of nal_unit_type is specified in this Specification. Since different applications might use these NAL unit types for different purposes, particular care is expected to be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed. For purposes other than determining the amount of data in the DUs of the bitstream, decoders shall ignore (remove from the bitstream and discard) the contents of all NAL units that use reserved values of nal_unit_type. NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7<br>8 | IDR_W_RADL<br>IDR_N_LP | Coded slice of an IDR picture or subpicture* slice_layer_rbsp( ) | VCL |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit type | VCL |
| 12 | OPI_NUT | Operating point information operating_point_information_rbsp( ) | non-VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |

TABLE 2-continued

| nal_unit_type | Name of nal_unit_type | Content of NAL unit and RBSP syntax structure | NAL unit type class |
|---|---|---|---|
| 23 | PREFIX_SEI_NUT | Supplemental enhancement information | non-VCL |
| 24 | SUFFIX_SEI_NUT | sei_rbsp( ) | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NOTE—A clean random access (CRA) picture may have associated RASL or RADL pictures present in the bitstream.

NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

The value of nal_unit_type shall be the same for all VCL NAL units of a subpicture. A subpicture is referred to as having the same NAL unit type as the VCL NAL units of the subpicture.

For VCL NAL units of any particular picture, the following applies:

- If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.
- Otherwise (pps_mixed_nalu_types_in_pic_flag is equal to 1), all of the following constraints apply:
  - The picture shall have at least two subpictures.
  - VCL NAL units of the picture shall have two or more different nal_unit_type values.
  - There shall be no VCL NAL unit of the picture that has nal_unit_type equal to GDR_NUT.
  - When a VCL NAL unit of the picture has nal_unit_type equal to nalUnitTypeA that is equal to IDR_W_RADL, IDR_N_LP, or CRA_NUT, other VCL NAL units of the picture shall all have nal_unit_type equal to nalUnitTypeA or TRAIL_NUT.

The value of nal_unit_type shall be the same for all pictures in an IRAP or GDR AU.

When sps_video_parameter_set_id is greater than 0, vps_max_tid_il_ref_pics_plus1[i][j] is equal to 0 for j equal to GeneralLayerIdx[nuh_layer_id] and any value of i in the range of j+1 to vps_max_layers_minus1, inclusive, and pps_mixed_nalu_types_in_pic_flag is equal to 1, the value of nal_unit_type shall not be equal to IDR_W_RADL, IDR_N_LP, or CRA_NUT.

It is a requirement of bitstream conformance that the following constraints apply:

- When a picture is a leading picture of an IRAP picture, it shall be a RADL or RASL picture.
- When a subpicture is a leading subpicture of an IRAP subpicture, it shall be a RADL or RASL subpicture.
- When a picture is not a leading picture of an IRAP picture, it shall not be a RADL or RASL picture.
- When a subpicture is not a leading subpicture of an IRAP subpicture, it shall not be a RADL or RASL subpicture.
- No RASL pictures shall be present in the bitstream that are associated with an IDR picture.
- No RASL subpictures shall be present in the bitstream that are associated with an IDR subpicture.
- No RADL pictures shall be present in the bitstream that are associated with an IDR picture having nal_unit_type equal to IDR_N_LP.
  - NOTE—It is possible to perform random access at the position of an IRAP AU by discarding all PUs before the IRAP AU (and to correctly decode the non-RASL pictures in the IRAP AU and all the subsequent AUs in decoding order), provided each parameter set is available (either in the bitstream or by external means not specified in this Specification) when it is referenced.
- No RADL subpictures shall be present in the bitstream that are associated with an IDR subpicture having nal_unit_type equal to IDR_N_LP.
- Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.
- Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.
- Any picture, with nuh_layer_id equal to a particular value layerId, that precedes a recovery point picture with nuh_layer_id equal to layerId in decoding order shall precede the recovery point picture in output order.
- Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.
- Any RASL picture associated with a CRA picture shall precede any RADL picture associated with the CRA picture in output order.
- Any RASL subpicture associated with a CRA subpicture shall precede any RADL subpicture associated with the CRA subpicture in output order.
- Any RASL picture, with nuh_layer_id equal to a particular value layerId, associated with a CRA picture shall follow, in output order, any IRAP or GDR picture with nuh_layer_id equal to layerId that precedes the CRA picture in decoding order.

Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.

If sps_field_seq_flag is equal to 0, the following applies: when the current picture, with nuh_layer_id equal to a particular value layerId, is a leading picture associated with an IRAP picture, it shall precede, in decoding order, all non-leading pictures that are associated with the same IRAP picture. Otherwise (sps_field_seq_flag is equal to 1), let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.

If sps_field_seq_flag is equal to 0, the following applies: when the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture. Otherwise (sps_field_seq_flag is equal to 1), let subpicA and subpicB be the first and the last leading subpictures, in decoding order, associated with an IRAP subpicture, respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

As provided in Table 2, a NAL unit may include an supplemental enhancement information (SEI) syntax structure. Table 3 and Table 4 illustrate the supplemental enhancement information (SEI) syntax structure provided in JVET-T2001.

TABLE 3

| | Descriptor |
|---|---|
| sei_rbsp( ) { | |
|   do | |
|     sei_message( ) | |
|   while( more_rbsp_data( ) ) | |
|   rbsp_trailing_bits( ) | |
| } | |

TABLE 4

| | Descriptor |
|---|---|
| sei_message( ) { | |
|   payloadType = 0 | |
|   do { | |
|     payload_type_byte | u(8) |
|     payloadType += payload_type_byte | |
|   } while( payload_type_byte = = 0xFF ) | |
|   payloadSize = 0 | |
|   do { | |
|     payload_size_byte | u(8) |
|     payloadSize += payload_size_byte | |
|   } while( payload_size_byte = = 0xFF ) | |

TABLE 4-continued

| | Descriptor |
|---|---|
|   sei_payload( payloadType, payloadSize ) | |
| } | |

With respect to Table 3 and Table 4, JVET-T2001 provides the following semantics: Each SEI message consists of the variables specifying the type payloadType and size payloadSize of the SEI message payload. SEI message payloads are specified. The derived SEI message payload size payloadSize is specified in bytes and shall be equal to the number of RBSP bytes in the SEI message payload.

NOTE—The NAL unit byte sequence containing the SEI message might include one or more emulation prevention bytes (represented by emulation_prevention_three_byte syntax elements). Since the payload size of an SEI message is specified in RBSP bytes, the quantity of emulation prevention bytes is not included in the size payloadSize of an SEI payload.

payload_type_byte is a byte of the payload type of an SEI message.

payload_size_byte is a byte of the payload size of an SEI message.

It should be noted that JVET-T2001 defines payload types and "Additional SEI messages for VSEI (Draft 6)" 25th Meeting of ISO/IEC JTC1/SC29/WG11 12-21 Jan. 2022, Teleconference, document JVET-Y2006-v1, which is incorporated by reference herein, and referred to as JVET-Y2006, defines additional payload types. Table 5 generally illustrates an sei_payload( ) syntax structure. That is, Table 5 illustrates the sei_payload( ) syntax structure, but for the sake of brevity, all of the possible types of payloads are not included in Table 5.

TABLE 5

| | Descriptor |
|---|---|
| sei_payload( payloadType, payloadSize ) { | |
|   if( nal_unit_type = = PREFIX_SEI_NUT ) | |
|     if( payloadType = = 0 ) | |
|       buffering_period( payloadSize ) | |
| ... | |
|     else if( payloadType = = 204 ) /* Specified in Rec. ITU-T H.274 \| ISO/IEC 23002-7 */ | |
|       sample_aspect_ratio_info( payloadSize ) | |
|     else /* Specified in Rec. ITU-T H.274 \| ISO/IEC 23002-7 */ | |
|       reserved_message( payloadSize ) | |
|   else /* nal_unit_type = = SUFFIX_SEI_NUT */ | |
|     if( payloadType = = 3 ) /* Specified in Rec. ITU-T H.274 \| ISO/IEC 23002-7 */ | |
|       filler_payload( payloadSize ) | |
| ... | |
|     else /* Specified in Rec. ITU-T H.274 \| ISO/IEC 23002-7 */ | |
|       reserved_message( payloadSize ) | |
|   if( more_data_in_payload( ) ) { | |
|     if( payload_extension_present( ) ) | |
|       sei_reserved_payload_extension_data | u(v) |
|     sei_payload_bit_equal_to_one /* equal to 1 */ | f(1) |
|     while( !byte_aligned( ) ) | |
|       sei_payload_bit_equal_to_zero /* equal to 0 */ | f(1) |
|   } | |
| } | |

With respect to Table 5, JVET-T2001 provides the following semantics.

sei_reserved_payload_extension_data shall not be present in bitstreams conforming to this version of this Specification. However, decoders conforming to this version of this Specification shall ignore the presence and value of sei_reserved_payload_extension_data. When present, the length, in bits, of sei_reserved_payload_extension_data is equal to 8*payloadSize−nEarlierBits-nPayloadZeroBits-1, where nEarlierBits is the number of bits in the sei_payload( ) syntax structure that precede the sei_reserved_payload_extension_data syntax element, and nPayloadZeroBits is the number of sei_payload_bit_equal_to_zero syntax elements at the end of the sei_payload( ) syntax structure.

If more_data_in_payload( ) is TRUE after the parsing of the SEI message syntax structure (e.g., the buffering_period( ) syntax structure) and nPayloadZeroBits is not equal to 7, PayloadBits is set equal to 8*payloadSize−nPayloadZeroBits−1; otherwise, PayloadBits is set equal to 8*payloadSize.

payload_bit_equal_to_one shall be equal to 1.

payload_bit_equal_to_zero shall be equal to 0.

NOTE—SEI messages with the same value of payloadType are conceptually the same SEI message regardless of whether they are contained in prefix or suffix SEI NAL units.

NOTE—For SEI messages specified in this Specification and the VSEI specification (ITU-T H.274|ISO/IEC 23002-7), the payloadType values are aligned with similar SEI messages specified in AVC (Rec. ITU-T H.264|ISO/IEC 14496-10) and HEVC (Rec. ITU-T H.265|ISO/IEC 23008-2).

The semantics and persistence scope for each SEI message are specified in the semantics specification for each particular SEI message.

NOTE—Persistence information for SEI messages is informatively summarized in Table 142.

JVET-T2001 further provides the following:

The SEI messages having syntax structures identified in [Table 5] that are specified in Rec. ITU-T H.274|ISO/IEC 23002-7 may be used together with bitstreams specified by this Specification.

When any particular Rec. ITU-T H.274|ISO/IEC 23002-7 SEI message is included in a bitstream specified by this Specification, the SEI payload syntax shall be included into the sei_payload( )syntax structure as specified in [Table 5], shall use the payloadType value specified in [Table 5], and, additionally, any SEI-message-specific constraints specified in this annex for that particular SEI message shall apply.

The value of PayloadBits, as specified in above, is passed to the parser of the SEI message syntax structures specified in Rec. ITU-T H.274|ISO/IEC 23002-7.

As described above, JVET-AA2006 provides a NN post-filter supplemental enhancement information messages. In particular, JVET-AA2006 provides a Neural-network post-filter characteristics SEI message (payloadType==210) and a Neural-network post-filter activation SEI message (payloadType==211). Table 6 and Table 7 illustrate the syntax of the Neural-network post-filter characteristics SEI message provided in JVET-AA2006. It should be noted that a Neural-network post-filter characteristics SEI message may be referred to as a NNPFC SEI.

TABLE 6

| | Descriptor |
|---|---|
| nn_post_filter_characteristics( payloadSize ) { | |
| nnpfc_id | ue(v) |
| nnpfc_mode_idc | ue(v) |
| nnpfc_purpose_and_formatting_flag | u(1) |
| if( nnpfc_purpose_and_formatting_flag ) { | |
| nnpfc_purpose | ue(v) |
| if( nnpfc_purpose = = 2 \| \| nnpfc_purpose = = 4 ) | |
| nnpfc_out_sub_c_flag | u(1) |
| if( nnpfc_purpose = = 3 \| \| nnpfc_purpose = = 4 ) { | |
| nnpfc_pic_width_in_luma_samples | ue(v) |
| nnpfc_pic_height_in_luma_samples | ue(v) |
| } | |
| /* input and output formatting */ | |
| nnpfc_component_last_flag | u(1) |
| nnpfc_inp_format_flag | u(1) |
| if( nnpfc_inp_format_flag = = 1 ) | |
| nnpfc_inp_tensor_bitdepth_minus8 | ue(v) |
| nnpfc_inp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format_flag | u(1) |
| if( nnpfc_out_format_flag = = 1 ) | |
| nnpfc_out_tensor_bitdepth_minus8 | ue(v) |
| nnpfc_out_order_idc | ue(v) |
| nnpfc_constant_patch_size_flag | u(1) |
| nnpfc_patch_width_minus1 | ue(v) |
| nnpfc_patch_height_minus1 | ue(v) |
| nnpfc_overlap | ue(v) |
| nnpfc_padding_type | ue(v) |
| if( nnpfc_padding_type = = 4 ){ | |
| nnpfc_luma_padding_val | ue(v) |
| nnpfc_cb_padding_val | ue(v) |
| nnpfc_cr_padding_val | ue(v) |
| } | |
| nnpfc_complexity_idc | ue(v) |
| if( nnpfc_complexity_idc > 0 ) | |
| nnpfc_complexity_element( nnpfc_complexity_idc ) | |
| if( nnpfc_mode_idc = = 2 ) { | |
| while( !byte_aligned( ) ) | |
| nnpfc_reserved_zero_bit | u(1) |
| nnpfc_uri_tag[ i ] | st(v) |
| nnpfc_uri[ i ] | st(v) |
| } | |
| } | |
| /* filter specified or updated by ISO/IEC 15938-17 bitstream */ | |
| if( nnpfc_mode_idc = = 1 ) { | |
| while( !byte_aligned( ) ) | |
| nnpfc_reserved_zero_bit | u(1) |
| for( i = 0; more_data_in_payload( ); i++ ) | |
| nnpfc_payload_byte[ i ] | b(8) |
| } | |
| } | |

TABLE 7

| | Descriptor |
|---|---|
| nnpfc_complexity_element( nnpfc_complexity_idc ) { | |
| if( nnpfc_complexity_idc = = 1 ) { | |
| nnpfc_parameter_type_idc | u(2) |
| if (nnpfc_parameter_type_idc ! = 2) | |
| nnpfc_log2_parameter_bit_length_minus3 | u(2) |
| nnpfc_num_parameters_idc | u(6) |
| nnpfc_num_kmac_operations_idc | ue(v) |
| } | |
| } | |

With respect to Table 6 and Table 7, JVET-AA2006 provides the following semantics. This SEI message specifies a neural network that may be used as a post-processing filter. The use of specified post-processing filters for specific pictures is indicated with neural-network post-filter activation SEI messages.

Use of this SEI message requires the definition of the following variables:

Cropped decoded output picture width and height in units of luma samples, denoted herein by CroppedWidth and CroppedHeight, respectively.

Luma sample array CroppedYPic and chroma sample arrays CroppedCbPic and CroppedCrPic, when present, of the cropped decoded output picture for vertical coordinates y and horizontal coordinates x, where the top-left corner of the sample array has coordinates y equal to 0 and x equal to 0.

Bit depth $BitDepth_Y$ for the luma sample array of the cropped decoded output picture.

Bit depth $BitDepth_C$ for the chroma sample arrays, if any, of the cropped decoded output picture.

A chroma format indicator, denoted herein by ChromaFormatIdc.

When nnpfc_auxiliary_inp_idc is equal to 1, a quantization strength value StrengthControlVal.

When this SEI message specifies a neural network that may be used as a post-processing filter, the semantics specify the derivation of the luma sample array FilteredYPic[x][y] and chroma sample arrays FilteredCbPic[x][y] and FilteredCrPic [x][y], as indicated by the value of nnpfc_out_order_idc, that contain the output of the post-processing filter.

The variables SubWidthC and SubHeightC are derived from ChromaFormatIdc as specified by Table 8.

TABLE 8

| sps_chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

nnpfc_id contains an identifying number that may be used to identify a post-processing filter. The value of nnpfc_id shall be in the range of 0 to $2^{32}-2$, inclusive.

Values of nnpfc_id from 256 to 511, inclusive, and from $2^{31}$ to $2^{32}-2$, inclusive, are reserved for future use by ITU-T|ISO/IEC. Decoders encountering a value of nnpfc_id in the range of 256 to 511, inclusive, or in the range of $2^{31}$ to $2^{32}-2$, inclusive, shall ignore it.

nnpfc_mode_idc equal to 0 specifies that the post-processing filter associated with the nnpfc_id value is determined by external means not specified in this Specification.

nnpfc_mode_idc equal to 1 specifies that the post-processing filter associated with the nnpfc_id value is a neural network represented by the ISO/IEC 15938-17 bitstream contained in this SEI message.

nnpfc_mode_idc equal to 2 specifies that the post-processing filter associated with the nnpfc_id value is a neural network identified by a specified tag Uniform Resource Identifier (URI) (nnpfc_uri_tag[i]) and neural network information URI (nnpfc_uri[i]).

The value of nnpfc_mode_idc shall be in the range of 0 to 255, inclusive. Values of nnpfc_mode_idc greater than 2 are reserved for future specification by ITU-T|ISO/IEC and shall not be present in bitstreams conforming to this version of this Specification. Decoders conforming to this version of this Specification shall ignore SEI messages that contain reserved values of nnpfc_mode_idc.

nnpfc_purpose_and_formatting_flag equal to 0 specifies that no syntax elements related to the filter purpose, input formatting, output formatting, and complexity are present. nnpfc_purpose_and_formatting_flag equal to 1 specifies that syntax elements related to the filter purpose, input formatting, output formatting, and complexity are present.

When nnpfc_mode_idc is equal to 1 and the current CLVS does not contain a preceding neural-network post-filter characteristics SEI message, in decoding order, that has the value of nnpfc_id equal to the value of nnpfc_id in this SEI message, nnpfc_purpose_and_formatting_flag shall be equal to 1.

When the current CLVS contains a preceding neural-network post-filter characteristics SEI message, in decoding order, that has the same value of nnpfc_id equal to the value of nnpfc_id in this SEI message, at least one of the following conditions shall apply:

This SEI message has nnpfc_mode_idc equal to 1 and nnpfc_purpose_and_formatting_flag equal to 0 in order to provide a neural network update.

This SEI message has the same content as the preceding neural-network post-filter characteristics SEI message.

When this SEI message is the first neural-network post-filter characteristics SEI message, in decoding order, that has a particular nnpfc_id value within the current CLVS, it specifies a base post-processing filter that pertains to the current decoded picture and all subsequent decoded pictures of the current layer, in output order, until the end of the current CLVS. When this SEI message is not the first neural-network post-filter characteristics SEI message, in decoding order, that has a particular nnpfc_id value within the current CLVS, this SEI message pertains to the current decoded picture and all subsequent decoded pictures of the current layer, in output order, until the end of the current CLVS or the next neural-network post-filter characteristics SEI message having that particular nnpfc_id value, in output order, within the current CLVS.

nnpfc_purpose indicates the purpose of post-processing filter as specified in Table 9. The value of nnpfc_purpose shall be in the range of 0 to $2^{32}$-2, inclusive. Values of nnpfc_purpose that do not appear in Table 9 are reserved for future specification by ITU-T|ISO/IEC and shall not be present in bitstreams conforming to this version of this Specification. Decoders conforming to this version of this Specification shall ignore SEI messages that contain reserved values of nnpfc_purpose.

TABLE 9

| Value | Interpretation |
|---|---|
| 0 | Unknown or unspecified |
| 1 | Visual quality improvement |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |

NOTE—When a reserved value of nnpfc_purpose is taken into use in the future by ITU-T|ISO/IEC, the syntax of this SEI message could be extended with syntax elements whose presence is conditioned by nnpfc_purpose being equal to that value.

When SubWidthC is equal to 1 and SubHeightC is equal to 1, nnpfc_purpose shall not be equal to 2 or 4.

nnpfc_out_sub_c_flag equal to 1 specifies that outSubWidthC is equal to 1 and outSubHeightC is equal to 1. nnpfc_out_sub_c_flag equal to 0 specifies that outSub WidthC is equal to 2 and outSubHeightC is equal to 1. When nnpfc_out_sub_c_flag is not present, outSubWidthC is inferred to be equal to SubWidthC and outSubHeightC is inferred to be equal to SubHeightC. If SubWidthC is equal to 2 and SubHeightC is equal to 1, nnpfc_out_sub_c_flag shall not be equal to 0.

nnpfc_pic_width_in_luma_samples and nnpfc_pic_height_in_luma_samples specify the width and height, respectively, of the luma sample array of the picture resulting by applying the post-processing filter identified by nnpfc_id to a cropped decoded output picture. When nnpfc_pic_width_in_luma_samples and nnpfc_pic_height_in_luma_samples are not present, they are inferred to be equal to CroppedWidth and CroppedHeight, respectively.

nnpfc_component_last_flag equal to 0 specifies that the second dimension in the input tensor inputTensor to the post-processing filter and the output tensor outputTensor resulting from the post-processing filter is used for the channel. nnpfc_component_last_flag equal to 1 specifies that the last dimension in the input tensor inputTensor to the post-processing filter and the output tensor outputTensor resulting from the post-processing filter is used for the channel.

NOTE—The first dimension in the input tensor and in the output tensor is used for the batch index, which is a practice in some neural network frameworks. While the semantics of this SEI message use batch size equal to 1, it is up to the post-processing implementation to determine the batch size used as input to the neural network inference.

NOTE—A colour component is an example of a channel.

nnpfc_inp_format_flag indicates the method of converting a sample value of the cropped decoded output picture to an input value to the post-processing filter. When nnpfc_inp_format_flag is equal to 0, the input values to the post-processing filter are real numbers and the functions InpY( ) and InpC( ) are specified as follows:

$$InpY(x) = x \div ((1 \ll BitDepth_Y) - 1)$$

$$InpC(x) = x \div ((1 \ll BitDepth_C) - 1)$$

When nnpfc_inp_format_flag is equal to 1, the input values to the post-processing filter are unsigned integer numbers and the functions InpY( ) and InpC( ) are specified as follows:

```
shiftY = BitDepthY − inpTensorBitDepth
if( inpTensorBitDepth >= BitDepthY)
  InpY( x ) = x << ( inpTensorBitDepth − BitDepthY )
else
  InpY( x ) = Clip3(0, ( 1 << inpTensorBitDepth ) − 1, ( x + ( 1 << ( shiftY − 1 ) ) ) >> shiftY )
shiftC = BitDepthC − inpTensorBitDepth
if( inpTensorBitDepth >= BitDepthC )
  InpC( x ) = x << ( inpTensorBitDepth − BitDepthC )
else
  InpC( x ) = Clip3(0, ( 1 << inpTensorBitDepth ) − 1, ( x + ( 1 << ( shiftC − 1 ) ) ) >> shiftC )
```

The variable inpTensorBitDepth is derived from the syntax element nnpfc_inp_tensor_bitdepth_minus8 as specified below.

nnpfc_inp_tensor_bitdepth_minus8 plus 8 specifies the bit depth of luma sample values in the input integer tensor. The value of inpTensorBitDepth is derived as follows:

$$inpTensorBitDepth = \text{nnpfc\_inp\_tensor\_bitdepth\_minus8} + 8$$

It is a requirement of bitstream conformance that the value of nnpfc_inp_tensor_bitdepth_minus8 shall be in the range of 0 to 24, inclusive.

nnpfc_auxiliary_inp_idc not equal to 0 specifies auxiliary input data is present in the input tensor of the neural-network post-filter. nnpfc_auxiliary_inp_idc equal to 0 indicates that auxiliary input data is not present in the input tensor. nnpfc_auxiliary_inp_idc equal to 1 specifies that auxiliary input data is derived as specified in Table 14. The value of nnpfc_auxiliary_inp_idc shall be in the range of 0 to 255, inclusive. Values of nnpfc_auxiliary_inp_idc greater than 1 are reserved for future specification by ITU-T|ISO/IEC and shall not be present in bitstreams conforming to this version of this Specification. Decoders conforming to this version of this Specification shall ignore SEI messages that contain reserved values of nnpfc_auxiliary_inp_idc.

nnpfc_separate_colour_description_present_flag equal to 1 indicates that a distinct combination of colour primaries, transfer characteristics, and matrix coefficients for the picture resulting from the post-processing filter is specified in the SEI message syntax structure. nnfpc_separate_colour_description_present_flag equal to 0 indicates that the combination of colour primaries, transfer characteristics, and matrix coefficients for the picture resulting from the post-processing filter is the same as indicated in VUI parameters for the CLVS.

nnpfc_colour_primaries has the same semantics as specified for the vui_colour_primaries syntax Element, which are as follows: vui_colour_primaries indicates the chromaticity coordinates of the source colour primaries. Its semantics are as specified for the ColourPrimaries parameter in Rec. ITU-T H.273|ISO/IEC 23091-2. When the vui_colour_primaries syntax element is not present, the value of vui_colour_primaries is inferred to be equal to 2 (the chromaticity is unknown or unspecified or determined by other means not specified in this Specification). Values of vui_colour_primaries that are identified as reserved for future use in Rec. ITU-T H.273|ISO/IEC 23091-2 shall not be present in bitstreams conforming to this version of this Specification. Decoders shall interpret reserved values of vui_colour_primaries as equivalent to the value 2.

Except as follows:

nnpfc_colour_primaries specifies the colour primaries of the picture resulting from applying the neural-network post-filter specified in the SEI message, rather than the colour primaries used for the CLVS.

When nnpfc_colour_primaries is not present in the neural-network post-filter characteristics SEI message, the value of nnpfc_colour_primaries is inferred to be equal to vui_colour_primaries.

nnpfc_transfer_characteristics has the same semantics as specified for the vui_transfer_characteristics syntax element, which are as follows: vui_transfer_characteristics indicates the transfer characteristics function of the colour representation. Its semantics are as specified for the TransferCharacteristics parameter in Rec. ITU-T H.273|ISO/IEC 23091-2. When the vui_transfer_characteristics syntax element is not present, the value of vui_transfer_characteristics is inferred to be equal to 2 (the transfer characteristics are unknown or unspecified or determined by other means not specified in this Specification). Values of vui_transfer_characteristics that are identified as reserved for future use in Rec. ITU-T H.273|ISO/IEC 23091-2 shall not be present in bitstreams conforming to this version of this Specification. Decoders shall interpret reserved values of vui_transfer_characteristics as equivalent to the value 2.

Except as follows:

nnpfc_transfer_characteristics specifies the transfer characteristics of the picture resulting from applying the neural-network post-filter specified in the SEI message, rather than the transfer characteristics used for the CLVS.

When nnpfc_transfer_characteristics is not present in the neural-network post-filter characteristics SEI message, the value of nnpfc_transfer_characteristics is inferred to be equal to vui_transfer_characteristics.

nnpfc_matrix_coeffs has the same semantics as specified for the vui_matrix_coeffs syntax element, which are as follows: vui_matrix_coeffs describes the equations used in deriving luma and chroma signals from the green, blue, and red, or Y, Z, and X primaries. Its semantics are as specified for MatrixCoefficients in Rec. ITU-T H.273|ISO/IEC 23091-2. vui_matrix_coeffs shall not be equal to 0 unless both of the following conditions are true:

$BitDepth_C$ is equal to $BitDepth_Y$.

ChromaFormatIdc is equal to 3 (the 4:4:4 chroma format).

The specification of the use of vui_matrix_coeffs equal to 0 under all other conditions is reserved for future use by ITU-T|ISO/IEC.

vui_matrix_coeffs shall not be equal to 8 unless one of the following conditions is true:

When the vui_matrix_coeffs syntax element is not present, the value of vui_matrix_coeffs is inferred to be equal to 2 (unknown or unspecified or determined by other means not specified in this Specification).

Except as follows:

nnpfc_matrix_coeffs specifies the matrix coefficients of the picture resulting from applying the neural-network post-filter specified in the SEI message, rather than the matrix coefficients used for the CLVS.

When nnpfc_matrix_coeffs is not present in the neural-network post-filter characteristics SEI message, the value of nnpfc_matrix_coeffs is inferred to be equal to vui_matrix_coeffs.

The values allowed for nnpfc_matrix_coeffs are not constrained by the chroma format of the decoded video pictures that is indicated by the value of ChromaFormatIdc for the semantics of the VUI parameters.

When nnpfc_matrix_coeffs is equal to 0, nnpfc_out_order_idc shall not be equal to 1 or 3.

nnpfc_inp_order_idc indicates the method of ordering the sample arrays of a cropped decoded output picture as the input to the post-processing filter. Table 10 contains an informative description of nnpfc_inp_order_idc values. The semantics of nnpfc_inp_order_idc in the range of 0 to 3, inclusive, are specified in Table 12, which specifies a process for deriving the input tensors inputTensor for different values of nnpfc_inp_order_idc and a given vertical sample coordinate cTop and a horizontal sample coordinate cLeft specifying the top-left sample location for the patch of samples included in the input tensors. When the chroma format of the cropped decoded output picture is not 4:2:0, nnpfc_inp_order_idc shall not be equal to 3. The value of nnpfc_inp_order_idc shall be in the range of 0 to 255, inclusive. Values of nnpfc_inp_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_inp_order_idc.

TABLE 10

Figure 7:
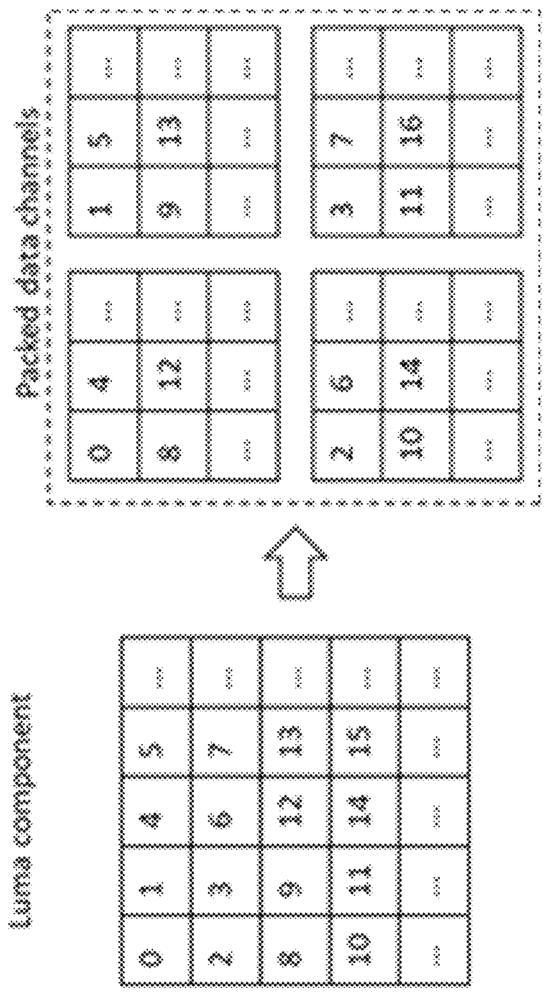
FIG. 7 is a conceptual drawing illustrating an example of packed data channels of a luma component according to one or more techniques of this disclosure.

| nnpfc_inp_order_idc | Description |
|---|---|
| 0 | If nnpfc_auxiliary_inp_idc is equal to 0, one luma matrix is present in the input tensor, thus the number of channels is 1. Otherwise, nnpfc_auxiliary_inp_idc is not equal to 0 and one luma matrix and one auxiliary input matrix are present, thus the number of channels is 2. |
| 1 | If nnpfc_auxiliary_inp_idc is equal to 0, two chroma matrices are present in the input tensor, thus the number of channels is 2. Otherwise, nnpfc_auxiliary_inp_idc is not equal to 0 and two chroma matrices and one auxiliary input matrix are present, thus the number of channels is 3. |
| 2 | If nnpfc_auxiliary_inp_idc is equal to 0, one luma and two chroma matrices are present in the input tensor, thus the number of channels is 3. Otherwise, nnpfc_auxiliary_inp_idc is not equal to 0 and one luma matrix, two chroma matrices and one auxiliary input matrix are present, thus the number of channels is 4. |
| 3 | If nnpfc_auxiliary_inp_idc is equal to 0, four luma matrices and two chroma matrices are present in the input tensor, thus the number of channels is 6. Otherwise, nnpfc_auxiliary_inp_idc is not equal to 0 and four luma matrices, two chroma matrices, and one auxiliary input matrix are present in the input tensor, thus the number of channels is 7. The luma channels are derived in an interleaved manner as illustrated in FIG. 7. This nnpfc_inp_order_idc can only be used when the chroma format is 4:2:0. |
| 4 . . . 255 | Reserved |

BitDepthC is equal to BitDepthY,

BitDepthC is equal to BitDepthY+1 and ChromaFormatIdc is equal to 3 (the 4:4:4 chroma format).

The specification of the use of vui_matrix_coeffs equal to 8 under all other conditions is reserved for future use by ITU-T|ISO/IEC.

A patch is a rectangular array of samples from a component (e.g., a luma or chroma component) of a picture.

nnpfc_constant_patch_size_flag equal to 0 specifies that the post-processing filter accepts any patch size that is a positive integer multiple of the patch size indicated by nnpfc_patch_width_minus1 and nnpfc_patch_height_minus1 as input.

When nnpfc_constant_patch_size_flag is equal to 0 the patch size width shall be less than or equal to CroppedWidth. When nnpfc_constant_patch_size_flag is equal to 0 the patch size height shall be less than or equal to CroppedHeight. nnpfc_constant_patch_size_flag equal to 1 specifies that the post-processing filter accepts exactly the patch size indicated by nnpfc_patch_width_minus1 and nnpfc_patch_height_minus1 as input.

nnpfc_patch_width_minus1+1, when nnpfc_constant_patch_size_flag equal to 1, specifies the horizontal sample counts of the patch size required for the input to the post-processing filter. When nnpfc_constant_patch_size_flag is equal to 0, any positive integer multiple of (nnpfc_patch_width_minus1+1) may be used as the horizontal sample counts of the patch size used for the input to the post-processing filter. The value of nnpfc_patch_width_minus1 shall be in the range of 0 to Min(32766, CroppedWidth−1), inclusive.

nnpfc_patch_height_minus1+1, when nnpfc_constant_patch_size_flag equal to 1, specifies the vertical sample counts of the patch size required for the input to the post-processing filter. When nnpfc_constant_patch_size_flag is equal to 0, any positive integer multiple of (nnpfc_patch_height_minus1+1) may be used as the vertical sample counts of the patch size used for the input to the post-processing filter. The value of nnpfc_patch_height_minus1 shall be in the range of 0 to Min(32766, CroppedHeight−1), inclusive.

nnpfc_overlap specifies the overlapping horizontal and vertical sample counts of adjacent input tensors of the post-processing filter. The value of nnpfc_overlap shall be in the range of 0 to 16383, inclusive.

The variables inpPatch Width, inpPatchHeight, outPatchWidth, outPatchHeight, horCScaling, verCScaling, outPatchCWidth, outPatchCHeight, and overlapSize are derived as follows:

inpPatchWidth=nnpfc_patch_width_minus1+1 inpPatchHeight=nnpfc_patch_height_minus1+1 outPatch Width=(nnpfc_pic_width_in_luma_samples*inpPatchWidth)/CroppedWidth outPatchHeight=(nnpfc_pic_height_in_luma_samples*inpPatchHeight)/CroppedHeight horCScaling=SubWidthC/outSub WidthC verCScaling=SubHeightC/outSubHeightC outPatchCWidth=outPatch Width*horCScaling outPatchCHeight=outPatchHeight*verCScaling overlapSize=nnpfc_overlap It is a requirement of bitstream conformance that outPatch Width*CroppedWidth shall be equal to nnpfc_pic_width_in_luma_samples*inpPatchWidth and outPatchHeight*CroppedHeight shall be equal to nnpfc_pic_height_in_luma_samples*inpPatchHeight.

nnpfc_padding_type specifies the process of padding when referencing sample locations outside the boundaries of the cropped decoded output picture as described in Table 11. The value of nnpfc_padding_type shall be in the range of 0 to 15, inclusive.

TABLE 11

| nnpfc__padding__type | Description |
|---|---|
| 0 | zero padding |
| 1 | replication padding |
| 2 | reflection padding |
| 3 | wrap-around padding |
| 4 | fixed padding |
| 5 . . . 15 | Reserved |

nnpfc_luma_padding_val specifies the luma value to be used for padding when nnpfc_padding_type is equal to 4.

nnpfc_cb_padding_val specifies the Cb value to be used for padding when nnpfc_padding_type is equal to 4.

nnpfc_cr_padding_val specifies the Cr value to be used for padding when nnpfc_padding_type is equal to 4.

The function InpSampleVal(y, x, picHeight, picWidth, croppedPic) with inputs being a vertical sample location y, a horizontal sample location x, a picture height picHeight, a picture width picWidth, and sample array croppedPic returns the value of sample Val derived as follows:

```
if( nnpfc__padding__type = = 0 )
  if( y < 0 | | x < 0 | | y >= picHeight | | x >= picWidth )
    sampleVal = 0
  else
    sampleVal = croppedPic[ x ][ y ]
else if( nnpfc__padding__type = = 1 )
  sampleVal = croppedPic[ Clip3( 0, picWidth − 1, x ) ][ Clip3( 0, picHeight − 1, y ) ]
else if( nnpfc__padding__type = = 2 )
  sampleVal = croppedPic[ Reflect( picWidth − 1, x ) ][ Reflect( picHeight − 1, y ) ]
else if( nnpfc__padding__type = = 3 )
  if( y >= 0 && y < picHeight )
    sampleVal = croppedPic[ Wrap( picWidth − 1, x ) ][ y ]
else if( nnpfc__padding__type = = 4 )
  if( y < 0 | | x < 0 | | y >= picHeight | | x >= picWidth )
    sampleVal[ 0 ] = nnpfc__luma__padding__val
      sampleVal[ 1 ] = nnpfc__cb__padding__val
    sampleVal[ 2 ] = nnpfc__cr__padding__val
  else
    sampleVal = croppedPic[ x ][ y ]
```

TABLE 12

| nnpfc__inp__order__idc | Process DeriveInputTensors( ) for deriving input tensors |
|---|---|
| 0 | for( yP = −overlapSize; yP < inpPatchHeight + overlapSize; yP++)<br>for( xP = −overlapSize; xP < inpPatchWidth + overlapSize; xP++ ) {<br>inpVal = InpY( InpSampleVal( cTop + yP, cLeft + xP, CroppedHeight,<br>CroppedWidth, CroppedYPic ) )<br>if( nnpfc__component__last__flag = = 0 )<br>inputTensor[ 0 ][ 0 ][ yP + overlapSize ][ xP + overlapSize ] = inpVal<br>else<br>inputTensor[ 0 ][ yP + overlapSize ][ xP + overlapSize ][ 0 ] = inpVal<br>if( nnpfc__auxiliary__inp__idc = = 1 )<br>if( nnpfc__component__last__flag = = 0 )<br>inputTensor[ 0 ][ 1 ][ yP + overlapSize ][ xP + overlapSize ] = $2^{( StrengthControlVal - 42 ) / 6}$<br>else<br>inputTensor[ 0 ][ yP + overlapSize ][ xP + overlapSize ][ 1 ] = $2^{( StrengthControlVal - 42 ) / 6}$<br>} |
| 1 | for( yP = −overlapSize; yP < inpPatchHeight + overlapSize; yP++)<br>for( xP = −overlapSize; xP < inpPatchWidth + overlapSize; xP++ ) {<br>inpCbVal = InpC( InpSampleVal( cTop + yP, cLeft + xP, CroppedHeight / SubHeightC,<br>CroppedWidth / SubWidthC, CroppedCbPic ) )<br>inpCrVal = InpC( InpSample Val( cTop + yP, cLeft + xP, CroppedHeight / SubHeightC,<br>CroppedWidth / SubWidthC, CroppedCrPic ) )<br>if( nnpfc__component__last__flag = = 0 ) {<br>inputTensor[ 0 ][ 0 ][ yP + overlapSize ][ xP + overlapSize ] = inpCbVal<br>inputTensor[ 0 ][ 1 ][ yP + overlapSize ][ xP + overlapSize ] = inpCrVal<br>} else {<br>inputTensor[ 0 ][ yP + overlapSize ][ xP + overlapSize ][ 0 ] = inpCbVal<br>inputTensor[ 0 ][ yP + overlapSize ][ xP + overlapSize ][ 1 ] = inpCrVal<br>}<br>if(nnpfc__auxiliary__inp__idc = = 1)<br>if( nnpfc__component__last__flag = = 0 )<br>inputTensor[ 0 ][ 2 ][ yP + overlapSize ][ xP + overlapSize ] = $2^{( StrengthControlVal - 42 ) / 6}$<br>else<br>inputTensor[ 0 ][ yP + overlapSize ][ xP + overlapSize ][ 2 ] = $2^{( StrengthControlVal - 42 ) / 6}$<br>} |
| 2 | for( yP = −overlapSize; yP < inpPatchHeight + overlapSize; yP++)<br>for( xP = −overlapSize; xP < inpPatchWidth + overlapSize; xP++ ) {<br>yY = cTop + yP<br>xY = cLeft + xP<br>yC = yY / SubHeightC<br>xC = xY / SubWidthC<br>inpYVal = InpY( InpSampleVal( yY, xY, CroppedHeight,<br>CroppedWidth, CroppedYPic ) )<br>inpCbVal = InpC( InpSampleVal( yC, xC, CroppedHeight / SubHeightC,<br>CroppedWidth / SubWidthC, CroppedCbPic ) )<br>inpCrVal = InpC( InpSampleVal( yC, xC, CroppedHeight / SubHeightC,<br>CroppedWidth / SubWidthC, CroppedCrPic ) )<br>if( nnpfc__component__last__flag = = 0 ) {<br>inputTensor[ 0 ][ 0 ][ yP + overlapSize ][ xP + overlapSize ] = inpYVal<br>inputTensor[ 0 ][ 1 ][ yP + overlapSize ][ xP + overlapSize ] = inpCbVal<br>inputTensor[ 0 ][ 2 ][ yP + overlapSize ][ xP + overlapSize ] = inpCrVal<br>} else {<br>inputTensor[ 0 ][ yP + overlapSize ][ xP + overlapSize ][ 0 ] = inpYVal<br>inputTensor[ 0 ][ yP + overlapSize ][ xP + overlapSize ][ 1 ] = inpCbVal<br>inputTensor[ 0 ][ yP + overlapSize ][ xP + overlapSize ][ 2 ] = inpCrVal<br>}<br>if(nnpfc__auxiliary__inp__idc = = 1)<br>if( nnpfc__component__last__flag = = 0 )<br>inputTensor[ 0 ][ 3 ][ yP + overlapSize ][ xP + overlapSize ] = $2^{( StrengthControlVal - 42 ) / 6}$<br>else<br>inputTensor[ 0 ][ yP + overlapSize ][ xP + overlapSize ][ 3 ] = $2^{( StrengthControlVal - 42 ) / 6}$<br>} |
| 3 | for( yP = −overlapSize; yP < inpPatchHeight + overlapSize; yP++)<br>for( xP = −overlapSize; xP < inpPatchWidth + overlapSize; xP++ ) {<br>yTL = cTop + yP * 2<br>xTL = cLeft + xP * 2<br>yBR = yTL + 1<br>xBR = xTL + 1<br>yC = cTop / 2 + yP<br>xC = cLeft / 2 + xP<br>inpTLVal = InpY( InpSample Val( yTL, xTL, CroppedHeight,<br>CroppedWidth, CroppedYPic ) )<br>inpTRVal = InpY( InpSample Val( yTL, xBR, CroppedHeight,<br>CroppedWidth, CroppedYPic ) )<br>inpBLVal = InpY( InpSample Val( yBR, xTL, CroppedHeight,<br>CroppedWidth, CroppedYPic ) )<br>inpBRVal = InpY( InpSample Val( yBR, xBR, CroppedHeight,<br>CroppedWidth, CroppedYPic ) )<br>inpCbVal = InpC( InpSampleVal( yC, xC, CroppedHeight / 2,<br>CroppedWidth / 2, CroppedCbPic ) ) |

TABLE 12-continued

| nnpfc_inp_order_idc | Process DeriveInputTensors( ) for deriving input tensors |
|---|---|
| | inpCrVal = InpC( InpSampleVal( yC, xC, CroppedHeight / 2,<br>CroppedWidth / 2, CroppedCrPic ) )<br>if( nnpfc_component_last_flag = = 0 ) {<br>inputTensor[ 0 ][ 0 ][ yP + overlapSize ][ xP + overlapSize ] = inpTLVal<br>inputTensor[ 0 ][ 1 ][ yP + overlapSize ][ xP + overlapSize ] = inpTRVal<br>inputTensor[ 0 ][ 2 ][ yP + overlapSize ][ xP + overlapSize ] = inpBLVal<br>inputTensor[ 0 ][ 3 ][ yP + overlapSize ][ xP + overlapSize ] = inpBRVal<br>inputTensor[ 0 ][ 4 ][ yP + overlapSize ][ xP + overlapSize ] = inpCbVal<br>inputTensor[ 0 ][ 5 ][ yP + overlapSize ][ xP + overlapSize ] = inpCrVal<br>inputTensor[ 0 ][ 6 ][ yP + overlapSize ][ xP + overlapSize ] = $2^{( StrengthControlVal - 42 ) / 6}$<br>} else {<br>inputTensor[ 0 ][ yP + overlapSize ][ xP + overlapSize ][ 0 ] = inpTLVal<br>inputTensor[ 0 ][ yP + overlapSize ][ xP + overlapSize ][ 1 ] = inpTRVal<br>inputTensor[ 0 ][ yP + overlapSize ][ xP + overlapSize ][ 2 ] = inpBLVal<br>inputTensor[ 0 ][ yP + overlapSize ][ xP + overlapSize ][ 3 ] = inpBRVal<br>inputTensor[ 0 ][ yP + overlapSize ][ xP + overlapSize ][ 4 ] = inpCbVal<br>inputTensor[ 0 ][ yP + overlapSize ][ xP + overlapSize ][ 5 ] = inpCrVal }<br>if(nnpfc_auxiliary_inp_idc = = 1)<br>if( nnpfc_component_last_flag = = 0 )<br>inputTensor[ 0 ][ 6 ][ yP + overlapSize ][ xP + overlapSize ] = $2^{( StrengthControlVal - 42 ) / 6}$<br>else<br>inputTensor[ 0 ][ yP + overlapSize ][ xP + overlapSize ][ 6 ] = $2^{( StrengthControlVal - 42 ) / 6}$<br>} |
| 4 . . . 255 | Reserved |

nnpfc_complexity_idc greater than 0 specifies that one or more syntax elements that indicate the complexity of the post-processing filter associated with the nnpfc_id may be present. nnpfc_complexity_idc equal to 0 specifies that no syntax elements that indicate the complexity of the post-processing filter associated with the nnpfc_id are present. The value nnpfc_complexity_idc shall be in the range of 0 to 255, inclusive. Values of nnpfc_complexity_idc greater than 1 are reserved for future specification by ITU-T|ISO/IEC and shall not be present in bitstreams conforming to this version of this Specification. Decoders conforming to this version of this Specification shall ignore SEI messages that contain reserved values of nnpfc_complexity_idc.

nnpfc_out_format_flag equal to 0 indicates that the sample values output by the post-processing filter are real numbers and the functions OutY( ) and OutC( ) for converting luma sample values and chroma sample values, respectively, output by the post-processing, to integer values at bit depths $BitDepth_Y$ and $BitDepth_C$, respectively, are specified as follows:

$$OutY(x) = \mathrm{Clip3}(0, (1 << \mathrm{BitDepth}_Y) - 1, \mathrm{Round}(x * ((1 << \mathrm{BitDepth}_Y) - 1)))$$

$$OutC(x) = \mathrm{Clip3}(0, (1 << \mathrm{BitDepth}_C) - 1, \mathrm{Round}(x * ((1 << \mathrm{BitDepth}_C) - 1)))$$

nnpfc_out_format_flag equal to 1 indicates that the sample values output by the post-processing filter are unsigned integer numbers and the functions OutY( ) and OutC( ) are specified as follows:

```
shiftY = outTensorBitDepth − BitDepthY
if( shiftY > 0 )
  OutY( x ) = Clip3( 0, ( 1 << BitDepthY ) − 1, ( x + ( 1 << ( shiftY − 1 ) ) ) >> shiftY ) )
else
  OutY( x ) = x << ( BitDepthY − outTensorBitDepth )
shiftC = outTensorBitDepth − BitDepthC
if( shiftC > 0 )
  OutC( x )= Clip3( 0, ( 1 << BitDepthC ) − 1, ( x + ( 1 << ( shiftC − 1 ) ) ) >> shiftC )
else
  OutC( x ) = x << ( BitDepthC − outTensorBitDepth )
```

The variable outTensorBitDepth is derived from the syntax element nnpfc_out_tensor_bitdepth_minus8 as described below.

nnpfc_out_tensor_bitdepth_minus8 plus 8 specifies the bit depth of sample values in the output integer tensor. The value of outTensorBitDepth is derived as follows:

$$outTensorBitDepth = \mathrm{nnpfc\_out\_tensor\_bitdepth\_minus8} + 8$$

It is a requirement of bitstream conformance that the value of nnpfc_out_tensor_bitdepth_minus8 shall be in the range of 0 to 24, inclusive.

nnpfc_out_order_idc indicates the output order of samples resulting from the post-processing filter. Table 13 contains an informative description of nnpfc_out_order_idc values. The semantics of nnpfc_out_order_idc in the range of 0 to 3, inclusive, are specified in Table 14, which specifies a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc shall not be equal to 3. The value of nnpfc_out_order_idc shall be in the range of 0 to 255, inclusive. Values of nnpfc_out_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_out_order_idc.

TABLE 13

| nnpfc_out_order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idccan only be used when the chroma format is 4:2:0. |
| 4 . . . 255 | Reserved |

TABLE 14

| nnpfc_out_order_idc | Process StoreOutputTensors( ) for deriving sample values in the filtered picture from the output tensors |
|---|---|
| 0 | for( yP = 0; yP < outPatchHeight; yP++)<br>for( xP = 0; xP < outPatch Width; xP++ ) {<br>yY = cTop * outPatchHeight / inpPatchHeight + yP<br>xY = cLeft * outPatchWidth / inpPatchWidth + xP<br>if ( yY < nnpfc_pic_height_in_luma_samples && xY < nnpfc_pic_width_in_luma_samples )<br>if( nnpfc_component_last_flag = = 0 )<br>FilteredYPic[ xY ][yY ] = OutY( outputTensor[ 0 ][ 0 ][ yP ][ xP ] )<br>else<br>FilteredYPic[ xY ][ yY ] = OutY( outputTensor[ 0 ][ yP ][ xP ][ 0 ] )<br>} |
| 1 | for( yP = 0; yP < outPatchCHeight; yP++)<br>for( xP = 0; xP < outPatchCWidth; xP++ ) {<br>xSrc = cLeft * horCScaling + xP<br>ySrc = cTop * verCScaling + yP<br>if ( ySrc < nnpfc_pic_height_in_luma_samples / outSubHeightC &&<br>xSrc < nnpfc_pic_width_in_luma_samples / outSubWidthC )<br>if( nnpfc_component_last_flag = = 0 ) {<br>FilteredCbPic[ xSrc ][ ySrc ] = OutC( outputTensor[ 0 ][ 0 ][ yP ][ xP ] )<br>FilteredCrPic[ xSrc ][ ySrc ] = OutC( outputTensor[ 0 ][ 1 ][ yP ][ xP ] )<br>} else {<br>FilteredCbPic[ xSrc ][ ySrc ] = OutC( outputTensor[ 0 ][ yP ][ xP ][ 0 ] )<br>FilteredCrPic[ xSrc ][ ySrc ] = OutC( outputTensor[ 0 ][ yP ][ xP ][ 1 ] )<br>}<br>} |
| 2 | for( yP = 0; yP < outPatchHeight; yP++)<br>for( xP = 0; xP < outPatchWidth; xP++ ) {<br>yY = cTop * outPatchHeight / inpPatchHeight + yP<br>xY = cLeft * outPatchWidth / inpPatchWidth + xP<br>yC = yY / outSubHeightC<br>xC = xY / outSubWidthC<br>yPc = ( yP / outSubHeightC ) * outSubHeightC<br>xPc = ( xP / outSubWidthC ) * outSubWidthC<br>if ( yY < nnpfc_pic_height_in_luma_samples && xY < nnpfc_pic_width_in_luma_samples)<br>if( nnpfc_component_last_flag = = 0) {<br>FilteredYPic[ xY ][ yY ] = OutY( outputTensor[ 0 ][ 0 ][ yP ][ xP ] )<br>FilteredCbPic[ xC ][ yC ] = OutC( outputTensor[ 0 ][ 1 ][ yPc ][ xPc ] )<br>FilteredCrPic[ xC ][ yC ] = OutC( outputTensor[ 0 ][ 2 ][ yPc ][ xPc ] )<br>} else {<br>FilteredYPic[ xY ][ yY ] = OutY( outputTensor[ 0 ][ yP ][ xP ][ 0 ] )<br>FilteredCbPic[ xC ][ yC ] = OutC( outputTensor[ 0 ][ yPc ][ xPc ][ 1 ] )<br>FilteredCrPic[ xC ][ yC ] = OutC( outputTensor[ 0 ][ yPc ][ xPc ][ 2 ] )<br>}<br>} |
| 3 | for( yP = 0; yP < outPatchHeight; yP++ )<br>for( xP = 0; xP < outPatchWidth; xP++ ) {<br>ySrc = cTop / 2 * outPatchHeight / inpPatchHeight + yP<br>xSrc = cLeft / 2 * outPatchWidth / inpPatchWidth + xP<br>if ( ySrc < nnpfc_pic_height_in_luma_samples / 2 &&<br>xSrc < nnpfc_pic_width_in_luma_samples / 2 )<br>if( nnpfc_component_last_flag = = 0 ) {<br>FilteredYPic[ xSrc * 2 ][ ySrc * 2 ] = OutY( outputTensor[ 0 ][ 0 ][ yP ][ xP ] )<br>FilteredYPic[ xSrc * 2 + 1 ][ ySrc * 2 ] = OutY( outputTensor[ 0 ][ 1 ][ yP ][ xP ] )<br>FilteredYPic[ xSrc * 2 ][ ySrc * 2 + 1 ] = OutY( outputTensor[ 0 ][ 2 ][ yP ][ xP ] ) |

TABLE 14-continued

| nnpfc_out_order_idc | Process StoreOutputTensors( ) for deriving sample values in the filtered picture from the output tensors |
|---|---|
| | FilteredYPic[ xSrc * 2 + 1][ ySrc * 2 + 1 ] = OutY( outputTensor[ 0 ][ 3 ][ yP ][ xP ] )<br>FilteredCbPic[ xSrc ][ ySrc ] = OutC( outputTensor[ 0 ][ 4 ][ yP ][ xP ] )<br>FilteredCrPic[ xSrc ][ ySrc ] = OutC( outputTensor[ 0 ][ 5 ][ yP ][ xP ] )<br>} else {<br>FilteredYPic[ xSrc * 2 ][ ySrc * 2 ] = OutY( outputTensor[ 0 ][ yP ][ xP ][ 0 ] )<br>FilteredYPic[ xSrc * 2 + 1 ][ ySrc * 2 ] = OutY( outputTensor[ 0 ][ yP ][ xP ][ 1 ] )<br>FilteredYPic[ xSrc * 2 ][ ySrc * 2 + 1 ] = OutY( outputTensor[ 0 ][ yP ][ xP ][ 2 ] )<br>FilteredYPic[ xSrc * 2 + 1][ ySrc * 2 + 1 ] = OutY( outputTensor[ 0 ][ yP ][ xP ][ 3 ] )<br>FilteredCbPic[ xSrc ][ ySrc ] = OutC( outputTensor[ 0 ][ yP ][ xP ][ 4 ] )<br>FilteredCrPic[ xSrc ][ ySrc ] = OutC( outputTensor[ 0 ][ yP ][ xP ][ 5 ] )<br>}<br>} |
| 4 . . . 255 | Reserved |

A base post-processing filter for a cropped decoded output picture picA is the filter that is identified by the first neural-network post-filter characteristics SEI message, in decoding order, that has a particular nnpfc_id value within a CLVS.

If there is another neural-network post-filter characteristics SEI message that has the same nnpfc_id value, has nnpfc_mode_idc equal to 1, has different content than the neural-network post-filter characteristics SEI message that defines the base post-processing filter, and pertains to the picture picA, the base post-processing filter is updated by decoding the ISO/IEC 15938-17 bitstream in that neural-network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter PostProcessingFilter( ) to generate the filtered picture, which contains Y. Cb. and Cr sample arrays FilteredYPic. FilteredCbPic, and FilteredCrPic, respectively, as indicated by nnpfc_out_order_idc.

```
if( nnpfc_inp_order_idc = = 0 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1 )
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 2 )
  for( cTop = 0; cTop < CroppedHeight; cTop += inpPatchHeight)
    for( cLeft = 0; cLeft < CroppedWidth; cLeft += inpPatchWidth) {
      DeriveInputTensors( )
      outputTensor = PostProcessingFilter( inputTensor )
      StoreOutputTensors( )
    }
else if( nnpfc_inp_order_idc = = 3 )
  for( cTop = 0; cTop < CroppedHeight; cTop += inpPatchHeight * 2 )
    for( cLeft = 0; cLeft < CroppedWidth; cLeft += inpPatchWidth * 2 ) {
      DeriveInputTensors( )
      outputTensor = PostProcessingFilter( inputTensor )
      StoreOutputTensors( )
    }
```

nnpfc_reserved_zero_bit shall be equal to 0.

nnpfc_uri_tag[i] contains a NULL-terminated UTF-8 character string specifying a tag URI. The UTF-8 character string shall contain a URI, with syntax and semantics as specified in IETF RFC 4151, uniquely identifying the format and associated information about the neural network used as the post-processing filter specified by nnrpf_uri[i] values.

NOTE—nnrpf_uri_tag[i] elements represent a 'tag' URI, which enables uniquely identifying the format of neural network data specified by nnrpf_uri[i] values without needing a central registration authority.

nnpfc_uri[i] shall contain a NULL-terminated UTF-8 character string, as specified in ISO/IEC 10646. The UTF-8 character string shall contain a URI, with syntax and semantics as specified in IETF Internet Standard 66, identifying the neural network information (e.g. data representation) used as the post-processing filter.

nnpfc_payload_byte[i] contains the i-th byte of a bitstream conforming to ISO/IEC 15938-17. The byte sequence nnpfc_ payload_byte[i] for all present values of i shall be a complete bitstream that conforms to ISO/IEC 15938-17.

nnpfc_parameter_type_idc equal to 0 indicates that the neural network uses only integer parameters. nnpfc_parameter_type_flag equal to 1 indicates that the neural network may use floating point or integer parameters. nnpfc_parameter_type_idc equal to 2 indicates that the neural network uses only binary parameters. nnpfc_parameter_type_idc equal to 3 is reserved for future specification by ITU-T|ISO/IEC and shall not be present in bitstreams conforming to this version of this Specification. Decoders conforming to this version of this Specification shall ignore SEI messages that contain reserved value of nnpfc_parameter_type_idc.

nnpfc_log 2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log 2_parameter_bit_length_minus3 is not present the neural network does not use parameters of bit length greater than 1.

nnpfc_num_parameters_idc indicates the maximum number of neural network parameters for the post processing filter in units of a power of 2048. nnpfc_num_parameters_idc equal to 0 indicates that the maximum number of neural network parameters is not specified. The value nnpfc_num_parameters_idc shall be in the range of 0 to 52, inclusive. Values of nnpfc_num_parameters_idc greater than 52 are reserved for future specification by ITU-T|ISO/IEC and shall not be present in bitstreams conforming to this version of this Specification. Decoders conforming to this version of this Specification shall ignore SEI messages that contain reserved values of nnpfc_num_parameters_idc.

If the value of nnpfc_num_parameters_idc is greater than zero, the variable maxNumParameters is derived as follows:

$$maxNumParameters = (2048 \ll \text{nnpfc\_num\_parameters\_idc}) - 1$$

It is a requirement of bitstream conformance that the number of neural network parameters of the post-processing filter shall be less than or equal to maxNumParameters.

nnpfc_num_kmac_operations_idc greater than 0 specifies that the maximum number of multiply-accumulate operations per sample of the post-processing filter is less than or equal to nnpfc_num_kmac_operations_idc*1000. nnpfc_num_kmac_operations_idc equal to 0 specifies that the maximum number of multiply-accumulate operations of the network is not specified. The value of nnpfc_num_kmac_operations_idc shall be in the range of 0 to $2^{32}$-1, inclusive.

Table 15 illustrates the syntax of the Neural-network post-filter activation SEI message provided in JVET-AA2006.

TABLE 15

| | Descriptor |
|---|---|
| nn_post_filter_activation( payloadSize ) { | |
| nnpfa_id | ue(v) |
| } | |

With respect to Table 15, JVET-AA2006 provides the following semantics.

This SEI message specifies the neural-network post-processing filter that may be used for post-processing filtering for the current picture.

The neural-network post-processing filter activation SEI message persists only for the current picture.

NOTE—There can be several neural-network post-processing filter activation SEI messages present for the same picture, for example, when the post-processing filters are meant for different purposes or filter different colour components.

nnpfa_id specifies that the neural-network post-processing filter specified by one or more neural-network post-processing filter characteristics SEI messages that pertain to the current picture and have nnpfc_id equal to nnfpa_id may be used for post-processing filtering for the current picture.

Further, it should be noted that in some cases, with respect to use of a NN post-filter characteristics SEI message:

For purposes of interpretation of the neural-network post-filter characteristics SEI message, the following variables are specified:

InpPicWidthInLumaSamples is set equal to pps_pic_width_in_luma_samples−SubWidthC*(pps_conf_win_left_offset+pps_conf win_right_offset).

InpPicHeightInLumaSamples is set equal to pps_pic_height_in_luma_samples−SubHeightC*(pps_conf_win_top_offset+pps_conf win_bottom_offset).

The variables CroppedYPic[y][x] and chroma sample arrays CroppedCbPic[y][x] and CroppedCrPic[y][x], when present, are set to be the 2-dimensional arrays of decoded sample values of the 0th, 1st, and 2nd component, respectively, of the cropped decoded output picture to which the neural-network post-filter characteristics SEI message applies.

$BitDepth_Y$ and $BitDepth_C$ are both set equal to BitDepth.

InpSubWidthC is set equal to SubWidthC.

InpSubHeightC is set equal to SubHeightC.

SliceQPY is set equal to SliceQpy

When a neural-network post-filter characteristics SEI message with the same nnpfc_id and different content are present in the same picture unit, both neural-network post-filter characteristics SEI messages shall be present in the same SEI NAL unit.

The Neural-network post-filter characteristics SEI message message provided in JVET-AA2006 may be less than ideal. In particular, for example, the signaling in JVET-AA2006 may be insufficient for signaling neural-network post-filter parameters related to picture interpolation for frame rate upsampling. According to the techniques described herein, additional syntax and semantics are provided for indicating neural-network post-filter parameters, including for example, for generating interpolated pictures for frame rate upsampling.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
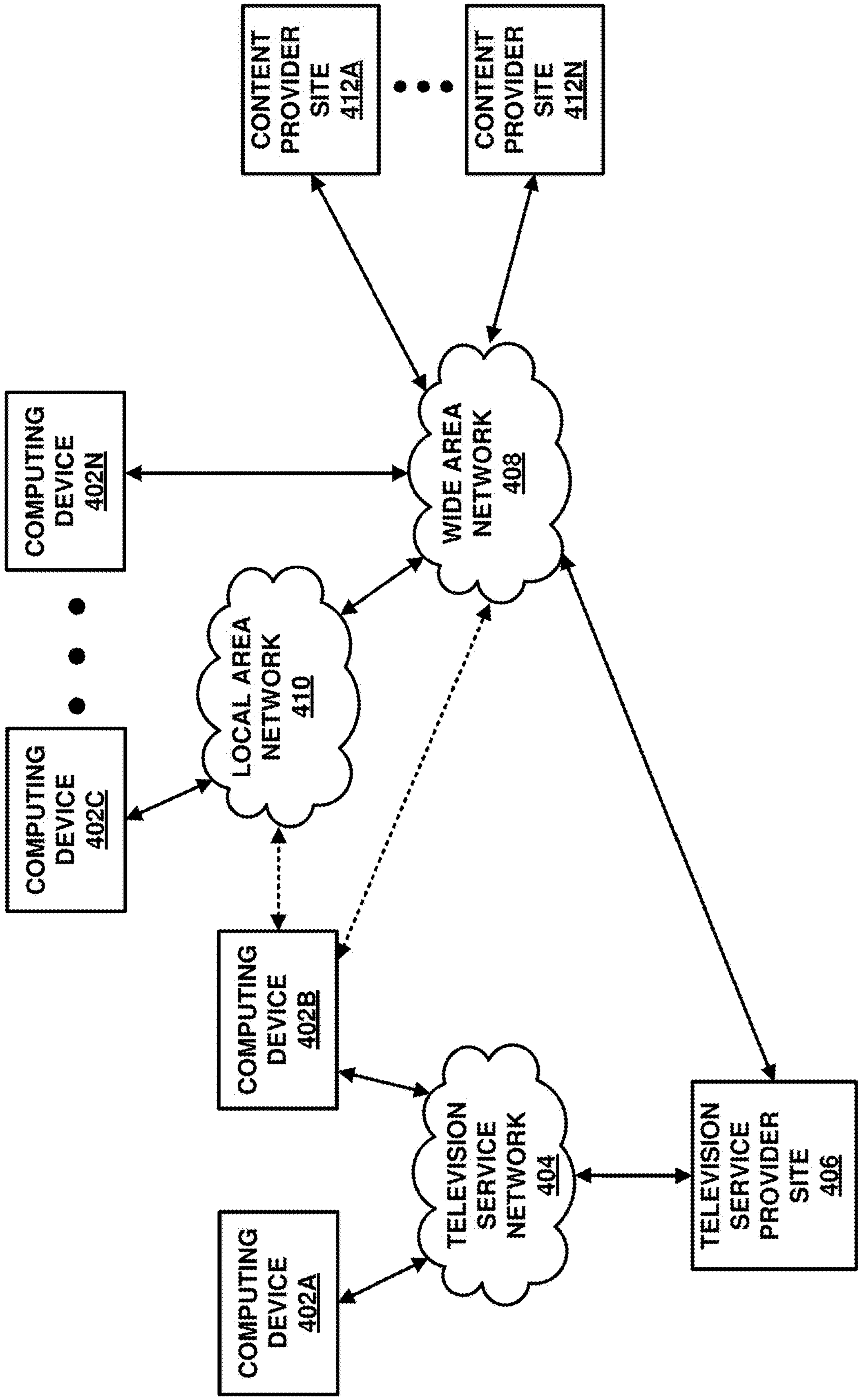
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, “smart” phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
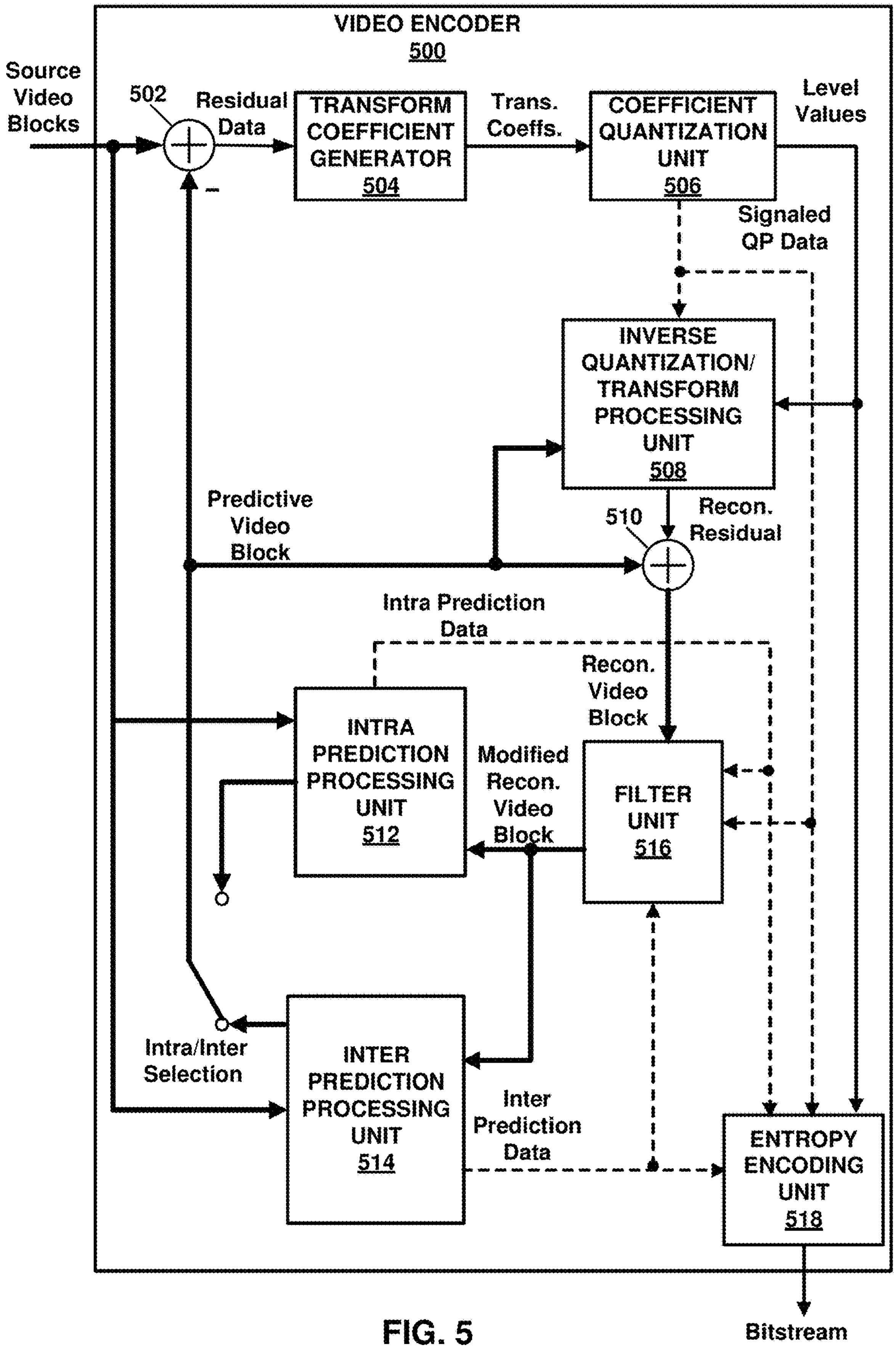
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the signaling provided in JVET-AA2006 may be insufficient. In particular, JVET-AA2006 does not provide sufficient signaling for picture interpolation. According to the techniques herein, signalling is provided for picture interpolation and frame rate upsampling. In one example, according to the techniques herein, syntax elements are provided in a Neural-network post-filter characteristics SEI message that indicate how multiple pictures are concatenated. In one example, according to the techniques herein, syntax elements are provided in a Neural-network post-filter characteristics SEI message that indicate if normalization is performed. In one example, according to the techniques herein, syntax elements are provided in a Neural-network post-filter characteristics SEI message that indicate if input data is manipulated according to standarized data. Tables 16, 17, and 18 illustrate syntax of an example Neural-network post-filter characteristics SEI message according to the techniques herein.

TABLE 16

| | Descriptor |
|---|---|
| nn_post_filter_characteristics( payloadSize ) { | |
| nnpfc_id | ue(v) |
| nnpfc_mode_idc | ue(v) |
| nnpfc_purpose_and_formatting_flag | u(1) |
| if( nnpfc_purpose_and_formatting_flag ) { | |
| nnpfc_purpose | ue(v) |
| if( nnpfc_purpose = = 2 \| \| nnpfc_purpose = = 4 ) | |
| nnpfc_out_sub_c_flag | u(1) |
| if (nnpfc_purpose = = 5) { | |
| nnpfc_number_of_input_pictures_minus1 | ue(v) |
| nnpfc_number_of_interpolated_pictures_minus1 | ue(v) |
| if (nnpfc_number_of_input_pictures_minus1 > 0) | |
| nnpfc_input_extra_dimension | u(2) |
| if (nnpfc_number_of_interpolated_pictures_minus1 > 0) | |
| nnpfc_output_extra_dimension | u(2) |
| } | |
| if( nnpfc_purpose = = 3 \| \| nnpfc_purpose = = 4 ) { | |
| nnpfc_pic_width_in_luma_samples | ue(v) |
| nnpfc_pic_height_in_luma_samples | ue(v) |
| } | |
| /* input and output formatting */ | |
| nnpfc_component_last_flag | u(1) |
| nnpfc_inp_format_flag | u(1) |

TABLE 16-continued

| | Descriptor |
|---|---|
| if(!nnpfc_inp_format_flag) | |
| nnpfc_inp_normalization_range_flag | u(1) |
| nnpfc_inp_standardization_flag | u(1) |
| if(nnpfc_inp_format_flag==0) { | |
| if (nnpfc_inp_standardization_flag = = 1 ) { | |
| nnpfc_luma_mean_val | ue(v) |
| nnpfc_cb_mean_val | ue(v) |
| nnpfc_cr_mean_val | ue(v) |
| nnpfc_luma_std_val | ue(v) |
| nnpfc_cb_std_val | ue(v) |
| nnpfc_cr_std_val | ue(v) |
| } | |
| } | |
| if( nnpfc_inp_format_flag = = 1 ) | |
| nnpfc_inp_tensor_bitdepth_minus8 | ue(v) |
| nnpfc_inp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format_flag | u(1) |
| if(!nnpfc_out_format_flag) | |
| nnpfc_out_normalization_range_flag | u(1) |
| nnpfc_out_standardization_flag | u(1) |
| if( nnpfc_out_format_flag = = 1 ) | |
| nnpfc_out_tensor_bitdepth_minus8 | ue(v) |
| nnpfc_out_order_idc | ue(v) |
| nnpfc_constant_patch_size_flag | u(1) |
| nnpfc_patch_width_minus1 | ue(v) |
| nnpfc_patch_height_minus1 | ue(v) |
| nnpfc_overlap | ue(v) |
| nnpfc_padding_type | ue(v) |
| if( nnpfc_padding_type = = 4 ){ | |
| nnpfc_luma_padding_val | ue(v) |
| nnpfc_cb_padding_val | ue(v) |
| nnpfc_cr_padding_val | ue(v) |
| } | |
| nnpfc_complexity_idc | ue(v) |
| if( nnpfc_complexity_idc > 0 ) | |
| nnpfc_complexity_element( nnpfc_complexity_idc ) | |
| if( nnpfc_mode_idc = = 2 ) { | |
| while( !byte_aligned( ) ) | |
| nnpfc_reserved_zero_bit | u(1) |
| nnpfc_uri_tag[ i ] | st(v) |
| nnpfc_uri[ i ] | st(v) |
| } | |
| } | |
| /* filter specified or updated by ISO/IEC 15938-17 bitstream */ | |
| if( nnpfc_mode_idc = = 1 ) { | |
| while( !byte_aligned( ) ) | |
| nnpfc_reserved_zero_bit | u(1) |
| for( i = 0; more_data_in_payload( ); i++ ) | |
| nnpfc_payload_byte[ i ] | b(8) |
| } | |
| } | |

TABLE 17

| | Descriptor |
|---|---|
| nn_post_filter_characteristics( payloadSize ) { | |
| nnpfc_id | ue(v) |
| nnpfc_mode_idc | ue(v) |
| nnpfc_purpose_and_formatting_flag | u(1) |
| if( nnpfc_purpose_and_formatting_flag ) { | |
| nnpfc_purpose | ue(v) |
| if( nnpfc_purpose = = 2 \| \| nnpfc_purpose = = 4 ) | |
| nnpfc_out_sub_c_flag | u(1) |
| if( nnpfc_purpose = = 3 \| \| nnpfc_purpose = = 4 ) { | |

TABLE 17-continued

| | Descriptor |
|---|---|
| nnpfc_pic_width_in_luma_samples | ue(v) |
| nnpfc_pic_height_in_luma_samples | ue(v) |
| } | |
| /* input and output formatting */ | |
| nnpfc_component_last_flag | u(1) |
| nnpfc_inp_format_flag | u(1) |
| if (nnpfc_purpose = = 5) { | |
| nnpfc_number_of_input_pictures_minus1 | ue(v) |
| nnpfc_number_of_interpolated_pictures_minus1 | ue(v) |
| if (nnpfc_number_of_input_pictures_minus1 > 0) | |
| nnpfc_input_extra_dimension | u(2) |
| if (nnpfc_number_of_interpolated_pictures_minus1 > 0) | |
| nnpfc_output_extra_dimension | u(2) |
| } | |
| if(!nnpfc_inp_format_flag) | |
| nnpfc_inp_normalization_range_flag | u(1) |
| nnpfc_inp_standardization_flag | u(1) |
| if(nnpfc_inp_format_flag==0) { | |
| if (nnpfc_inp_standardization_flag = = 1 ) { | |
| nnpfc_luma_mean_val | ue(v) |
| nnpfc_cb_mean_val | ue(v) |
| nnpfc_cr_mean_val | ue(v) |
| nnpfc_luma_std_val | ue(v) |
| nnpfc_cb_std_val | ue(v) |
| nnpfc_cr_std_val | ue(v) |
| } | |
| } | |
| if( nnpfc_inp_format_flag = = 1 ) | |
| nnpfc_inp_tensor_bitdepth_minus8 | ue(v) |
| nnpfc_inp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format_flag | u(1) |
| if(!nnpfc_out_format_flag) | |
| nnpfc_out_normalization_range_flag | u(1) |
| nnpfc_out_standardization_flag | u(1) |
| if( nnpfc_out_format_flag = = 1 ) | |
| nnpfc_out_tensor_bitdepth_minus8 | ue(v) |
| nnpfc_out_order_idc | ue(v) |
| nnpfc_constant_patch_size_flag | u(1) |
| nnpfc_patch_width_minus1 | ue(v) |
| nnpfc_patch_height_minus1 | ue(v) |
| nnpfc_overlap | ue(v) |
| nnpfc_padding_type | ue(v) |
| if( nnpfc_padding_type = = 4 ){ | |
| nnpfc_luma_padding_val | ue(v) |
| nnpfc_cb_padding_val | ue(v) |
| nnpfc_cr_padding_val | ue(v) |
| } | |
| nnpfc_complexity_idc | ue(v) |
| if( nnpfc_complexity_idc > 0 ) | |
| nnpfc_complexity_element( nnpfc_complexity_idc ) | |
| if( nnpfc_mode_idc = = 2 ) { | |
| while( !byte_aligned( ) ) | |
| nnpfc_reserved_zero_bit | u(1) |
| nnpfc_uri_tag[ i ] | st(v) |
| nnpfc_uri[ i ] | st(v) |
| } | |
| } | |
| /* filter specified or updated by ISO/IEC 15938-17 bitstream */ | |
| if( nnpfc_mode_idc = = 1 ) { | |
| while( !byte_aligned( ) ) | |
| nnpfc_reserved_zero_bit | u(1) |
| for( i = 0; more_data_in_payload( ); i++ ) | |
| nnpfc_payload_byte[ i ] | b(8) |
| } | |
| } | |

TABLE 18

| | Descriptor |
|---|---|
| nn_post_filter_characteristics( payloadSize ) { | |
| nnpfc_id | ue(v) |
| nnpfc_mode_idc | ue(v) |
| nnpfc_purpose_and_formatting_flag | u(1) |
| if( nnpfc_purpose_and_formatting_flag ) { | |
| nnpfc_purpose | ue(v) |
| if( nnpfc_purpose = = 2 \| \| nnpfc_purpose = = 4 ) | |
| nnpfc_out_sub_c_flag | u(1) |
| if( nnpfc_purpose = = 3 \| \| nnpfc_purpose = = 4 ) { | |
| nnpfc_pic_width_in_luma_samples | ue(v) |
| nnpfc_pic_height_in_luma_samples | ue(v) |
| } | |
| /* input and output formatting */ | |
| nnpfc_component_last_flag | u(1) |
| nnpfc_inp_format_flag | u(1) |
| if(!nnpfc_inp_format_flag) | |
| nnpfc_inp_normalization_range_flag | u(1) |
| if( nnpfc_inp_format_flag = = 1 ) | |
| nnpfc_inp_tensor_bitdepth_minus8 | ue(v) |
| nnpfc_inp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format_flag | u(1) |
| if (nnpfc_purpose = = 5) { | |
| nnpfc_number_of_input_pictures_minus1 | ue(v) |
| nnpfc_number_of_interpolated_pictures_minus1 | ue(v) |
| if (nnpfc_number_of_input_pictures_minus1 > 0) | |
| nnpfc_input_extra_dimension | u(2) |
| if (nnpfc_number_of_interpolated_pictures_minus1 > 0) | |
| nnpfc_output_extra_dimension | u(2) |
| } | |
| if(!nnpfc_out_format_flag) | |
| nnpfc_out_normalization_range_flag | u(1) |
| nnpfc_inp_standardization_flag | u(1) |
| if(nnpfc_inp_format_flag==0) { | |
| if (nnpfc_inp_standardization_flag = = 1 ) { | |
| nnpfc_luma_mean_val | ue(v) |
| nnpfc_cb_mean_val | ue(v) |
| nnpfc_cr_mean_val | ue(v) |
| nnpfc_luma_std_val | ue(v) |
| nnpfc_cb_std_val | ue(v) |
| nnpfc_cr_std_val | ue(v) |
| } | |
| } | |
| nnpfc_out_standardization_flag | u(1) |
| if( nnpfc_out_format_flag = = 1 ) | |
| nnpfc_out_tensor_bitdepth_minus8 | ue(v) |
| nnpfc_out_order_idc | ue(v) |
| nnpfc_constant_patch_size_flag | u(1) |
| nnpfc_patch_width_minus1 | ue(v) |
| nnpfc_patch_height_minus1 | ue(v) |
| nnpfc_overlap | ue(v) |
| nnpfc_padding_type | ue(v) |
| if( nnpfc_padding_type = = 4 ){ | |
| nnpfc_luma_padding_val | ue(v) |
| nnpfc_cb_padding_val | ue(v) |
| nnpfc_cr_padding_val | ue(v) |
| } | |
| nnpfc_complexity_idc | ue(v) |
| if( nnpfc_complexity_idc > 0 ) | |
| nnpfc_complexity_element( nnpfc_complexity_idc ) | |
| if( nnpfc_mode_idc = = 2 ) { | |
| while( !byte_aligned( ) ) | |
| nnpfc_reserved_zero_bit | u(1) |
| nnpfc_uri_tag[ i ] | st(v) |
| nnpfc_uri[ i ] | st(v) |
| } | |
| } | |
| /* filter specified or updated by ISO/IEC 15938-17 bitstream */ | |
| if( nnpfc_mode_idc = = 1 ) { | |

TABLE 18-continued

| | Descriptor |
|---|---|
| while( !byte_aligned( ) ) | |
| nnpfc_reserved_zero_bit | u(1) |
| for( i = 0; more_data_in_payload( ); i++ ) | |
| nnpfc_payload_byte[ i ] | b(8) |
| } | |
| } | |

With respect to Tables 16, 17, and 18, in one example, one or more of the syntax elements nnpfc_input_extra_dimension and/or nnpfc_output_extra_dimension may be signaled unconditionally and not only for cases where nnpfc_purpose==5. Further, in one example, the condition under which the mean and standard deviation value syntax elements (e.g., nnpfc_luma_mean_val and nnpfc_luma_std_val) are signalled may be written as: if((nnpfc_inp_format_flag==0) && (nnpfc_inp_standardization_flag==1)). Further, with respect to Tables 16, 17, and 18, in some examples, syntax elements nnpfc_in_standardization_flag (and syntax elements conditionally signaled thereupon) and nnpfc_out_standardization_flag may not be included in the syntax.

With respect to Tables 16, 17, and 18, the semantics may be based on the semantics provided above and based on the following:

nnpfc_purpose indicates the purpose of post-processing filter as specified in Table 19. The value of nnpfc_purpose shall be in the range of 0 to $2^{32}$-2, inclusive. Values of nnpfc_purpose that do not appear in Table 19 are reserved for future specification by ITU-T|ISO/IEC and shall not be present in bitstreams conforming to this version of this Specification. Decoders conforming to this version of this Specification shall ignore SEI messages that contain reserved values of nnpfc_purpose.

TABLE 19

| Value | Interpretation |
|---|---|
| 0 | Unknown or unspecified |
| 1 | Visual quality improvement |
| 2 | Chroma upsampling from the 4:2:0 chroma format to the 4:2:2 or 4:4:4 chroma format, or from the 4:2:2 chroma format to the 4:4:4 chroma format |
| 3 | Increasing the width or height of the cropped decoded output picture without changing the chroma format |
| 4 | Increasing the width or height of the cropped decoded output picture and upsampling the chroma format |
| 5 | Frame rate upsampling |

NOTE—When a reserved value of nnpfc_purpose is taken into use in the future by ITU-T|ISO/IEC, the syntax of this SEI message could be extended with syntax elements whose presence is conditioned by nnpfc_purpose being equal to that value.

When SubWidthC is equal to 1 and SubHeightC is equal to 1, nnpfc_purpose shall not be equal to 2 or 4.

nnpfc_number_of_input_pictures_minus1 plus 1 specifies the number of decoded output pictures used as input for the post-processing filter.

nnpfc_number_of_interpolated_pictures_minus1 plus 1 specifies the number of interpolated pictures generated by the post-processing filter.

nnpfc_input_extra_dimension specifies the method used to concatenate the multiple input pictures before passing them as input to the post-processing filter.

Value 0 specifies that pictures are concatenated in the channel dimension. In this case, no extra input dimension is used, and n pictures are treated as one picture with n*c channels. This case is typically used if the network consists of classical 2d convolution operations, and the goal is not to increase the computational cost significantly.

Value 1 specifies that an extra dimension is added and the input pictures are concatenated in the first dimension (i.e. as a list of pictures). This case is typically used if the post-processing filter process pictures independently first before concatenation. Each picture is passed through an independent sub neural network to extract the deep features and these deep features are then concatenated and passed through another sub neural network.

Value 2 specifies that an extra dimension is added and the input pictures are concatenated in the second dimension of the input tensor. This case typically arises when the video input is treated as a time series and the output of the network at a certain time t depends on both the current and the previous pictures.

Value 3 specifies that an extra dimension is added before the height dimension in the input tensor. This case is typically used if the post-processing consists of 3D convolution operations. In this case, the dimension indicating the number of pictures (or the extra dimension) is treated as a third spatial dimension, with height and width as the other 2 dimensions. A 3D kernel is convolved with the 3-dimensional data.

nnpfc_output_extra_dimension indicates how the post-processing filter concatenates the multiple picture output. It has values between 0 and 3. The values 0 to 3 have the same semantics as the description of nnpfc_input_extra_dimension. Knowing nnpfc_output_extra_dimension value is necessary to apply the StoreOutputTensor( ) routine defined later.

nnpfc_inp_format_flag indicates the method of converting a sample value of the cropped decoded output picture to an input value to the post-processing filter. When nnpfc_inp_format_flag is equal to 0, the input values to the post-processing filter are real numbers. When nnpfc_inp_format_flag is equal to 1, the input values to the post-processing filter are unsigned integer numbers.

nnpfc_inp_normalization_range_flag equal to 1 specifies that the normalization of InpY and InpC is done to the range of [0,1]. nnpfc_inp_normalization_range_flag equal to 0 specifies that the normalization of InpY and InpC is done to the range of [−1,1].

Normalization range of [−1,1]: Neural Network based methods normalize the input images in a small range to stabilize the training procedure. Two ranges are popular for normalization: [−1,1] and [0,1]. The superiority of one over the other is highly debated. However, an important number of research work in the field of image enhancement normalize the data to a [−1,1] range. The proposed signaling provides support for both ranges of normalizations.

The functions InpY and InpC are specified as follows

```
if(nnpfc_inp_format_flag==0) {
  if(nnpfc_inp_normalization_range_flag==0) {
      InpY( x ) = 2*(x ÷ ( ( 1 << BitDepthY ) − 1 )) − 0.5)
      InpC( x )= 2*(x ÷ ( ( 1 << BitDepthC ) − 1 )) − 0.5)
  }
  if(nnpfc_inp_normalization_range_flag==1) {
      InpY( x ) = x ÷ ( ( 1 << BitDepthY ) − 1 ))
      InpC( x ) = x ÷ ( ( 1 << BitDepthC ) − 1 ))
  }
}
if(nnpfc_inp_format_flag==1){
    shiftY = BitDepthY − inpTensorBitDepth
    if( inpTensorBitDepth >= BitDepthY )
        InpY( x ) = x << ( inpTensorBitDepth − BitDepthY )
    else
        InpY( x ) = Clip3(0, ( 1 << inpTensorBitDepth ) − 1, ( x + ( 1 << ( shiftY − 1 ) ) ) >> shiftY )
    shiftC = BitDepthC − inpTensorBitDepth
    if( inpTensorBitDepth >= BitDepthC )
        InpC( x ) = x << ( inpTensorBitDepth − BitDepthC )
    else
        InpC( x ) = Clip3(0, ( 1 << inpTensorBitDepth ) − 1, ( x + ( 1 << ( shiftC − 1 ) ) ) >> shiftC )
}
```

nnpfc_inp_standardization_flag equal 1 specifies that the input to the post processing filter is standardized.

nnpfc_inp_standardization_flag equal to 0 specifies that no standardization is applied to the input to the post filter.

nnpfc_luma_mean_val specifies the mean of the luma samples; used for standardization.

nnpfc_cb_mean_val specifies the mean of the chroma Cb samples; used for standardization.

nnpfc_cr_mean_val specifies the mean of the chroma Cr samples; used for standardization.

nnpfc_luma_std_val specifies the standard deviation of the luma samples; used for standardization.

nnpfc_cb_std_val specifies the standard deviation of the chroma Cb samples; used for standardization.

nnpfc_cr_std_val specifies the standard deviation of the chroma Cr samples; used for standardization.

```
if(nnpfc_inp_format_flag==0) {
    if (nnpfc_inp_standarization_flag = = 1 ) {
      InpY( x ) = (x − nnpfc_luma_mean_val ) ÷
      nnpfc_luma_std_val
      InpCb( x ) = (x − nnpfc_cb_mean_val ) ÷
      nnpfc_cb_std_val
      InpCr( x ) = (x − nnpfc_cr_mean_val ) ÷
      nnpfc_cr_std_val
    }
}
```

nnpfc_inp_order_idc may be based on any one of the following:

nnpfc_inp_order_idc indicates the method of ordering the sample arrays of a cropped decoded output picture as the input to the post-processing filter. Table 20A contains an informative description of nnpfc_inp_order_idc values for one example. Table 20B contains an informative description of nnpfc_inp_order_idc values for one example. The semantics of nnpfc_inp_order_idc in the range of 0 to 3, inclusive, are specified in Table 12, in one example, and Table 22A and Table 22B, in one example, which specify a process for deriving the input tensors inputTensor for different values of nnpfc_inp_order_idc and a given vertical sample coordinate cTop and a horizontal sample coordinate cLeft specifying the top-left sample location for the patch of samples included in the input tensors. When the chroma format of the cropped decoded output picture is not 4:2:0, nnpfc_inp_order_idc shall not be equal to 3. The value of nnpfc_inp_order_idc shall be in the range of 0 to 255, inclusive. Values of nnpfc_inp_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_inp_order_idc.

TABLE 20A

| nnpfc_inp_order_idc | Description |
|---|---|
| 0 | If nnpfc_auxiliary_inp_idc is equal to 0, one luma matrix is present in the input tensor for each of the number of input pictures in the range of 0 to numInputImages−1. Otherwise, nnpfc_auxiliary_inp_idc is not equal to 0 and one luma matrix and one auxiliary input matrix are present for each of the number of input pictures in the range of 0 to numInputImages−1. |
| 1 | If nnpfc_auxiliary_inp_idc is equal to 0, two chroma matrices are present in the input tensor for each of the number of input pictures in the range of 0 to numInputImages−1. Otherwise, nnpfc_auxiliary_inp_idc is not equal to 0 and two chroma matrices and one auxiliary input matrix are present for each of the number of input pictures in the range of 0 to numInputImages−1. |
| 2 | If nnpfc_auxiliary_inp_idc is equal to 0, one luma and two chroma matrices are present in the input tensor for each of the number of input pictures in the range of 0 to numInputImages−1. Otherwise, nnpfc_auxiliary_inp_idc is not equal to 0 and one luma matrix, two chroma matrices and one auxiliary input matrix are present for each of the number of input pictures in the range of 0 to numInputImages−1. |
| 3 | If nnpfc_auxiliary_inp_idc is equal to 0, four luma matrices and two chroma matrices are present in the input tensor, for each of the number of input pictures in the range of 0 to numInputImages−1. Otherwise, nnpfc_auxiliary_inp_idc is not equal to 0 and four luma matrices, two chroma matrices, and one auxiliary input matrix are present in the input tensor, for each of the number of input pictures in the range of 0 to numInputImages−1. The luma channels are derived in an interleaved manner as illustrated in FIG. 7. This nnpfc_inp_order_idc can only be used when the chroma format is 4:2:0. |
| 4 . . . 255 | Reserved |

TABLE 20B

| nnpfc_inp_order_idc | Description |
|---|---|
| 0 | If nnpfc_auxiliary_inp_idc is equal to 0, one or multiple luma matrices are present in the input tensor. Each luma matrix belongs to a specific picture in the case of video input sequence. Thus, every picture has one channel. Otherwise, nnpfc_auxiliary_inp_idc is not equal to 0 and one or multiple luma matrices and one or multiple auxiliary input matrices are present, thus the number of channels is 2 for each picture in the case of video input and 2 in the case of single picture input. |
| 1 | If nnpfc_auxiliary_inp_idc is equal to 0, one or multiple pairs of chroma matrices are present in the input tensor, each pair belongs to a specific picture in the case of video input sequence. Thus, the number of channels is 2 for every picture. Otherwise, nnpfc_auxiliary_inp_idc is not equal to 0 and two chroma matrices and one auxiliary input matrix are present, thus the number of channels is 3 for every picture and 3 in the case of single picture input. |
| 2 | If nnpfc_auxiliary_inp_idc is equal to 0, one luma and two chroma matrices are present in each picture of the video input sequence or the single input picture, thus the number of channels is 3 for every picture. Otherwise, nnpfc_auxiliary_inp_idc is not equal to 0 and one luma matrix, two chroma matrices and one auxiliary input matrix are present, thus the number of channels is 4 for every picture. |
| 3 | If nnpfc_auxiliary_inp_idc is equal to 0, four luma matrices and two chroma matrices are present in each picture of the video input sequence or in the signle input picture, thus the number of channels is 6 for every picture. Otherwise, nnpfc_auxiliary_inp_idc is not equal to 0 and four luma matrices, two chroma matrices, and one auxiliary input matrix are present in each picture, thus the number of channels is 7 for each picture. The luma channels are derived in an interleaved manner as illustrated in FIG. 7. This nnpfc_inp_order_idc can only be used when the chroma format is 4:2:0. |
| 4 . . . 255 | Reserved |

nnpfc_inp_order_idc indicates the method of ordering the sample arrays of a cropped decoded output picture as the input to the post-processing filter. Table 21A contains an informative description of nnpfc_inp_order_idc values for one example. Table 21B contains an informative description of nnpfc_inp_order_idc values for one example. The semantics of nnpfc_inp_order_idc in the range of 0 to 7, inclusive, are specified in Table 23A, in one example, and Table 23B, in one example, which specify a process for deriving the input tensors inputTensor for different values of nnpfc_inp_order_idc and a given vertical sample coordinate cTop and a horizontal sample coordinate cLeft specifying the top-left sample location for the patch of samples included in the input tensors. When the chroma format of the cropped decoded output picture is not 4:2:0, nnpfc_inp_order_idc shall not be equal to 3. The value of nnpfc_inp_order_idc shall be in the range of 0 to 255, inclusive. Values of nnpfc_inp_order_idc greater than 7 are reserved for future specification by ITU-T|ISO/IEC and shall not be present in bitstreams conforming to this version of this Specification. Decoders conforming to this version of this Specification shall ignore SEI messages that contain reserved values of nnpfc_inp_order_idc.

TABLE 21A

| nnpfc_inp_order_idc | Description |
|---|---|
| 0 | If nnpfc_auxiliary_inp_idc is equal to 0, one luma matrix is present in the input tensor, thus the number of channels is 1. Otherwise, nnpfc_auxiliary_inp_idc is not equal to 0 and one luma matrix and one auxiliary input matrix are present, thus the number of channels is 2.<br>If nnpfc_auxiliary_inp_idc is equal to 0, one luma matrix is present in the input tensor for each of the number of input pictures in the range of 0 to numInputImages−1. Otherwise, nnpfc_auxiliary_inp_idc is not equal to 0 and one luma matrix and one auxiliary input matrix are present for each of the number of input pictures in the range of 0 to numInputImages−1. |
| 1 | If nnpfc_auxiliary_inp_idc is equal to 0, two chroma matrices are present in the input tensor, thus the number of channels is 2. Otherwise, nnpfc_auxiliary_inp_idc is not equal to 0 and two chroma matrices and one auxiliary input matrix are present, thus the number of channels is 3.<br>If nnpfc_auxiliary_inp_idc is equal to 0, two chroma matrices are present in the input tensor for each of the number of input pictures in the range of 0 to numInputImages−1. Otherwise, nnpfc_auxiliary_inp_idc is not equal to 0 and two chroma matrices and one auxiliary input matrix are present for each of the number of input pictures in the range of 0 to numInputImages−1. |
| 2 | If nnpfc_auxiliary_inp_idc is equal to 0, one luma and two chroma matrices are present in the input tensor, thus the number of channels is 3. Otherwise, nnpfc_auxiliary_inp_idc is not equal to 0 and one luma matrix, two chroma matrices and one auxiliary input matrix are present, thus the number of channels is 4.<br>If nnpfc_auxiliary_inp_idc is equal to 0, one luma and two chroma matrices are present in the input tensor for each of the number of input pictures in the range of 0 to numInputImages−1. Otherwise, nnpfc_auxiliary_inp_idc is not equal to 0 and one luma matrix, two chroma matrices and one auxiliary input matrix are present for each of the number of input pictures in the range of 0 to numInputImages−1. |
| 3 | If nnpfc_auxiliary_inp_idc is equal to 0, four luma matrices and two chroma matrices are present in the input tensor, thus the number of channels is 6. Otherwise, nnpfc_auxiliary_inp_idc is not equal to 0 and four luma matrices, two chroma matrices, and one auxiliary input matrix are present in the input tensor, thus the number of channels is 7. The luma channels are derived in an interleaved manner as illustrated in FIG. 12. This nnpfc_inp_order_idc can only be used when the chroma format is 4:2:0.<br>If nnpfc_auxiliary_inp_idc is equal to 0, four luma matrices and two chroma matrices are present in the input tensor, for each of the number of input pictures in the range of 0 to numInputImages−1. Otherwise, nnpfc_auxiliary_inp_idc is not equal to 0 and four luma matrices, two chroma matrices, and one auxiliary input matrix are present in the input tensor, for each of the number of input pictures in the range of 0 to numInputImages−1. The luma channels are derived in an interleaved manner as illustrated in FIG. 12. This nnpfc_inp_order_idc can only be used when the chroma format is 4:2:0. |
| 4 | If nnpfc_auxiliary_inp_idc is equal to 0, one luma matrix is present in the input tensor for each of the number of input pictures in the range of 0 to numInputImages−1. Otherwise, nnpfc_auxiliary_inp_idc is not equal to 0 and one luma matrix and one auxiliary input matrix are present for each of the number of input pictures in the range of 0 to numInputImages−1. |
| 5 | If nnpfc_auxiliary_inp_idc is equal to 0, two chroma matrices are present in the input tensor for each of the number of input pictures in the range of 0 to numInputImages−1. Otherwise, nnpfc_auxiliary_inp_idc is not equal to 0 and two chroma matrices and one auxiliary input matrix are present for each of the number of input pictures in the range of 0 to numInputImages−1. |
| 6 | If nnpfc_auxiliary_inp_idc is equal to 0, one luma and two chroma matrices are present in the input tensor for each of the number of input pictures in the range of 0 to numInputImages−1. Otherwise, nnpfc_auxiliary_inp_idc is not equal to 0 and one luma matrix, two chroma matrices and one auxiliary input matrix are present for each of the number of input pictures in the range of 0 to numInputImages−1. |
| 7 | If nnpfc_auxiliary_inp_idc is equal to 0, four luma matrices and two chroma matrices are present in the input tensor, for each of the number of input pictures in the range of 0 to numInputImages−1. Otherwise, nnpfc_auxiliary_inp_idc is not equal to 0 and four luma matrices, two chroma matrices, and one auxiliary input matrix are present in the input tensor, for each of the number of input pictures in the range of 0 to numInputImages−1. The luma channels are derived in an interleaved manner as illustrated in FIG. 7. This nnpfc_inp_order_idc can only be used when the chroma format is 4:2:0. |
| 8 . . . 255 | Reserved |

TABLE 21B

| nnpfc_inp_order_idc | Description |
|---|---|
| 0 | If nnpfc_auxiliary_inp_idc is equal to 0, one luma matrix is present in the input tensor, thus the number of channels is 1. Otherwise, nnpfc_auxiliary_inp_idc is not equal to 0 and one luma matrix and one auxiliary input matrix are present, thus the number of channels is 2. |

TABLE 21B-continued

| nnpfc_inp_order_idc | Description |
|---|---|
| | If nnpfc_auxiliary_inp_idc is equal to 0, one luma matrix is present in the input tensor for each of the number of input pictures in the range of 0 to numInputImages−1. Otherwise, nnpfc_auxiliary_inp_idc is not equal to 0 and one luma matrix and one auxiliary input matrix are present for each of the number of input pictures in the range of 0 to numInputImages−1. |
| 1 | If nnpfc_auxiliary_inp_idc is equal to 0, two chroma matrices are present in the input tensor, thus the number of channels is 2. Otherwise, nnpfc_auxiliary_inp_idc is not equal to 0 and two chroma matrices and one auxiliary input matrix are present, thus the number of channels is 3. If nnpfc_auxiliary_inp_idc is equal to 0, two chroma matrices are present in the input tensor for each of the number of input pictures in the range of 0 to numInputImages−1. Otherwise, nnpfc_auxiliary_inp_idc is not equal to 0 and two chroma matrices and one auxiliary input matrix are present for each of the number of input pictures in the range of 0 to numInputImages−1. |
| 2 | If nnpfc_auxiliary_inp_idc is equal to 0, one luma and two chroma matrices are present in the input tensor, thus the number of channels is 3. Otherwise, nnpfc_auxiliary_inp_idc is not equal to 0 and one luma matrix, two chroma matrices and one auxiliary input matrix are present, thus the number of channels is 4. If nnpfc_auxiliary_inp_idc is equal to 0, one luma and two chroma matrices are present in the input tensor for each of the number of input pictures in the range of 0 to numInputImages−1. Otherwise, nnpfc_auxiliary_inp_idc is not equal to 0 and one luma matrix, two chroma matrices and one auxiliary input matrix are present for each of the number of input pictures in the range of 0 to numInputImages−1. |
| 3 | If nnpfc_auxiliary_inp_idc is equal to 0, four luma matrices and two chroma matrices are present in the input tensor, thus the number of channels is 6. Otherwise, nnpfc_auxiliary_inp_idc is not equal to 0 and four luma matrices, two chroma matrices, and one auxiliary input matrix are present in the input tensor, thus the number of channels is 7. The luma channels are derived in an interleaved manner as illustrated in FIG. 12. This nnpfc_inp_order_idc can only be used when the chroma format is 4:2:0. If nnpfc_auxiliary_inp_idc is equal to 0, four luma matrices and two chroma matrices are present in the input tensor, for each of the number of input pictures in the range of 0 to numInputImages−1. Otherwise, nnpfc_auxiliary_inp_idc is not equal to 0 and four luma matrices, two chroma matrices, and one auxiliary input matrix are present in the input tensor, for each of the number of input pictures in the range of 0 to numInputImages−1. The luma channels are derived in an interleaved manner as illustrated in FIG. 12. This nnpfc_inp_order_idc can only be used when the chroma format is 4:2:0. |
| 4 | If nnpfc_auxiliary_inp_idc is equal to 0, multiple luma matrices are present in the input tensor; each luma matrix belongs to a specific picture in the video input sequence. Thus, every picture has one channel. Otherwise, nnpfc_auxiliary_inp_idc is not equal to 0 and multiple luma matrices and multiple auxiliary input matrix are present, thus the number of channels is 2 for every picture. |
| 5 | If nnpfc_auxiliary_inp_idc is equal to 0, multiple pairs of chroma matrices are present in the input tensor, each pair belongs to a specific picture in the video input sequence. Thus, the number of channels is 2 for every picture. Otherwise, nnpfc_auxiliary_inp_idc is not equal to 0 and two chroma matrices and one auxiliary input matrix are present, thus the number of channels is 3 for every picture. |
| 6 | If nnpfc_auxiliary_inp_idc is equal to 0, one luma and two chroma matrices are present in each picture of the video input sequence, thus the number of channels is 3 for every picture. Otherwise, nnpfc_auxiliary_inp_idc is not equal to 0 and one luma matrix, two chroma matrices and one auxiliary input matrix are present, thus the number of channels is 4 for every picture. |
| 7 | If nnpfc_auxiliary_inp_idc is equal to 0, four luma matrices and two chroma matrices are present in each picture of the video input sequence, thus the number of channels is 6 for every picture. Otherwise, nnpfc_auxiliary_inp_idc is not equal to 0 and four luma matrices, two chroma matrices, and one auxiliary input matrix are present in each picture, thus the number of channels is 7 for each picture. The luma channels are derived in an interleaved manner as illustrated in FIG. 7. This nnpfc_inp_order_idc can only be used when the chroma format is 4:2:0. |
| 8 . . . 255 | Reserved |

nnpfc_overlap specifies the overlapping horizontal and vertical sample counts of adjacent input tensors of the post-processing filter. The value of nnpfc_overlap shall be in the range of 0 to 16383, inclusive.

The variables inpPatch Width, inpPatchHeight, outPatchWidth, outPatchHeight, horCScaling, verCScaling, outPatchCWidth, outPatchCHeight, and overlapSize are derived as follows:

inpPatchWidth=nnpfc_patch_width_minus1+1 inpPatchHeight=nnpfc_patch_height_minus1+1 outPatchWidth=(nnpfc_pic_width_in_luma_samples*inpPatchWidth)/CroppedWidth outPatchHeight=(nnpfc_pic_height_in_luma_samples*inpPatchHeight)/CroppedHeight horCScaling=SubWidthC/outSub WidthC verCScaling=SubHeightC/outSubHeightC outPatchCWidth=outPatch Width*horCScaling outPatchCHeight=outPatchHeight*verCScaling overlapSize=nnpfc_overlap numInputImages=nnpfc_number_of_input_pictures_minus1+1 numOutputImages=nnpfc_number_of_interpolated_pictures_minus1+1

In another example:

numInputImages=(nnpfc_purposc==5)?nnpfc_number_of_input_pictures: 1 numOutputImages=(nnpfc_purpose==5)?nnpfc_number_of_output_pictures: 1

TABLE 22A

| nnpfc_inp_ order_idc | Process DeriveInputTensors( ) for deriving input tensors |
|---|---|
| 0 | (see listing below) |

```
for(idx=0; idx< numInputImages; idx++) {
  for( yP = −overlapSize; yP < inpPatchHeight + overlapSize; yP++){
    for( xP = −overlapSize; xP < inpPatchWidth + overlapSize; xP++ ) {
      inpVal = InpY( InpSampleVal( cTop + yP, cLeft + xP, CroppedHeight,
      CroppedWidth, CroppedYPic[idx]) )
      if( nnpfc_component_last_flag = = 0 ){
        if(nnpfc_input_extra_dimension==0){
          if(nnpfc_auxiliary_inp_idc = = 1){
            inputTensor[ 0 ][ idx*2][ yP + overlapSize ][ xP + overlapSize ]
= inpVal
            inputTensor[ 0 ][ idx*2+1 ][ yP + overlapSize ][ xP +
overlapSize ] = 2^((StrengthControlVal − 42)/6)
        }
          else{
            inputTensor[ 0 ][ idx][ yP + overlapSize ][ xP + overlapSize ] =
inpVal
        }
      }
        else if(nnpfc_input_extra_dimension==1){
          if(nnpfc_auxiliary_inp_idc = = 1){
            inputTensor[idx][ 0 ][ 0 ][ yP + overlapSize ][ xP + overlapSize ]
= inpVal
            inputTensor[idx][ 0 ][1][ yP + overlapSize ][ xP + overlapSize ]
= 2^((StrengthControlVal − 42)/6)
        }
          else{
            inputTensor[idx][ 0 ][ 0 ][ yP + overlapSize ][ xP + overlapSize
] = inpVal
          }
      }
        else if(nnpfc_input_extra_dimension==2){
          if(nnpfc_auxiliary_inp_idc = = 1){
            inputTensor[0][idx][ 0 ][ yP + overlapSize ][ xP + overlapSize ]
= inpVal
            inputTensor[0][ idx ][1][ yP + overlapSize ][ xP + overlapSize ]
= 2^((StrengthControlVal − 42)/6)
        }
          else{
            inputTensor[0][ idx ][ 0 ][ yP + overlapSize ][ xP + overlapSize
] = inpVal
          }
      }
        else{
          if(nnpfc_auxiliary_inp_idc = = 1){
            inputTensor[0][ 0 ][ idx ][ yP + overlapSize ][ xP + overlapSize ]
= inpVal
            inputTensor[0][ 1 ][idx][ yP + overlapSize ][ xP + overlapSize ]
= 2^((StrengthControlVal − 42)/6)
        }
          else{
            inputTensor[0][ 0 ][ idx ][ yP + overlapSize ][ xP + overlapSize
] = inpVal
          }
      }
    }
      else{
      if(nnpfc_input_extra_dimension==0){
          if(nnpfc_auxiliary_inp_idc = = 1){
            inputTensor[ 0 ][ yP + overlapSize ][ xP + overlapSize ][idx*2]
= inpVal
            inputTensor[ 0 ][ yP + overlapSize ][ xP + overlapSize
][idx*2+1] = 2^((StrengthControlVal − 42)/6)
        }
          else{
            inputTensor[ 0 ][ yP + overlapSize ][ xP + overlapSize ][idx] =
inpVal
        }
      }
      else if(nnpfc_input_extra_dimension==1){
          if(nnpfc_auxiliary_inp_idc = = 1){
            inputTensor[idx][ 0 ][ yP + overlapSize ][ xP + overlapSize ][0]
= inpVal
            inputTensor[idx][ 0 ][ yP + overlapSize ][ xP + overlapSize ][1]
= 2^((StrengthControlVal − 42)/6)
        }
          else{
            inputTensor[idx][ 0 ][ yP + overlapSize ][ xP + overlapSize ][0]
```

TABLE 22A-continued

| nnpfc_inp_ order_idc | Process DeriveInputTensors( ) for deriving input tensors |
|---|---|

```
        = inpVal
                  }
                }
                else {
                  if(nnpfc_auxiliary_inp_idc = = 1){
                    inputTensor[ 0 ][idx][ yP + overlapSize ][ xP + overlapSize ][0]
        = inpVal
                    inputTensor[ 0 ][idx][ yP + overlapSize ][ xP + overlapSize ][1]
        = 2^((StrengthControlVal − 42)/6)
                }
                  else{
                    inputTensor[0][ idx ][ yP + overlapSize ][ xP + overlapSize ][0]
        = inpVal
                  }
                }
              }
            }
          }
        }
1       for(idx=0; idx< numInputImages; idx++) {
          for( yP = −overlapSize; yP < inpPatchHeight + overlapSize; yP++){
            for( xP = −overlapSize; xP < inpPatchWidth + overlapSize; xP++ ) {
              inpCbVal = InpC( InpSampleVal( cTop + yP, cLeft + xP,
        CroppedHeight / SubHeightC,
              CroppedWidth / SubWidthC, CroppedCbPic[idx] ) )
              inpCrVal = InpC( InpSampleVal( cTop + yP, cLeft + xP,
        CroppedHeight / SubHeightC,
              CroppedWidth / SubWidthC, CroppedCrPic[idx] ) )
              if( nnpfc_component_last_flag = = 0 ){
                if(nnpfc_input_extra_dimension==0){
                  if(nnpfc_auxiliary_inp_idc = = 1){
                    inputTensor[ 0 ][ idx*3][ yP + overlapSize ][ xP + overlapSize ]
        = inpCbVal
                    inputTensor[ 0 ][ idx*3+1][ yP + overlapSize ][ xP +
        overlapSize ] = inpCrVal
                    inputTensor[ 0 ][ idx*3+2 ][ yP + overlapSize ][ xP +
        overlapSize ] = 2^((StrengthControlVal − 42)/6)
                }
                  else{
                    inputTensor[ 0 ][ idx*2][ yP + overlapSize ][ xP + overlapSize ]
        = inpCbVal
                    inputTensor[ 0 ][ idx*2+1][ yP + overlapSize ][ xP +
        overlapSize ] = inpCrVal
                }
              }
                else if(nnpfc_input_extra_dimension==1){
                  if(nnpfc_auxiliary_inp_idc = = 1){
                    inputTensor[idx][ 0 ][ 0 ][ yP + overlapSize ][ xP + overlapSize ]
        = inpCbVal
                    inputTensor[idx][ 0 ][ 1 ][ yP + overlapSize ][ xP + overlapSize
        ] = inpCrVal
                    inputTensor[idx][ 0 ][2][ yP + overlapSize ][ xP + overlapSize ]
        = 2^((StrengthControlVal − 42)/6)
                }
                  else{
                    inputTensor[idx][ 0 ][ 0 ][ yP + overlapSize ][ xP + overlapSize
        ] = inpCbVal
                    inputTensor[idx][ 0 ][ 1 ][ yP + overlapSize ][ xP + overlapSize
        ] = inpCrVal
                  }
              }
                else if(nnpfc_input_extra_dimension==2){
                  if(nnpfc_auxiliary_inp_idc = = 1){
                    inputTensor[0][ idx ][ 0 ][ yP + overlapSize ][ xP + overlapSize ]
        = inpCbVal
                    inputTensor[0][ idx ][ 1 ][ yP + overlapSize ][ xP + overlapSize
        ] = inpCrVal
                    inputTensor[0][ idx ][2][ yP + overlapSize ][ xP + overlapSize ]
        = 2^((StrengthControlVal − 42)/6)
                }
                  else{
                    inputTensor[0][ idx ][ 0 ][ yP + overlapSize ][ xP + overlapSize
        ] = inpCbVal
                    inputTensor[0][ idx ][ 1 ][ yP + overlapSize ][ xP + overlapSize
        ] = inpCrVal
                  }
              }
```

TABLE 22A-continued

| nnpfc_inp_ order_idc | Process DeriveInputTensors( ) for deriving input tensors |
|---|---|

```
        else{
          if(nnpfc_auxiliary_inp_idc = = 1){
            inputTensor[0][ 0 ][ idx ][ yP + overlapSize ][ xP + overlapSize ]
= inpCbVal
            inputTensor[0][ 1 ][ idx ][ yP + overlapSize ][ xP + overlapSize
] = inpCrVal
            inputTensor[0][ 2 ][idx][ yP + overlapSize ][ xP + overlapSize ]
= 2^((StrengthControlVal − 42)/6)
        }
          else{
            inputTensor[0][ 0 ][ idx ][ yP + overlapSize ][ xP + overlapSize
] = inpCbVal
            inputTensor[0][ 1 ][ idx ][ yP + overlapSize ][ xP + overlapSize
] = inpCrVal
          }
      }
  }
      else{
      if(nnpfc_input_extra_dimension==0){
          if(nnpfc_auxiliary_inp_idc = = 1){
            inputTensor[ 0 ][ yP + overlapSize ][ xP + overlapSize ][idx*3]
= inpCbVal
            inputTensor[ 0 ][ yP + overlapSize ][ xP + overlapSize
][idx*3+1] = inpCrVal
            inputTensor[ 0 ][ yP + overlapSize ][ xP + overlapSize
][idx*3+2] = 2^((StrengthControlVal − 42)/6)
        }
          else{
            inputTensor[ 0 ][ yP + overlapSize ][ xP + overlapSize ][idx*2]
= inpCbVal
            inputTensor[ 0 ][ yP + overlapSize ][ xP + overlapSize
][idx*2+1] = inpCrVal
        }
      }
      else if(nnpfc_input_extra_dimension==1){
          if(nnpfc_auxiliary_inp_idc = = 1){
            inputTensor[idx][ 0 ][ yP + overlapSize ][ xP + overlapSize ][0]
= inpCbVal
            inputTensor[idx][ 0 ][ yP + overlapSize ][ xP + overlapSize ][1]
= inpCrVal
            inputTensor[idx][ 0 ][ yP + overlapSize ][ xP + overlapSize ][2]
= 2^((StrengthControlVal − 42)/6)
        }
          else{
            inputTensor[idx][ 0 ][ yP + overlapSize ][ xP + overlapSize ][0]
= inpCbVal
            inputTensor[idx][ 0 ][ yP + overlapSize ][ xP + overlapSize ][1]
= inpCrVal
        }
      }
      else{
          if(nnpfc_auxiliary_inp_idc = = 1){
            inputTensor[ 0 ][idx][ yP + overlapSize ][ xP + overlapSize ][0]
= inpCbVal
            inputTensor[ 0 ][idx][ yP + overlapSize ][ xP + overlapSize ][1]
= inpCrVal
            inputTensor[ 0 ][idx][ yP + overlapSize ][ xP + overlapSize ][2]
= 2^((StrengthControlVal − 42)/6)
        }
          else{
            inputTensor[ 0 ][idx][ yP + overlapSize ][ xP + overlapSize ][0]
= inpCbVal
            inputTensor[ 0 ][idx][ yP + overlapSize ][ xP + overlapSize ][1]
= inpCrVal
          }
        }
      }
    }
  }
}
2    for(idx=0; idx < numInputImages; idx++) {
       for( yP = −overlapSize; yP < inpPatchHeight + overlapSize; yP++){
         for( xP = overlapSize; xP < inpPatchWidth + overlapSize; xP++ ) {
           yY = cTop + yP
           xY = cLeft + xP
           yC = yY / SubHeightC
           xC = xY / SubWidthC
```

TABLE 22A-continued

| nnpfc_inp_ order_idc | Process DeriveInputTensors( ) for deriving input tensors |
|---|---|

```
inp YVal = InpY( InpSampleVal( yY, xY, CroppedHeight, CroppedWidth, CroppedYPic[idx] ) )
inpCbVal = InpC( InpSampleVal( yC, xC, CroppedHeight / SubHeightC, CroppedWidth / SubWidthC, CroppedCbPic[idx] ) )
inpCrVal = InpC( InpSampleVal( yC, xC, CroppedHeight / SubHeightC, CroppedWidth / SubWidthC, CroppedCrPic[idx] ) )
if( nnpfc_component_last_flag = = 0 ){
  if(nnpfc_input_extra_dimension==0){
    if(nnpfc_auxiliary_inp_idc = = 1){
      inputTensor[ 0 ][ idx*4][ yP + overlapSize ][ xP + overlapSize ] = inpYVal
      inputTensor[ 0 ][ idx*4+1][ yP + overlapSize ][ xP + overlapSize ] = inpCbVal
      inputTensor[ 0 ][ idx*4+2][ yP + overlapSize ][ xP + overlapSize ] = inpCrVal
      inputTensor[ 0 ][ idx*4+3 ][ yP + overlapSize ][ xP + overlapSize ] = 2^((StrengthControlVal − 42)/6)
  }
    else{
      inputTensor[ 0 ][ idx*3][ yP + overlapSize ][ xP + overlapSize ] = inpYVal
      inputTensor[ 0 ][ idx*3+1][ yP + overlapSize ][ xP + overlapSize ] = inpCbVal
      inputTensor[ 0 ][ idx*3+2][ yP + overlapSize ][ xP + overlapSize ] = inpCrVal
  }
}
  else if(nnpfc_input_extra_dimension==1){
    if(nnpfc_auxiliary_inp_idc = = 1){
      inputTensor[idx][ 0 ][ 0 ][ yP + overlapSize ][ xP + overlapSize ] = inpYVal
      inputTensor[idx][ 0 ][ 1 ][ yP + overlapSize ][ xP + overlapSize ] = inpCbVal
      inputTensor[idx][ 0 ][ 2 ][ yP + overlapSize ][ xP + overlapSize ] = inpCrVal
      inputTensor[idx][ 0 ][3][ yP+ overlapSize ][ xP + overlapSize ] = 2^((StrengthControlVal − 42)/6)
  }
    else{
      inputTensor[idx][ 0 ][ 0 ][ yP + overlapSize ][ xP + overlapSize ] = inpYVal
      inputTensor[idx][ 0 ][ 1 ][ yP + overlapSize ][ xP + overlapSize ] = inpCbVal
      inputTensor[idx][ 0 ][ 2 ][ yP + overlapSize ][ xP + overlapSize ] = inpCrVal
    }
}
  else if(nnpfc_input_extra_dimension==2){
    if(nnpfc_auxiliary_inp_idc = = 1){
      inputTensor[0][ idx ][ 0 ][ yP + overlapSize ][ xP + overlapSize ] = inpYVal
      inputTensor[0][ idx ][ 1 ][ yP + overlapSize ][ xP + overlapSize ] = inpCbVal
      inputTensor[0][ idx ][ 2 ][ yP + overlapSize ][ xP + overlapSize ] = inpCrVal
      inputTensor[0][ idx ][3][ yP + overlapSize ][ xP + overlapSize ] = 2^((StrengthControlVal − 42)/6)
  }
    else{
      inputTensor[0][ idx ][ 0 ][ yP + overlapSize ][ xP + overlapSize ] = inpYVal
      inputTensor[0][ idx ][ 1 ][ yP + overlapSize ][ xP + overlapSize ] = inpCbVal
      inputTensor[0][ idx ][ 2 ][ yP + overlapSize ][ xP + overlapSize ] = inpCrVal
    }
}
  else{
    if(nnpfc_auxiliary_inp_idc = = 1){
      inputTensor[0][ 0 ][ idx ][ yP + overlapSize ][ xP + overlapSize ] = inpYVal
      inputTensor[0][ 1 ][ idx ][ yP + overlapSize ][ xP + overlapSize ] = inpCbVal
      inputTensor[0][ 2 ][ idx ][ yP + overlapSize ][ xP + overlapSize ] = inpCrVal
```

TABLE 22A-continued

| nnpfc_inp_ order_idc | Process DeriveInputTensors( ) for deriving input tensors |
| --- | --- |

```
            inputTensor[0][ 3 ][idx][ yP + overlapSize ][ xP + overlapSize ]
= 2^((StrengthControlVal − 42)/6)
          }
          else{
            inputTensor[0][ 0 ][ idx ][ yP + overlapSize ][ xP + overlapSize
] = inpYVal
            inputTensor[0][ 1 ][ idx ][ yP + overlapSize ][ xP + overlapSize ]
= inpCbVal
            inputTensor[0][ 2 ][ idx ][ yP + overlapSize ][ xP + overlapSize
] = inpCrVal }
          }
        }
      }
      else{
      if(nnpfc_input_extra_dimension==0){
          if(nnpfc_auxiliary_inp_idc = = 1){
            inputTensor[ 0 ][ yP + overlapSize ][ xP + overlapSize ][idx*4]
= inpYVal
            inputTensor[ 0 ][ yP + overlapSize ][ xP + overlapSize
][idx*4+1] = inpCbVal
            inputTensor[ 0 ][ yP + overlapSize ][ xP + overlapSize
][idx*4+2] = inpCrVal
            inputTensor[ 0 ][ yP + overlapSize ][ xP + overlapSize
][idx*4+3] = 2^((StrengthControlVal − 42)/6)
          }
          else{
            inputTensor[ 0 ][ yP + overlapSize ][ xP + overlapSize ][idx*3]
= inpYVal
            inputTensor[ 0 ][ yP + overlapSize ][ xP + overlapSize
][idx*3+1] = inpCbVal
            inputTensor[ 0 ][ yP + overlapSize ][ xP + overlapSize
][idx*3+2] = inpCrVal
          }
      }
      else if(nnpfc_input_extra_dimension==1){
          if(nnpfc_auxiliary_inp_idc = = 1){
            inputTensor[idx][ 0 ][ yP + overlapSize ][ xP + overlapSize ][0]
= inpYVal
            inputTensor[idx][ 0 ][ yP + overlapSize ][ xP + overlapSize ][1]
= inpCbVal
            inputTensor[idx][ 0 ][ yP + overlapSize ][ xP + overlapSize ][2]
= inpCrVal
            inputTensor[idx][ 0 ][ yP + overlapSize ][ xP + overlapSize ][3]
= 2^((StrengthControlVal − 42)/6)
          }
          else{
            inputTensor[idx][ 0 ][ yP + overlapSize ][ xP + overlapSize ][0]
= inp YVal
            inputTensor[idx][ 0 ][ yP + overlapSize ][ xP + overlapSize ][1]
= inpCbVal
            inputTensor[idx][ 0 ][ yP + overlapSize ][ xP + overlapSize ][2]
= inpCrVal
          }
      }
      else{
          if(nnpfc_auxiliary_inp_idc = = 1){
            inputTensor[ 0 ][idx][ yP + overlapSize ][ xP + overlapSize ][0]
= inpYVal
            inputTensor[ 0 ][idx][ yP + overlapSize ][ xP + overlapSize ][1]
= inpCbVal
            inputTensor[ 0 ][idx][ yP + overlapSize ][ xP + overlapSize ][2]
= inpCrVal
            inputTensor[ 0 ][idx][ yP + overlapSize ][ xP + overlapSize ][3]
= 2^((StrengthControlVal − 42)/6)
          }
          else{
            inputTensor[ 0 ][idx][ yP + overlapSize ][ xP + overlapSize ][0]
= inpYVal
            inputTensor[ 0 ][idx][ yP + overlapSize ][ xP + overlapSize ][1]
= inpCbVal
            inputTensor[ 0 ][idx][ yP + overlapSize ][ xP + overlapSize ][2]
= inpCrVal
          }
        }
      }
    }
  }
```

TABLE 22A-continued

| nnpfc_inp_order_idc | Process DeriveInputTensors( ) for deriving input tensors |
|---|---|

```
        }
3       for(idx=0; idx< numInputImages; idx++) {
          for( yP = −overlapSize; yP < inpPatchHeight + overlapSize; yP++){
            for( xP = −overlapSize; xP < inpPatchWidth + overlapSize; xP++ ) {
              yTL = cTop + yP * 2
              xTL = cLeft + xP * 2
              yBR = yTL + 1
              xBR = xTL + 1
              yC = cTop / 2 + yP
              xC = cLeft / 2 + xP
              inpTLVal = InpY( InpSampleVal( yTL, xTL, CroppedHeight,
              CroppedWidth, CroppedYPic[idx] ) )
              inpTRVal = InpY( InpSampleVal( yTL, xBR, CroppedHeight,
              CroppedWidth, CroppedYPic[idx] ) )
              inpBLVal = InpY( InpSampleVal( yBR, xTL, CroppedHeight,
              CroppedWidth, CroppedYPic[idx] ) )
              inpBRVal = InpY( InpSampleVal( yBR, xBR, CroppedHeight,
              CroppedWidth, CroppedYPic[idx] ) )
              inpCbVal = InpC( InpSampleVal( yC, xC, CroppedHeight / 2,
              CroppedWidth / 2, CroppedCbPic[idx] ) )
              inpCrVal = InpC( InpSampleVal( yC, xC, CroppedHeight / 2,
              CroppedWidth / 2, CroppedCrPic[idx] ) )
              if( nnpfc_component_last_flag = = 0 ){
                if(nnpfc_input_extra_dimension==0){
                  if(nnpfc_auxiliary_inp_idc = = 1){
                    inputTensor[ 0 ][ idx*7][ yP + overlapSize ][ xP + overlapSize ] = inpTLVal
                    inputTensor[ 0 ][ idx*7+1][ yP + overlapSize ][ xP + overlapSize ] = inpTRVal
                    inputTensor[ 0 ][ idx*7+2][ yP + overlapSize ][ xP + overlapSize ] = inpBLVal
                    inputTensor[ 0 ][ idx*7+3][ yP + overlapSize ][ xP + overlapSize ] = inpBRVal
                    inputTensor[ 0 ][ idx*7+4][ yP + overlapSize ][ xP + overlapSize ] = inpCbVal
                    inputTensor[ 0 ][ idx*7+5][ yP + overlapSize ][ xP + overlapSize ] = inpCrVal
                    inputTensor[ 0 ][ idx*7+6 ][ yP + overlapSize ][ xP + overlapSize ] = 2^((StrengthControlVal − 42)/6)
                }
                  else{
                    inputTensor[ 0 ][ idx*7][ yP + overlapSize ][ xP + overlapSize ] = inpTLVal
                    inputTensor[ 0 ][ idx*7+1][ yP + overlapSize ][ xP + overlapSize ] = inpTRVal
                    inputTensor[ 0 ][ idx*7+2][ yP + overlapSize ][ xP + overlapSize ] = inpBLVal
                    inputTensor[ 0 ][ idx*7+3][ yP + overlapSize ][ xP + overlapSize ] = inpBRVal
                    inputTensor[ 0 ][ idx*7+4][ yP + overlapSize ][ xP + overlapSize ] = inpCbVal
                    inputTensor[ 0 ][ idx*7+5][ yP + overlapSize ][ xP + overlapSize ] = inpCrVal
                }
              }
                else if(nnpfc_input_extra_dimension==1){
                  if(nnpfc_auxiliary_inp_idc = = 1){
                    inputTensor[idx][ 0 ][ 0][ yP + overlapSize ][ xP + overlapSize ] = inpTLVal
                    inputTensor[idx][ 0 ][1][ yP + overlapSize ][ xP + overlapSize ] = inpTRVal
                    inputTensor[idx][ 0 ][2][ yP + overlapSize ][ xP + overlapSize ] = inpBLVal
                    inputTensor[idx][ 0 ][3][ yP + overlapSize ][ xP + overlapSize ] = inpBRVal
                    inputTensor[idx][ 0 ][4][ yP + overlapSize ][ xP + overlapSize ] = inpCbVal
                    inputTensor[idx][ 0 ][5][ yP + overlapSize ][ xP + overlapSize ] = inpCrVal
                    inputTensor[idx][ 0 ][6 ][ yP + overlapSize ][ xP + overlapSize ] = 2^((StrengthControlVal − 42)/6)
                }
                  else{
                    inputTensor[idx][ 0 ][ 0][ yP + overlapSize ][ xP + overlapSize ] = inpTLVal
                    inputTensor[idx][ 0 ][1][ yP + overlapSize ][ xP + overlapSize ] = inpTRVal
```

TABLE 22A-continued

| nnpfc_inp_ order_idc | Process DeriveInputTensors( ) for deriving input tensors |
|---|---|

```
            inputTensor[idx][ 0 ][2][ yP + overlapSize ][ xP + overlapSize ]
= inpBLVal
            inputTensor[idx][ 0 ][3][ yP + overlapSize ][ xP + overlapSize ]
= inpBRVal
            inputTensor[idx][ 0 ][4][ yP + overlapSize ][ xP + overlapSize ]
= inpCbVal
            inputTensor[idx][ 0 ][5][ yP + overlapSize ][ xP + overlapSize ]
= inpCrVal
        }
      }
        else if(nnpfc_input_extra_dimension==2){
          if(nnpfc_auxiliary_inp_idc = = 1){
            inputTensor[ 0 ][idx][ 0][ yP + overlapSize ][ xP + overlapSize
] = inpTLVal
            inputTensor[ 0 ][idx][1][ yP + overlapSize ][ xP + overlapSize ]
= inpTRVal
            inputTensor[ 0 ][idx][2][ yP + overlapSize ][ xP + overlapSize ]
= inpBLVal
            inputTensor[ 0 ][idx][3][ yP + overlapSize ][ xP + overlapSize ]
= inpBRVal
            inputTensor[ 0 ][idx][4][ yP + overlapSize ][ xP + overlapSize ]
= inpCbVal
            inputTensor[ 0 ][idx][5][ yP + overlapSize ][ xP + overlapSize ]
= inpCrVal
            inputTensor[ 0 ][idx][6 ][ yP + overlapSize ][ xP + overlapSize
] = 2^((StrengthControlVal - 42)/6)
        }
          else{
            inputTensor[ 0 ][idx][ 0][ yP + overlapSize ][ xP + overlapSize
] = inpTLVal
            inputTensor[ 0 ][idx][1][ yP + overlapSize ][ xP + overlapSize ]
= inpTRVal
            inputTensor[ 0 ][idx][2][ yP + overlapSize ][ xP + overlapSize ]
= inpBLVal
            inputTensor[ 0 ][idx][3][ yP + overlapSize ][ xP + overlapSize ]
= inpBRVal
            inputTensor[ 0 ][idx][4][ yP + overlapSize ][ xP + overlapSize ]
= inpCbVal
            inputTensor[ 0 ][idx][5][ yP + overlapSize ][ xP + overlapSize ]
= inpCrVal
          }
        }
          else{
            if(nnpfc_auxiliary_inp_idc = = 1){
            inputTensor[ 0 ][0][idx][ yP + overlapSize ][ xP + overlapSize ] =
inpTLVal
            inputTensor[ 0 ][1][idx][ yP + overlapSize ][ xP + overlapSize ]
= inpTRVal
            inputTensor[ 0 ][2][idx][ yP + overlapSize ][ xP + overlapSize ]
= inpBLVal
            inputTensor[ 0 ][3][idx][ yP + overlapSize ][ xP + overlapSize ]
= inpBRVal
            inputTensor[ 0 ][4][idx][ yP + overlapSize ][ xP + overlapSize ]
= inpCbVal
            inputTensor[ 0 ][5][idx][ yP + overlapSize ][ xP + overlapSize ]
= inpCrVal
            inputTensor[ 0 ][6 ][idx][ yP + overlapSize ][ xP + overlapSize
] = 2^((StrengthControlVal - 42)/6)
        }
          else{
            inputTensor[ 0 ][0][idx][ yP + overlapSize ][ xP + overlapSize ]
= inpTLVal
            inputTensor[ 0 ][1][idx][ yP + overlapSize ][ xP + overlapSize ]
= inpTRVal
            inputTensor[ 0 ][2][idx][ yP + overlapSize ][ xP + overlapSize ]
= inpBLVal
            inputTensor[ 0 ][3][idx][ yP + overlapSize ][ xP + overlapSize ]
= inpBRVal
            inputTensor[ 0 ][4][idx][ yP + overlapSize ][ xP + overlapSize ]
= inpCbVal
            inputTensor[ 0 ][5][idx][ yP + overlapSize ][ xP + overlapSize ]
= inpCrVal
          }
      }
    }
      else{
      if(nnpfc_input_extra_dimension==0){
```

TABLE 22A-continued

| nnpfc_inp_ order_idc | Process DeriveInputTensors( ) for deriving input tensors |
|---|---|

```
            if(nnpfc_auxiliary_inp_idc = = 1){
              inputTensor[ 0 ][ yP + overlapSize ][ xP + overlapSize ][idx*7]
= inpTLVal
              inputTensor[ 0 ][ yP + overlapSize ][ xP + overlapSize
][idx*7+1] = inpTRVal
              inputTensor[ 0 ][ yP + overlapSize ][ xP + overlapSize
][idx*7+2] = inpBLVal
              inputTensor[ 0 ][ yP + overlapSize ][ xP + overlapSize
][idx*7+3] = inpBRVal
              inputTensor[ 0 ][ yP + overlapSize ][ xP + overlapSize
][idx*7+4] = inpCbVal
              inputTensor[ 0 ][ yP + overlapSize ][ xP + overlapSize
][idx*7+5] = inpCrVal
              inputTensor[ 0 ][ yP + overlapSize ][ xP + overlapSize
][idx*7+6] = 2^((StrengthControlVal − 42)/6)
            }
            else{
              inputTensor[ 0 ][ yP + overlapSize ][ xP + overlapSize ][idx*6]
= inpTLVal
              inputTensor[ 0 ][ yP + overlapSize ][ xP + overlapSize
][idx*6+1] = inpTRVal
              inputTensor[ 0 ][ yP + overlapSize ][ xP + overlapSize
][idx*6+2] = inpBLVal
              inputTensor[ 0 ][ yP + overlapSize ][ xP + overlapSize
][idx*6+3] = inpBRVal
              inputTensor[ 0 ][ yP + overlapSize ][ xP + overlapSize
][idx*6+4] = inpCbVal
              inputTensor[ 0 ][ yP + overlapSize ][ xP + overlapSize
][idx*6+5] = inpCrVal
            }
          }
          else if(nnpfc_input_extra_dimension==1){
            if(nnpfc_auxiliary_inp_idc = = 1){
              inputTensor[idx][ 0 ][ yP + overlapSize ][ xP + overlapSize ][0]
= inpTLVal
              inputTensor[idx][ 0 ][ yP + overlapSize ][ xP + overlapSize ][1]
= inpTRVal
              inputTensor[idx][ 0 ][ yP + overlapSize ][ xP + overlapSize ][2]
= inpBLVal
              inputTensor[idx][ 0 ][ yP + overlapSize ][ xP + overlapSize ][3]
= inpBRVal
              inputTensor[idx][ 0 ][ yP + overlapSize ][ xP + overlapSize ][4]
= inpCbVal
              inputTensor[idx][ 0 ][ yP + overlapSize ][ xP + overlapSize ][5]
= inpCrVal
              inputTensor[idx][ 0 ][ yP + overlapSize ][ xP + overlapSize ][6]
= 2^((StrengthControlVal − 42)/6)
            }
            else{
              inputTensor[idx][ 0 ][ yP + overlapSize ][ xP + overlapSize ][0]
= inpTLVal
              inputTensor[idx][ 0 ][ yP + overlapSize ][ xP + overlapSize ][1]
= inpTRVal
              inputTensor[idx][ 0 ][ yP + overlapSize ][ xP + overlapSize ][2]
= inpBLVal
              inputTensor[idx][ 0 ][ yP + overlapSize ][ xP + overlapSize ][3]
= inpBRVal
              inputTensor[idx][ 0 ][ yP + overlapSize ][ xP + overlapSize ][4]
= inpCbVal
              inputTensor[idx][ 0 ][ yP + overlapSize ][ xP + overlapSize ][5]
= inpCrVal
            }
          }
          else{
            if(nnpfc_auxiliary_inp_idc = = 1){
              inputTensor[ 0 ][idx][ yP + overlapSize ][ xP + overlapSize ][0]
= inpTLVal
              inputTensor[ 0 ][idx][ yP + overlapSize ][ xP + overlapSize ][1]
= inpTRVal
              inputTensor[ 0 ][idx][ yP + overlapSize ][ xP + overlapSize ][2]
= inpBLVal
              inputTensor[ 0 ][idx][ yP + overlapSize ][ xP + overlapSize ][3]
= inpBRVal
              inputTensor[ 0 ][idx][ yP + overlapSize ][ xP + overlapSize ][4]
= inpCbVal
              inputTensor[ 0 ][idx][ yP + overlapSize ][ xP + overlapSize ][5]
= inpCrVal
```

TABLE 22A-continued

| nnpfc_inp_ order_idc | Process DeriveInputTensors( ) for deriving input tensors |
|---|---|
| | inputTensor[ 0 ][idx][ yP + overlapSize ][ xP + overlapSize ][6] = $2^{(StrengthControlVal - 42)/6}$ <br> } <br> else{ <br> inputTensor[ 0 ][idx][ yP + overlapSize ][ xP + overlapSize ][0] = inpTLVal <br> inputTensor[ 0 ][idx][ yP + overlapSize ][ xP + overlapSize ][1] = inpTRVal <br> inputTensor[ 0 ][idx][ yP + overlapSize ][ xP + overlapSize ][2] = inpBLVal <br> inputTensor[ 0 ][idx][ yP + overlapSize ][ xP + overlapSize ][3] = inpBRVal <br> inputTensor[ 0 ][idx][ yP + overlapSize ][ xP + overlapSize ][4] = inpCbVal <br> inputTensor[ 0 ][idx][ yP + overlapSize ][ xP + overlapSize ][5] = inpCrVal <br> } <br> } <br> } <br> } <br> } <br> } |
| 4..255 | Reserved |

TABLE 22B

| nnpfc_inp_order_idc | Process DeriveInputTensors( ) for deriving input tensors |
|---|---|
| 0 | for(idx=0; idx< numInputImages; idx++) <br> for( yP = −overlapSize; yP < inpPatchHeight + overlapSize; yP++) <br> for( xP = −overlapSize; xP < inpPatchWidth + overlapSize; xP++ ) { <br> inpVal = InpY( InpSampleVal( cTop + yP, cLeft + xP, CroppedHeight, CroppedWidth, CroppedYPic[ idx ] ) ) <br> if( nnpfc_component_last_flag = = 0 ) <br> inputTensor[ idx ][ 0 ][ 0 ][ yP + overlapSize ][ xP + overlapSize ] = inpVal <br> else <br> inputTensor[ idx ][ 0 ][ yP + overlapSize ][ xP + overlapSize ][ 0 ] = inpVal <br> if( nnpfc_auxiliary_inp_idc = = 1 ) <br> if( nnpfc_component_last_flag = = 0 ) <br> inputTensor[ idx ][ 0 ][ 1 ][ yP + overlapSize ][ xP + overlapSize ] = $2^{( StrengthControlVal - 42 ) / 6}$ <br> else <br> inputTensor[ idx ][ 0 ][ yP + overlapSize ][ xP + overlapSize ][ 1 ] = $2^{( StrengthControlVal - 42 ) / 6}$ <br> } |
| 1 | for(idx=0; idx< numInputImages; idx++) <br> for( yP = −overlapSize; yP < inpPatchHeight + overlapSize; yP++) <br> for( xP = −overlapSize; xP < inpPatchWidth + overlapSize; xP++ ) { <br> inpCbVal = InpC( InpSampleVal( cTop + yP, cLeft + xP, CroppedHeight / SubHeightC, CroppedWidth / SubWidthC, CroppedCbPic[ idx ] ) ) <br> inpCrVal = InpC( InpSampleVal( cTop + yP, cLeft + xP, CroppedHeight / SubHeightC, CroppedWidth / SubWidthC, CroppedCrPic[ idx ] ) ) <br> if( nnpfc_component_last_flag = = 0 ) { <br> inputTensor[ idx ][ 0 ][ 0 ][ yP + overlapSize ][ xP + overlapSize ] = inpCbVal <br> inputTensor[ idx ][ 0 ][ 1 ][ yP + overlapSize ][ xP + overlapSize ] = inpCrVal <br> } else { <br> inputTensor[ idx ][ 0 ][ yP + overlapSize ][ xP + overlapSize ][ 0 ] = inpCbVal <br> inputTensor[ idx ][ 0 ][ yP + overlapSize ][ xP + overlapSize ][ 1 ] = inpCrVal <br> } <br> if(nnpfc_auxiliary_inp_idc = = 1) <br> if( nnpfc_component_last_flag = = 0 ) <br> inputTensor[ idx ][ 0 ][ 2 ][ yP + overlapSize ][ xP + overlapSize ] = $2^{( StrengthControlVal - 42 ) / 6}$ <br> else <br> inputTensor[ idx ][ 0 ][ yP + overlapSize ][ xP + overlapSize ][ 2 ] = $2^{( StrengthControlVal - 42 ) / 6}$ <br> } |
| 2 | for(idx=0; idx< numInputImages; idx++) <br> for( yP = −overlapSize; yP < inpPatchHeight + overlapSize; yP++) <br> for( xP = −overlapSize; xP < inpPatchWidth + overlapSize; xP++ ) { <br> yY = cTop + yP <br> xY = cLeft + xP <br> yC = yY / SubHeightC <br> xC = xY / SubWidthC <br> inpYVal = InpY( InpSampleVal( yY, xY, CroppedHeight, CroppedWidth, CroppedYPic[ idx ] ) ) <br> inpCbVal = InpC( InpSampleVal( yC, xC, CroppedHeight / SubHeightC, CroppedWidth / SubWidthC, CroppedCbPic[ idx ] ) ) |

TABLE 22B-continued

| nnpfc__inp__order__idc | Process DeriveInputTensors( ) for deriving input tensors |
|---|---|
| | inpCrVal = InpC( InpSampleVal( yC, xC, CroppedHeight / SubHeightC,<br>CroppedWidth / SubWidthC, CroppedCrPic[ idx ] ) )<br>if( nnpfc__component__last__flag = = 0 ) {<br>inputTensor[ idx ][ 0 ][ 0 ][ yP + overlapSize ][ xP + overlapSize ] = inpYVal<br>inputTensor[ idx ][ 0 ][ 1 ][ yP + overlapSize ][ xP + overlapSize ] = inpCbVal<br>inputTensor[ idx ][ 0 ][ 2 ][ yP + overlapSize ][ xP + overlapSize ] = inpCrVal<br>} else {<br>inputTensor[ idx ][ 0 ][ yP + overlapSize ][ xP + overlapSize ][ 0 ] = inpYVal<br>inputTensor[ idx ][ 0 ][ yP + overlapSize ][ xP + overlapSize ][ 1 ] = inpCbVal<br>inputTensor[ idx ][ 0 ][ yP + overlapSize ][ xP + overlapSize ][ 2 ] = inpCrVal<br>}<br>if(nnpfc__auxiliary__inp__idc = = 1)<br>if( nnpfc__component__last__flag = = 0 )<br>inputTensor[ idx ][ 0 ][ 3 ][ yP + overlapSize ][ xP + overlapSize ] = $2^{( StrengthControlVal - 42 ) / 6}$<br>else<br>inputTensor[ idx ][ 0 ][ yP + overlapSize ][ xP + overlapSize ][ 3 ] = $2^{( StrengthControlVal - 42 ) / 6}$<br>} |
| 3 | for(idx=0; idx< numInputImages; idx++)<br>for( yP = −overlapSize; yP < inpPatchHeight + overlapSize; yP++)<br>for( xP = −overlapSize; xP < inpPatchWidth + overlapSize; xP++ ) {<br>yTL = cTop + yP * 2<br>xTL = cLeft + xP * 2<br>yBR = yTL + 1<br>xBR = xTL + 1<br>yC = cTop / 2 + yP<br>xC = cLeft / 2 + xP<br>inpTLVal = InpY( InpSampleVal( yTL, xTL, CroppedHeight,<br>CroppedWidth, CroppedYPic[idx] ) )<br>inpTRVal = InpY( InpSampleVal( yTL, xBR, CroppedHeight,<br>CroppedWidth, CroppedYPic[idx] ) )<br>inpBLVal = InpY( InpSampleVal( yBR, xTL, CroppedHeight,<br>CroppedWidth, CroppedYPic[idx] ) )<br>inpBRVal = InpY( InpSampleVal( yBR, xBR, CroppedHeight,<br>CroppedWidth, CroppedYPic[idx] ) )<br>inpCbVal = InpC( InpSampleVal( yC, xC, CroppedHeight / 2,<br>CroppedWidth / 2, CroppedCbPic[idx] ) )<br>inpCrVal = InpC( InpSampleVal( yC, xC, CroppedHeight / 2,<br>CroppedWidth / 2, CroppedCrPic[idx] ) )<br>if( nnpfc__component__last__flag = = 0 ) {<br>inputTensor[ idx ][ 0 ][ 0 ][ yP + overlapSize ][ xP + overlapSize ] = inpTLVal<br>inputTensor[ idx ][ 0 ][ 1 ][ yP + overlapSize ][ xP + overlapSize ] = inpTRVal<br>inputTensor[ idx ][ 0 ][ 2 ][ yP + overlapSize ][ xP + overlapSize ] = inpBLVal<br>inputTensor[ idx ][ 0 ][ 3 ][ yP + overlapSize ][ xP + overlapSize ] = inpBRVal<br>inputTensor[ idx ][ 0 ][ 4 ][ yP + overlapSize ][ xP + overlapSize ] = inpCbVal<br>inputTensor[ idx ][ 0 ][ 5 ][ yP + overlapSize ][ xP + overlapSize ] = inpCrVal<br>} else {<br>inputTensor[ idx ][ 0 ][ yP + overlapSize ][ xP + overlapSize ][ 0 ] = inpTLVal<br>inputTensor[ idx ][ 0 ][ yP + overlapSize ][ xP + overlapSize ][ 1 ] = inpTRVal<br>inputTensor[ idx ][ 0 ][ yP + overlapSize ][ xP + overlapSize ][ 2 ] = inpBLVal<br>inputTensor[ idx ][ 0 ][ yP + overlapSize ][ xP + overlapSize ][ 3 ] = inpBRVal<br>inputTensor[ idx ][ 0 ][ yP + overlapSize ][ xP + overlapSize ][ 4 ] = inpCbVal<br>inputTensor[ idx ][ 0 ][ yP + overlapSize ][ xP + overlapSize ][ 5 ] = inpCrVal<br>if(nnpfc__auxiliary__inp__idc = = 1)<br>if( nnpfc__component__last__flag = = 0 )<br>inputTensor[ idx ][ 0 ][ 6 ][ yP + overlapSize ][ xP + overlapSize ] = $2^{( StrengthControlVal - 42 ) / 6}$<br>else<br>inputTensor[ idx ][ 0 ][ yP + overlapSize ][ xP + overlapSize ][ 6 ] = $2^{( StrengthControlVal - 42 ) / 6}$<br>} |
| 4 . . . 255 | Reserved |

TABLE 23A

| nnpfc_inp_ order_idc | Process DeriveInputTensors( ) for deriving input tensors |
|---|---|
| 0 | for( yP = −overlapSize; yP < inpPatchHeight + overlapSize; yP++)<br>for( xP = −overlapSize; xP < inpPatchWidth + overlapSize; xP++ ) {<br>inpVal = InpY( InpSampleVal( cTop + yP, cLeft + xP, CroppedHeight,<br>CroppedWidth, CroppedYPic ) )<br>if( nnpfc_component_last_flag = = 0 )<br>inputTensor[ 0 ][ 0 ][ yP + overlapSize ][ xP + overlapSize ] = inpVal<br>else<br>inputTensor[ 0 ][ yP + overlapSize ][ xP + overlapSize ][ 0 ] = inpVal<br>if(nnpfc_auxiliary_inp_idc = = 1)<br>if( nnpfc_component_last_flag = = 0 ) |

TABLE 23A-continued

| nnpfc_inp_ order_idc | Process DeriveInputTensors( ) for deriving input tensors |
|---|---|

```
              inputTensor[ 0 ][ 1 ][ yP + overlapSize ][ xP + overlapSize ] =
        2^((StrengthControlVal − 42)/6)
            else
              inputTensor[ 0 ][ yP + overlapSize ][ xP + overlapSize ][ 1 ] =
        2^((StrengthControlVal − 42)/6)
          }
1       for( yP = −overlapSize; yP < inpPatchHeight + overlapSize; yP++)
          for( xP = −overlapSize; xP < inpPatchWidth + overlapSize; xP++ ) {
            inpCbVal = InpC( InpSampleVal( cTop + yP, cLeft + xP, CroppedHeight
        / SubHeightC,
              CroppedWidth / SubWidthC, CroppedCbPic ) )
            inpCrVal = InpC( InpSampleVal( cTop + yP, cLeft + xP, CroppedHeight /
        SubHeightC,
              CroppedWidth / SubWidthC, CroppedCrPic ) )
            if( nnpfc_component_last_flag = = 0 ) {
              inputTensor[ 0 ][ 0 ][ yP + overlapSize ][ xP + overlapSize ] = inpCbVal
              inputTensor[ 0 ][ 1 ][ yP + overlapSize ][ xP + overlapSize ] = inpCrVal
            } else {
              inputTensor[ 0 ][ yP + overlapSize ][ xP + overlapSize ][ 0 ] = inpCbVal
              inputTensor[ 0 ][ yP + overlapSize ][ xP + overlapSize ][ 1 ] = inpCrVal
            }
            if(nnpfc_auxiliary_inp_idc = = 1)
              if( nnpfc_component_last_flag = = 0 )
                inputTensor[ 0 ][ 2 ][ yP + overlapSize ][ xP + overlapSize ] =
        2^((StrengthControlVal − 42)/6)
              else
                inputTensor[ 0 ][ yP + overlapSize ][ xP + overlapSize ][ 2 ] =
        2^((StrengthControlVal − 42)/6)
          }
2       for( yP = −overlapSize; yP < inpPatchHeight + overlapSize; yP++)
          for( xP = −overlapSize; xP < inpPatchWidth + overlapSize; xP++ ) {
            yY = cTop + yP
            xY = cLeft + xP
            yC = yY / SubHeightC
            xC = xY / SubWidthC
            inpYVal = InpY( InpSample Val( yY, xY, CroppedHeight,
              CroppedWidth, CroppedYPic ) )
            inpCbVal = InpC( InpSampleVal( yC, xC, CroppedHeight / SubHeightC,
              CroppedWidth / SubWidthC, CroppedCbPic ) )
            inpCrVal = InpC( InpSampleVal( yC, xC, CroppedHeight / SubHeightC,
              CroppedWidth / SubWidthC, CroppedCrPic ) )
            if( nnpfc_component_last_flag = = 0 ) {
              inputTensor[ 0 ][ 0 ][ yP + overlapSize ][ xP + overlapSize ] = inpYVal
              inputTensor[ 0 ][ 1 ][ yP + overlapSize ][ xP + overlapSize ] = inpCbVal
              inputTensor[ 0 ][ 2 ][ yP + overlapSize ][ xP + overlapSize ] = inpCrVal
            } else {
              inputTensor[ 0 ][ yP + overlapSize ][ xP + overlapSize ][ 0 ] = inpYVal
              inputTensor[ 0 ][ yP + overlapSize ][ xP + overlapSize ][ 1 ] = inpCbVal
              inputTensor[ 0 ][ yP + overlapSize ][ xP + overlapSize ][ 2 ] = inpCrVal
            }
            if(nnpfc_auxiliary_inp_idc = = 1)
              if( nnpfc_component_last_flag = = 0 )
                inputTensor[ 0 ][ 3 ][ yP + overlapSize ][ xP + overlapSize ] =
        2^((StrengthControlVal − 42)/6)
              else
                inputTensor[ 0 ][ yP + overlapSize ][ xP + overlapSize ][ 3 ] =
        2^((StrengthControlVal − 42)/6)
          }
3       for( yP = −overlapSize; yP < inpPatchHeight + overlapSize; yP++)
          for( xP = −overlapSize; xP < inpPatchWidth + overlapSize; xP++ ) {
            yTL = cTop + yP *2
            xTL = cLeft + xP * 2
            yBR = yTL + 1
            xBR = xTL + 1
            yC = cTop / 2 + yP
            xC = cLeft / 2 + xP
            inpTLVal = InpY( InpSampleVal( yTL, xTL, CroppedHeight,
              CroppedWidth, CroppedYPic ) )
            inpTRVal = InpY( InpSampleVal( yTL, xBR, CroppedHeight,
              CroppedWidth, CroppedYPic ) )
            inpBLVal = InpY( InpSampleVal( yBR, xTL, CroppedHeight,
              CroppedWidth, CroppedYPic ) )
            inpBRVal = InpY( InpSampleVal( yBR, xBR, CroppedHeight,
              CroppedWidth, CroppedYPic ) )
            inpCbVal = InpC( InpSampleVal( yC, xC, CroppedHeight / 2,
              CroppedWidth / 2, CroppedCbPic ) )
            inpCrVal = InpC( InpSampleVal( yC, xC, CroppedHeight / 2,
```

TABLE 23A-continued

| nnpfc_inp_ order_idc | Process DeriveInputTensors( ) for deriving input tensors |
|---|---|
| | CroppedWidth / 2, CroppedCrPic ) )<br>if( nnpfc_component_last_flag = = 0 ) {<br>inputTensor[ 0 ][ 0 ][ yP + overlapSize ][ xP + overlapSize ] = inpTLVal<br>inputTensor[ 0 ][ 1 ][ yP + overlapSize ][ xP + overlapSize ] = inpTRVal<br>inputTensor[ 0 ][ 2 ][ yP + overlapSize ][ xP + overlapSize ] = inpBLVal<br>inputTensor[ 0 ][ 3 ][ yP + overlapSize ][ xP + overlapSize ] = inpBRVal<br>inputTensor[ 0 ][ 4 ][ yP + overlapSize ][ xP + overlapSize ] = inpCbVal<br>inputTensor[ 0 ][ 5 ][ yP + overlapSize ][ xP + overlapSize ] = inpCrVal<br>} else {<br>inputTensor[ 0 ][ yP + overlapSize ][ xP + overlapSize ][ 0 ] = inpTLVal<br>inputTensor[ 0 ][ yP + overlapSize ][ xP + overlapSize ][ 1 ] = inpTRVal<br>inputTensor[ 0 ][ yP + overlapSize ][ xP + overlapSize ][ 2 ] = inpBLVal<br>inputTensor[ 0 ][ yP + overlapSize ][ xP + overlapSize ][ 3 ] = inpBRVal<br>inputTensor[ 0 ][ yP + overlapSize ][ xP + overlapSize ][ 4 ] = inpCbVal<br>inputTensor[ 0 ][ yP + overlapSize ][ xP + overlapSize ][ 5 ] = inpCrVal<br>}<br>if(nnpfc_auxiliary_inp_idc = = 1)<br>if( nnpfc_component_last_flag = = 0 )<br>inputTensor[ 0 ][ 6 ][ yP + overlapSize ][ xP + overlapSize ] = $2^{(StrengthControlVal - 42)/6}$<br>else<br>inputTensor[ 0 ][ yP + overlapSize ][ xP + overlapSize ][ 6 ] = $2^{(StrengthControlVal - 42)/6}$<br>} |
| 4 | for(idx=0; idx< numInputImages; idx++) {<br>for( yP = −overlapSize; yP < inpPatchHeight + overlapSize; yP++){<br>for( xP = −overlapSize; xP < inpPatchWidth + overlapSize; xP++ ) {<br>inpVal = InpY( InpSampleVal( cTop + yP, cLeft + xP, CroppedHeight, CroppedWidth, CroppedYPic[idx]) )<br>if( nnpfc_component_last_flag = = 0 ){<br>if(nnpfc_input_extra_dimension==0){<br>if(nnpfc_auxiliary_inp_idc = = 1){<br>inputTensor[ 0 ][ idx*2][ yP + overlapSize ][ xP + overlapSize ] = inpVal<br>inputTensor[ 0 ][ idx*2+1 ][ yP + overlapSize ][ xP + overlapSize ] = $2^{(StrengthControlVal - 42)/6}$<br>}<br>else{<br>inputTensor[ 0 ][ idx][ yP + overlapSize ][ xP + overlapSize ] = inpVal<br>}<br>}<br>else if(nnpfc_input_extra_dimension==1){<br>if(nnpfc_auxiliary_inp_idc = = 1){<br>inputTensor[idx][ 0 ][ 0 ][ yP + overlapSize ][ xP + overlapSize ] = inpVal<br>inputTensor[idx][ 0 ][1][ yP + overlapSize ][ xP + overlapSize ] = $2^{(StrengthControlVal - 42)/6}$<br>}<br>else{<br>inputTensor[idx][ 0 ][ 0 ][ yP + overlapSize ][ xP + overlapSize ] = inpVal<br>}<br>}<br>else if(nnpfc_input_extra_dimension==2){<br>if(nnpfc_auxiliary_inp_idc = = 1){<br>inputTensor[0][ idx ][ 0 ][ yP + overlapSize ][ xP + overlapSize ] = inpVal<br>inputTensor[0][ idx ][1][ yP + overlapSize ][ xP + overlapSize ] = $2^{(StrengthControlVal - 42)/6}$<br>}<br>else{<br>inputTensor[0][ idx ][ 0 ][ yP + overlapSize ][ xP + overlapSize ] = inpVal<br>}<br>}<br>else{<br>if(nnpfc_auxiliary_inp_idc = = 1){<br>inputTensor[0][ 0 ][ idx ][ yP + overlapSize ][ xP + overlapSize ] = inpVal<br>inputTensor[0][ 1 ][idx][ yP + overlapSize ][ xP + overlapSize ] = $2^{(StrengthControlVal - 42)/6}$<br>}<br>else{<br>inputTensor[0][ 0 ][ idx ][ yP + overlapSize ][ xP + overlapSize ] = inpVal<br>} |

TABLE 23A-continued

| nnpfc_inp_ order_idc | Process DeriveInputTensors( ) for deriving input tensors |
|---|---|

```
                }
            }
                else{
                if(nnpfc_input_extra_dimension==0){
                    if(nnpfc_auxiliary_inp_idc = = 1){
                        inputTensor[ 0 ][ yP + overlapSize ][ xP + overlapSize ][idx*2]
= inpVal
                        inputTensor[ 0 ][ yP + overlapSize ][ xP + overlapSize
][idx*2+1] = 2^((StrengthControlVal − 42)/6)
                    }
                    else{
                        inputTensor[ 0 ][ yP + overlapSize ][ xP + overlapSize ][idx] =
inpVal
                    }
                }
                else if(nnpfc_input_extra_dimension==1){
                    if(nnpfc_auxiliary_inp_idc = = 1){
                        inputTensor[idx][ 0 ][ yP + overlapSize ][ xP + overlapSize ][0]
= inpVal
                        inputTensor[idx][ 0 ][ yP + overlapSize ][ xP + overlapSize ][1]
= 2^((StrengthControlVal − 42)/6)
                    }
                    else{
                        inputTensor[idx][ 0 ][ yP + overlapSize ][ xP + overlapSize ][0]
= inpVal
                    }
                }
                else{
                    if(nnpfc_auxiliary_inp_idc = = 1){
                        inputTensor[ 0 ][idx][ yP + overlapSize ][ xP + overlapSize ][0]
= inpVal
                        inputTensor[ 0 ][idx][ yP + overlapSize ][ xP + overlapSize ][1]
= 2^((StrengthControlVal − 42)/6)
                }
                    else{
                        inputTensor[0][ idx ][ yP + overlapSize ][ xP + overlapSize ][0]
= inpVal
                    }
                }
            }
        }
    }
}
5   for(idx=0; idx < numInputImages; idx++) {
        for( yP = −overlapSize; yP < inpPatchHeight + overlapSize; yP++){
            for( xP = −overlapSize; xP < inpPatchWidth + overlapSize; xP++ ) {
                inpCbVal = InpC( InpSampleVal( cTop + yP, cLeft + xP,
CroppedHeight / SubHeightC,
                CroppedWidth / SubWidthC, CroppedCbPic[idx] ) )
                inpCrVal = InpC( InpSampleVal( cTop + yP, cLeft + xP,
CroppedHeight / SubHeightC,
                CroppedWidth / SubWidthC, CroppedCrPic[idx] ) )
                if( nnpfc_component_last_flag = = 0 ){
                    if(nnpfc_input_extra_dimension==0){
                    if(nnpfc_auxiliary_inp_idc = = 1){
                        inputTensor[ 0 ][ idx*3][ yP + overlapSize ][ xP + overlapSize ]
= inpCbVal
                        inputTensor[ 0 ][ idx*3+1][ yP + overlapSize ][ xP +
overlapSize ] = inpCrVal
                        inputTensor[ 0 ][ idx*3+2 ][ yP + overlapSize ][ xP +
overlapSize ] = 2^((StrengthControlVal − 42)/6)
                    }
                    else{
                        inputTensor[ 0 ][ idx*2][ yP + overlapSize ][ xP + overlapSize
] = inpCbVal
                        inputTensor[ 0 ][ idx*2+1][ yP + overlapSize ][ xP +
overlapSize ] = inpCrVal
                    }
                }
                    else if(nnpfc_input_extra_dimension==1){
                    if(nnpfc_auxiliary_inp_idc = = 1){
                        inputTensor[idx][ 0 ][ 0 ][ yP + overlapSize ][ xP + overlapSize
] = inpCbVal
                        inputTensor[idx][ 0 ][ 1 ][ yP + overlapSize ][ xP + overlapSize
] = inpCrVal
                        inputTensor[idx][ 0 ][2][ yP + overlapSize ][ xP + overlapSize ]
= 2^((StrengthControlVal − 42)/6)
```

TABLE 23A-continued

| nnpfc_inp_ order_idc | Process DeriveInputTensors( ) for deriving input tensors |
|---|---|

```
            }
            else{
                inputTensor[idx][ 0 ][ 0 ][ yP + overlapSize ][ xP + overlapSize
] = inpCbVal
                inputTensor[idx][ 0 ][ 1 ][ yP + overlapSize ][ xP + overlapSize
] = inpCrVal
            }
        }
            else if(nnpfc_input_extra_dimension==2){
                if(nnpfc_auxiliary_inp_idc = = 1){
                    inputTensor[0][ idx ][ 0 ][ yP + overlapSize ][ xP + overlapSize
] = inpCbVal
                    inputTensor[0][ idx ][ 1 ][ yP + overlapSize ][ xP + overlapSize
] = inpCrVal
                    inputTensor[0][ idx ][2][ yP + overlapSize ][ xP + overlapSize ]
= 2^((StrengthControlVal − 42)/6)
            }
                else{
                    inputTensor[0][ idx ][ 0 ][ yP + overlapSize ][ xP + overlapSize
] = inpCbVal
                    inputTensor[0][ idx ][ 1 ][ yP + overlapSize ][ xP + overlapSize
] = inpCrVal
                }
        }
            else{
                if(nnpfc_auxiliary_inp_idc = = 1){
                    inputTensor[0][ 0 ][ idx ][ yP + overlapSize ][ xP + overlapSize
] = inpCbVal
                    inputTensor[0][ 1 ][ idx ][ yP + overlapSize ][ xP + overlapSize
] = inpCrVal
                    inputTensor[0][ 2 ][idx][ yP + overlapSize ][ xP + overlapSize ]
= 2^((StrengthControlVal − 42)/6)
            }
                else{
                    inputTensor[0][ 0 ][ idx ][ yP + overlapSize ][ xP + overlapSize
] = inpCbVal
                    inputTensor[0][ 1 ][ idx ][ yP + overlapSize ][ xP + overlapSize
] = inpCrVal
            }
        }
    }
        else{
        if(nnpfc_input_extra_dimension==0){
                if(nnpfc_auxiliary_inp_idc = = 1){
                    inputTensor[ 0 ][ yP + overlapSize ][ xP + overlapSize ][idx*3]
= inpCbVal
                    inputTensor[ 0 ][ yP + overlapSize ][ xP + overlapSize
][idx*3+1] = inpCrVal
                    inputTensor[ 0 ][ yP + overlapSize ][ xP + overlapSize
][idx*3+2] = 2^((StrengthControlVal − 42)/6)
            }
                else{
                    inputTensor[ 0 ][ yP + overlapSize ][ xP + overlapSize ][idx*2]
= inpCbVal
                    inputTensor[ 0 ][ yP + overlapSize ][ xP + overlapSize
][idx*2+1] = inpCrVal
            }
        }
            else if(nnpfc_input_extra_dimension==1){
                if(nnpfc_auxiliary_inp_idc = = 1){
                    inputTensor[idx][ 0 ][ yP + overlapSize ][ xP + overlapSize ][0]
= inpCbVal
                    inputTensor[idx][ 0 ][ yP + overlapSize ][ xP + overlapSize ][1]
= inpCrVal
                    inputTensor[idx][ 0 ][ yP + overlapSize ][ xP + overlapSize ][2]
= 2^((StrengthControlVal − 42)/6)
            }
                else{
                    inputTensor[idx][ 0 ][ yP + overlapSize ][ xP + overlapSize ][0]
= inpCbVal
                    inputTensor[idx][ 0 ][ yP + overlapSize ][ xP + overlapSize ][1]
= inpCrVal
                }
        }
            else{
                if(nnpfc_auxiliary_inp_idc = = 1){
                    inputTensor[ 0 ][idx][ yP + overlapSize ][ xP + overlapSize ][0]
```

TABLE 23A-continued

| nnpfc_inp_ order_idc | Process DeriveInputTensors( ) for deriving input tensors |
|---|---|
| | = inpCbVal<br>inputTensor[ 0 ][idx][ yP + overlapSize ][ xP + overlapSize ][1]<br>= inpCrVal<br>inputTensor[ 0 ][idx][ yP + overlapSize ][ xP + overlapSize ][2]<br>= $2^{(StrengthControlVal - 42)/6}$<br>}<br>else{<br>inputTensor[ 0 ][idx][ yP + overlapSize ][ xP + overlapSize ][0]<br>= inpCbVal<br>inputTensor[ 0 ][idx][ yP + overlapSize ][ xP + overlapSize ][1]<br>= inpCrVal<br>}<br>}<br>}<br>}<br>}<br>} |
| 6 | for(idx=0; idx < numInputImages; idx++) {<br>for( yP = −overlapSize; yP < inpPatchHeight + overlapSize; yP++){<br>for( xP = −overlapSize; xP < inpPatchWidth + overlapSize; xP++ ) {<br>yY = cTop + yP<br>xY = cLeft + xP<br>yC = yY / SubHeightC<br>xC = xY / SubWidthC<br>inp YVal = InpY( InpSampleVal( yY, xY, CroppedHeight,<br>CroppedWidth, CroppedYPic[idx] ) )<br>inpCbVal = InpC( InpSampleVal( yC, xC, CroppedHeight /<br>SubHeightC,<br>CroppedWidth / SubWidthC, CroppedCbPic[idx] ) )<br>inpCrVal = InpC( InpSampleVal( yC, xC, CroppedHeight /<br>SubHeightC,<br>CroppedWidth / SubWidthC, CroppedCrPic[idx] ) )<br>if( nnpfc_component_last_flag = = 0 ){<br>if(nnpfc_input_extra_dimension==0){<br>if(nnpfc_auxiliary_inp_idc = = 1){<br>inputTensor[ 0 ][ idx*4][ yP + overlapSize ][ xP + overlapSize<br>] = inpYVal<br>inputTensor[ 0 ][ idx*4+1][ yP + overlapSize ][ xP +<br>overlapSize ] = inpCbVal<br>inputTensor[ 0 ][ idx*4+2][ yP + overlapSize ][ xP +<br>overlapSize ] = inpCrVal<br>inputTensor[ 0 ][ idx*4+3 ][ yP + overlapSize ][ xP +<br>overlapSize ] = $2^{(StrengthControlVal - 42)/6}$<br>}<br>else{<br>inputTensor[ 0 ][ idx*3][ yP + overlapSize ][ xP + overlapSize<br>] = inpYVal<br>inputTensor[ 0 ][ idx*3+1][ yP + overlapSize ][ xP +<br>overlapSize ] = inpCbVal<br>inputTensor[ 0 ][ idx*3+2][ yP + overlapSize ][ xP +<br>overlapSize ] = inpCrVal<br>}<br>}<br>else if(nnpfc_input_extra_dimension==1){<br>if(nnpfc_auxiliary_inp_idc = = 1){<br>inputTensor[idx][ 0 ][ 0 ][ yP + overlapSize ][ xP + overlapSize<br>] = inpYVal<br>inputTensor[idx][ 0 ][ 1 ][ yP + overlapSize ][ xP + overlapSize<br>] = inpCbVal<br>inputTensor[idx][ 0 ][ 2 ][ yP + overlapSize ][ xP + overlapSize<br>] = inpCrVal<br>inputTensor[idx][ 0 ][3][ yP+ overlapSize ][ xP + overlapSize ]<br>= $2^{(StrengthControlVal - 42)/6}$<br>}<br>else{<br>inputTensor[idx][ 0 ][ 0 ][ yP + overlapSize ][ xP + overlapSize<br>] = inpYVal<br>inputTensor[idx][ 0 ][ 1 ][ yP + overlapSize ][ xP + overlapSize<br>] = inpCbVal<br>inputTensor[idx][ 0 ][ 2 ][ yP + overlapSize ][ xP + overlapSize<br>] = inpCrVal<br>}<br>}<br>else if(nnpfc_input_extra_dimension==2){<br>if(nnpfc_auxiliary_inp_idc = = 1){<br>inputTensor[0][ idx ][ 0 ][ yP + overlapSize ][ xP + overlapSize<br>] = inpYVal |

TABLE 23A-continued

| nnpfc_inp_ order_idc | Process DeriveInputTensors( ) for deriving input tensors |
|---|---|

```
            inputTensor[0][ idx ][ 1 ][ yP + overlapSize ][ xP + overlapSize
] = inpCbVal
            inputTensor[0][ idx ][ 2 ][ yP + overlapSize ][ xP + overlapSize
] = inpCrVal
            inputTensor[0][ idx ][3][ yP + overlapSize ][ xP + overlapSize ]
= 2^((StrengthControlVal − 42)/6)
          }
          else{
            inputTensor[0][ idx ][ 0 ][ yP + overlapSize ][ xP + overlapSize
] = inpYVal
            inputTensor[0][ idx ][ 1 ][ yP + overlapSize ][ xP + overlapSize
] = inpCbVal
            inputTensor[0][ idx ][ 2 ][ yP + overlapSize ][ xP + overlapSize
] = inpCrVal
          }
        }
        else{
          if(nnpfc_auxiliary_inp_idc = = 1){
            inputTensor[0][ 0 ][ idx ][ yP + overlapSize ][ xP + overlapSize
] = inpYVal
            inputTensor[0][ 1 ][ idx ][ yP + overlapSize ][ xP + overlapSize
] = inpCbVal
            inputTensor[0][ 2 ][ idx ][ yP + overlapSize ][ xP + overlapSize
] = inpCrVal
            inputTensor[0][ 3 ][idx][ yP + overlapSize ][ xP + overlapSize ]
= 2^((StrengthControlVal − 42)/6)
          }
          else{
            inputTensor[0][ 0 ][ idx ][ yP + overlapSize ][ xP + overlapSize
] = inpYVal
            inputTensor[0][ 1 ][ idx ][ yP + overlapSize ][ xP + overlapSize
] = inpCbVal
            inputTensor[0][ 2 ][ idx ][ yP + overlapSize ][ xP + overlapSize
] = inpCrVal
          }
        }
    }
      else{
      if(nnpfc_input_extra_dimension==0){
          if(nnpfc_auxiliary_inp_idc = = 1){
            inputTensor[ 0 ][ yP + overlapSize ][ xP + overlapSize
][idx*4] = inpYVal
            inputTensor[ 0 ][ yP + overlapSize ][ xP + overlapSize
][idx*4+1] = inpCbVal
            inputTensor[ 0 ][ yP + overlapSize ][ xP + overlapSize
][idx*4+2] = inpCrVal
            inputTensor[ 0 ][ yP + overlapSize ][ xP + overlapSize
][idx*4+3] = 2^((StrengthControlVal − 42)/6)
          }
          else{
            inputTensor[ 0 ][ yP + overlapSize ][ xP + overlapSize ][idx*3]
= inpYVal
            inputTensor[ 0 ][ yP + overlapSize ][ xP + overlapSize
][idx*3+1] = inpCbVal
            inputTensor[ 0 ][ yP + overlapSize ][ xP + overlapSize
][idx*3+2] = inpCrVal
          }
      }
        else if(nnpfc_input_extra_dimension==1){
          if(nnpfc_auxiliary_inp_idc = = 1){
            inputTensor[idx][ 0 ][ yP + overlapSize ][ xP + overlapSize ][0]
= inp YVal
            inputTensor[idx][ 0 ][ yP + overlapSize ][ xP + overlapSize ][1]
= inpCbVal
            inputTensor[idx][ 0 ][ yP + overlapSize ][ xP + overlapSize ][2]
= inpCrVal
            inputTensor[idx][ 0 ][ yP + overlapSize ][ xP + overlapSize ][3]
= 2^((StrengthControlVal − 42)/6)
          }
          else{
            inputTensor[idx][ 0 ][ yP + overlapSize ][ xP + overlapSize ][0]
= inpYVal
            inputTensor[idx][ 0 ][ yP + overlapSize ][ xP + overlapSize ][1]
= inpCbVal
            inputTensor[idx][ 0 ][ yP + overlapSize ][ xP + overlapSize ][2]
= inpCrVal
          }
```

TABLE 23A-continued

| nnpfc_inp_ order_idc | Process DeriveInputTensors( ) for deriving input tensors |
|---|---|

```
                    }
                    else{
                        if(nnpfc_auxiliary_inp_idc = = 1){
                            inputTensor[ 0 ][idx][ yP + overlapSize ][ xP + overlapSize ][0]
= inpYVal
                            inputTensor[ 0 ][idx][ yP + overlapSize ][ xP + overlapSize ][1]
= inpCbVal
                            inputTensor[ 0 ][idx][ yP + overlapSize ][ xP + overlapSize ][2]
= inpCrVal
                            inputTensor[ 0 ][idx][ yP + overlapSize ][ xP + overlapSize ][3]
= 2^((StrengthControlVal - 42)/6)
                    }
                        else{
                            inputTensor[ 0 ][idx][ yP + overlapSize ][ xP + overlapSize ][0]
= inpYVal
                            inputTensor[ 0 ][idx][ yP + overlapSize ][ xP + overlapSize ][1]
= inpCbVal
                            inputTensor[ 0 ][idx][ yP + overlapSize ][ xP + overlapSize ][2]
= inpCrVal
                    }
                }
            }
        }
    }
}
7   for(idx=0; idx< numInputImages; idx++) {
      for( yP = -overlapSize; yP < inpPatchHeight + overlapSize; yP++){
        for( xP = -overlapSize; xP < inpPatchWidth + overlapSize; xP++ ) {
                yTL = cTop + yP * 2
                xTL = cLeft + xP * 2
                yBR = yTL + 1
                xBR = xTL + 1
                yC = cTop / 2 + yP
                xC = cLeft / 2 + xP
            inpTLVal = InpY( InpSampleVal( yTL, xTL, CroppedHeight,
                CroppedWidth, CroppedYPic[idx] ) )
            inpTRVal = InpY( InpSampleVal( yTL, xBR, CroppedHeight,
                CroppedWidth, CroppedYPic[idx] ) )
            inpBLVal = InpY( InpSampleVal( yBR, xTL, CroppedHeight,
                CroppedWidth, CroppedYPic[idx] ) )
            inpBRVal = InpY( InpSampleVal( yBR, xBR, CroppedHeight,
                CroppedWidth, CroppedYPic[idx] ) )
            inpCbVal = InpC( InpSampleVal( yC, xC, CroppedHeight / 2,
                CroppedWidth / 2, CroppedCbPic[idx] ) )
            inpCrVal = InpC( InpSampleVal( yC, xC, CroppedHeight / 2,
                CroppedWidth / 2, CroppedCrPic[idx] ) )
                if( nnpfc_component_last_flag = = 0 ){
                    if(nnpfc_input_extra_dimension==0){
                        if(nnpfc_auxiliary_inp_idc = = 1){
                            inputTensor[ 0 ][ idx*7][ yP + overlapSize ][ xP + overlapSize
] = inpTLVal
                            inputTensor[ 0 ][ idx*7+1][ yP + overlapSize ][ xP +
overlapSize ] = inpTRVal
                            inputTensor[ 0 ][ idx*7+2][ yP + overlapSize ][ xP +
overlapSize ] = inpBLVal
                            inputTensor[ 0 ][ idx*7+3][ yP + overlapSize ][ xP +
overlapSize ] = inpBRVal
                            inputTensor[ 0 ][ idx*7+4][ yP + overlapSize ][ xP +
overlapSize ] = inpCbVal
                            inputTensor[ 0 ][ idx*7+5][ yP + overlapSize ][ xP +
overlapSize ] = inpCrVal
                            inputTensor[ 0 ][ idx*7+6 ][ yP + overlapSize ][ xP +
overlapSize ] = 2^((StrengthControlVal - 42)/6)
                    }
                        else{
                            inputTensor[ 0 ][ idx*6][ yP + overlapSize ][ xP + overlapSize
] = inpTLVal
                            inputTensor[ 0 ][ idx*6+1][ yP + overlapSize ][ xP +
overlapSize ] = inpTRVal
                            inputTensor[ 0 ][ idx*6+2][ yP + overlapSize ][ xP +
overlapSize ] = inpBLVal
                            inputTensor[ 0 ][ idx*6+3][ yP + overlapSize ][ xP +
overlapSize ] = inpBRVal
                            inputTensor[ 0 ][ idx*6+4][ yP + overlapSize ][ xP +
overlapSize ] = inpCbVal
                            inputTensor[ 0 ][ idx*6+5][ yP + overlapSize ][ xP +
overlapSize ] = inpCrVal
```

TABLE 23A-continued

| nnpfc_inp_ order_idc | Process DeriveInputTensors( ) for deriving input tensors |
|---|---|

```
            }
        }
        else if(nnpfc_input_extra_dimension==1){
            if(nnpfc_auxiliary_inp_idc = = 1){
                inputTensor[idx][ 0 ][ 0][ yP + overlapSize ][ xP + overlapSize ]
= inpTLVal
                inputTensor[idx][ 0 ][1][ yP + overlapSize ][ xP + overlapSize ]
= inpTRVal
                inputTensor[idx][ 0 ][2][ yP + overlapSize ][ xP + overlapSize ]
= inpBLVal
                inputTensor[idx][ 0 ][3][ yP + overlapSize ][ xP + overlapSize ]
= inpBRVal
                inputTensor[idx][ 0 ][4][ yP + overlapSize ][ xP + overlapSize ]
= inpCbVal
                inputTensor[idx][ 0 ][5][ yP + overlapSize ][ xP + overlapSize ]
= inpCrVal
                inputTensor[idx][ 0 ][6 ][ yP + overlapSize ][ xP + overlapSize
] = 2^((StrengthControlVal − 42)/6)
            }
            else{
                inputTensor[idx][ 0 ][ 0][ yP + overlapSize ][ xP + overlapSize
] = inpTLVal
                inputTensor[idx][ 0 ][1][ yP + overlapSize ][ xP + overlapSize ]
= inpTRVal
                inputTensor[idx][ 0 ][2][ yP + overlapSize ][ xP + overlapSize ]
= inpBLVal
                inputTensor[idx][ 0 ][3][ yP + overlapSize ][ xP + overlapSize ]
= inpBRVal
                inputTensor[idx][ 0 ][4][ yP + overlapSize ][ xP + overlapSize ]
= inpCbVal
                inputTensor[idx][ 0 ][5][ yP + overlapSize ][ xP + overlapSize ]
= inpCrVal
            }
        }
        else if(nnpfc_input_extra_dimension==2){
            if(nnpfc_auxiliary_inp_idc = = 1){
                inputTensor[ 0 ][idx][ 0][ yP + overlapSize ][ xP + overlapSize
] = inpTLVal
                inputTensor[ 0 ][idx][1][ yP + overlapSize ][ xP + overlapSize ]
= inpTRVal
                inputTensor[ 0 ][idx][2][ yP + overlapSize ][ xP + overlapSize ]
= inpBLVal
                inputTensor[ 0 ][idx][3][ yP + overlapSize ][ xP + overlapSize ]
= inpBRVal
                inputTensor[ 0 ][idx][4][ yP + overlapSize ][ xP + overlapSize ]
= inpCbVal
                inputTensor[ 0 ][idx][5][ yP + overlapSize ][ xP + overlapSize ]
= inpCrVal
                inputTensor[ 0 ][idx][6 ][ yP + overlapSize ][ xP + overlapSize
] = 2^((StrengthControlVal − 42)/6)
            }
            else{
                inputTensor[ 0 ][idx][ 0][ yP + overlapSize ][ xP + overlapSize
] = inpTLVal
                inputTensor[ 0 ][idx][1][ yP + overlapSize ][ xP + overlapSize ]
= inpTRVal
                inputTensor[ 0 ][idx][2][ yP + overlapSize ][ xP + overlapSize ]
= inpBLVal
                inputTensor[ 0 ][idx][3][ yP + overlapSize ][ xP + overlapSize ]
= inpBRVal
                inputTensor[ 0 ][idx][4][ yP + overlapSize ][ xP + overlapSize ]
= inpCbVal
                inputTensor[ 0 ][idx][5][ yP + overlapSize ][ xP + overlapSize ]
= inpCrVal
            }
        }
        else{
            if(nnpfc_auxiliary_inp_idc = = 1){
                inputTensor[ 0 ][0][idx][ yP + overlapSize ][ xP + overlapSize ]
= inpTLVal
                inputTensor[ 0 ][1][idx][ yP + overlapSize ][ xP + overlapSize ]
= inpTRVal
                inputTensor[ 0 ][2][idx][ yP + overlapSize ][ xP + overlapSize ]
= inpBLVal
                inputTensor[ 0 ][3][idx][ yP + overlapSize ][ xP + overlapSize ]
= inpBRVal
                inputTensor[ 0 ][4][idx][ yP + overlapSize ][ xP + overlapSize ]
```

TABLE 23A-continued

| nnpfc_inp_order_idc | Process DeriveInputTensors( ) for deriving input tensors |
|---|---|

```
= inpCbVal
                inputTensor[ 0 ][5][idx][ yP + overlapSize ][ xP + overlapSize ]
= inpCrVal
                inputTensor[ 0 ][6][idx][ yP + overlapSize ][ xP + overlapSize ]
= 2^((StrengthControlVal − 42)/6)
          }
            else{
                inputTensor[ 0 ][0][idx][ yP + overlapSize ][ xP + overlapSize ]
= inpTLVal
                inputTensor[ 0 ][1][idx][ yP + overlapSize ][ xP + overlapSize ]
= inpTRVal
                inputTensor[ 0 ][2][idx][ yP + overlapSize ][ xP + overlapSize ]
= inpBLVal
                inputTensor[ 0 ][3][idx][ yP + overlapSize ][ xP + overlapSize ]
= inpBRVal
                inputTensor[ 0 ][4][idx][ yP + overlapSize ][ xP + overlapSize ]
= inpCbVal
                inputTensor[ 0 ][5][idx][ yP + overlapSize ][ xP + overlapSize ]
= inpCrVal
            }
        }
    }
        else{
        if(nnpfc_input_extra_dimension==0){
            if(nnpfc_auxiliary_inp_idc = = 1){
                inputTensor[ 0 ][ yP + overlapSize ][ xP + overlapSize
][idx*7] = inpTLVal
                inputTensor[ 0 ][ yP + overlapSize ][ xP + overlapSize
][idx*7+1] = inpTRVal
                inputTensor[ 0 ][ yP + overlapSize ][ xP + overlapSize
][idx*7+2] = inpBLVal
                inputTensor[ 0 ][ yP + overlapSize ][ xP + overlapSize
][idx*7+3] = inpBRVal
                inputTensor[ 0 ][ yP + overlapSize ][ xP + overlapSize
][idx*7+4] = inpCbVal
                inputTensor[ 0 ][ yP + overlapSize ][ xP + overlapSize
][idx*7+5] = inpCrVal
                inputTensor[ 0 ][ yP + overlapSize ][ xP + overlapSize
][idx*7+6] = 2^((StrengthControlVal − 42)/6)
          }
            else{
                inputTensor[ 0 ][ yP + overlapSize ][ xP + overlapSize ][idx*6]
= inpTL Val
                inputTensor[ 0 ][ yP + overlapSize ][ xP + overlapSize
][idx*6+1] = inpTRVal
                inputTensor[ 0 ][ yP + overlapSize ][ xP + overlapSize
][idx*6+2] = inpBLVal
                inputTensor[ 0 ][ yP + overlapSize ][ xP + overlapSize
][idx*6+3] = inpBRVal
                inputTensor[ 0 ][ yP + overlapSize ][ xP + overlapSize
][idx*76+4] = inpCbVal
                inputTensor[ 0 ][ yP + overlapSize ][ xP + overlapSize
][idx*6+5] = inpCrVal
          }
        }
        else if(nnpfc_input_extra_dimension==1){
            if(nnpfc_auxiliary_inp_idc = = 1){
                inputTensor[idx][ 0 ][ yP + overlapSize ][ xP + overlapSize ][0]
= inpTLVal
                inputTensor[idx][ 0 ][ yP + overlapSize ][ xP + overlapSize ][1]
= inpTRVal
                inputTensor[idx][ 0 ][ yP + overlapSize ][ xP + overlapSize ][2]
= inpBLVal
                inputTensor[idx][ 0 ][ yP + overlapSize ][ xP + overlapSize ][3]
= inpBRVal
                inputTensor[idx][ 0 ][ yP + overlapSize ][ xP + overlapSize ][4]
= inpCbVal
                inputTensor[idx][ 0 ][ yP + overlapSize ][ xP + overlapSize ][5]
= inpCrVal
                inputTensor[idx][ 0 ][ yP + overlapSize ][ xP + overlapSize ][6]
= 2^((StrengthControlVal − 42)/6)
          }
            else{
                inputTensor[idx][ 0 ][ yP + overlapSize ][ xP + overlapSize ][0]
= inpTLVal
                inputTensor[idx][ 0 ][ yP + overlapSize ][ xP + overlapSize ][1]
= inpTRVal
```

TABLE 23A-continued

| nnpfc_inp_ order_idc | Process DeriveInputTensors( ) for deriving input tensors |
|---|---|
| | inputTensor[idx][ 0 ][ yP + overlapSize ][ xP + overlapSize ][2] = inpBLVal<br>inputTensor[idx][ 0 ][ yP + overlapSize ][ xP + overlapSize ][3] = inpBRVal<br>inputTensor[idx][ 0 ][ yP + overlapSize ][ xP + overlapSize ][4] = inpCbVal<br>inputTensor[idx][ 0 ][ yP + overlapSize ][ xP + overlapSize ][5] = inpCrVal<br>}<br>}<br>else{<br>if(nnpfc_auxiliary_inp_idc = = 1){<br>inputTensor[ 0 ][idx][ yP + overlapSize ][ xP + overlapSize ][0] = inpTLVal<br>inputTensor[ 0 ][idx][ yP + overlapSize ][ xP + overlapSize ][1] = inpTRVal<br>inputTensor[ 0 ][idx][ yP + overlapSize ][ xP + overlapSize ][2] = inpBLVal<br>inputTensor[ 0 ][idx][ yP + overlapSize ][ xP + overlapSize ][3] = inpBRVal<br>inputTensor[ 0 ][idx][ yP + overlapSize ][ xP + overlapSize ][4] = inpCbVal<br>inputTensor[ 0 ][idx][ yP + overlapSize ][ xP + overlapSize ][5] = inpCrVal<br>inputTensor[ 0 ][idx][ yP + overlapSize ][ xP + overlapSize ][6] = $2^{(StrengthControlVal - 42)/6}$<br>}<br>else{<br>inputTensor[ 0 ][idx][ yP + overlapSize ][ xP + overlapSize ][0] = inpTLVal<br>inputTensor[ 0 ][idx][ yP + overlapSize ][ xP + overlapSize ][1] = inpTRVal<br>inputTensor[ 0 ][idx][ yP + overlapSize ][ xP + overlapSize ][2] = inpBLVal<br>inputTensor[ 0 ][idx][ yP + overlapSize ][ xP + overlapSize ][3] = inpBRVal<br>inputTensor[ 0 ][idx][ yP + overlapSize ][ xP + overlapSize ][4] = inpCbVal<br>inputTensor[ 0 ][idx][ yP + overlapSize ][ xP + overlapSize ][5] = inpCrVal<br>}<br>}<br>}<br>}<br>}<br>} |
| 8..255 | Reserved |

TABLE 23B

| nnpfc_inp_order_idc | Process DeriveInputTensors( ) for deriving input tensors |
|---|---|
| 0 | for( yP = −overlapSize; yP < inpPatchHeight + overlapSize; yP++)<br>for( xP = −overlapSize; xP < inpPatchWidth + overlapSize; xP++ ) {<br>inpVal = InpY( InpSampleVal( cTop + yP, cLeft + xP, CroppedHeight, CroppedWidth, CroppedYPic ) )<br>if( nnpfc_component_last_flag = = 0 )<br>inputTensor[ 0 ][ 0 ][ yP + overlapSize ][ xP + overlapSize ] = inpVal<br>else<br>inputTensor[ 0 ][ yP + overlapSize ][ xP + overlapSize ][ 0 ] = inpVal<br>if(nnpfc_auxiliary_inp_idc = = 1) {<br>if( nnpfc_component_last_flag = = 0 )<br>inputTensor[ 0 ][ 1 ][ yP + overlapSize ][ xP + overlapSize ] = $2^{(StrengthControlVal - 42)/6}$<br>else<br>inputTensor[ 0 ][ yP + overlapSize ][ xP + overlapSize ][ 1 ] = $2^{(StrengthControlVal - 42)/6}$<br>}<br>} |
| 1 | for( yP = −overlapSize; yP < inpPatchHeight + overlapSize; yP++)<br>for( xP = −overlapSize; xP < inpPatchWidth + overlapSize; xP++ ) {<br>inpCbVal = InpC( InpSampleVal( cTop + yP, cLeft +xP, CroppedHeight / SubHeightC,<br>CroppedWidth / SubWidthC, CroppedCbPic ) ) |

TABLE 23B-continued

| nnpfc__inp__order__idc | Process DeriveInputTensors( ) for deriving input tensors |
|---|---|

```
        inpCrVal = InpC( InpSampleVal( cTop + yP, cLeft + xP, CroppedHeight /
SubHeightC,
            CroppedWidth / Sub WidthC, CroppedCrPic ) )
        if( nnpfc__component__last__flag = = 0 ) {
          inputTensor[ 0 ][ 0 ][ yP + overlapSize ][ xP + overlapSize ] = inpCbVal
          inputTensor[ 0 ][ 1 ][ yP + overlapSize ][ xP + overlapSize ] = inpCrVal
        } else {
          inputTensor[ 0 ][ yP + overlapSize ][ xP + overlapSize ][ 0 ] = inpCbVal
          inputTensor[ 0 ][ yP + overlapSize ][ xP + overlapSize ][ 1 ] = inpCrVal
        }
        if(nnpfc__auxiliary__inp__idc = = 1) {
          if( nnpfc__component__last__flag = = 0 )
            inputTensor[ 0 ][ 2 ][ yP + overlapSize ][ xP + overlapSize ] =
2^((StrengthControlVal − 42)/6)
          else
            inputTensor[ 0 ][ yP + overlapSize ][ xP + overlapSize ][ 2 ] =
2^((StrengthControlVal − 42)/6)
        }
      }
```

2

```
for( yP = −overlapSize; yP < inpPatchHeight + overlapSize; yP++)
  for( xP = −overlapSize; xP < inpPatchWidth + overlapSize; xP++ ) {
    yY = cTop + yP
    xY = cLeft + xP
    yC = yY / SubHeightC
    xC = xY / SubWidthC
    inpYVal = InpY( InpSampleVal( yY, xY, CroppedHeight,
        CroppedWidth, CroppedYPic ) )
    inpCbVal = InpC( InpSampleVal( yC, xC, CroppedHeight / SubHeightC,
        CroppedWidth / SubWidthC, CroppedCbPic ) )
    inpCrVal = InpC( InpSampleVal( yC, xC, CroppedHeight / SubHeightC,
        CroppedWidth / SubWidthC, CroppedCrPic ) )
    if( nnpfc__component__last__flag = = 0 ) {
      inputTensor[ 0 ][ 0 ][ yP + overlapSize ][ xP + overlapSize ] = inpYVal
      inputTensor[ 0 ][ 1 ][ yP + overlapSize ][ xP + overlapSize ] = inpCbVal
      inputTensor[ 0 ][ 2 ][ yP + overlapSize ][ xP + overlapSize ] = inpCrVal
    } else {
      inputTensor[ 0 ][ yP + overlapSize ][ xP + overlapSize ][ 0 ] = inpYVal
      inputTensor[ 0 ][ yP + overlapSize ][ xP + overlapSize ][ 1 ] = inpCbVal
      inputTensor[ 0 ][ yP + overlapSize ][ xP + overlapSize ][ 2 ] = inpCrVal
    }
    if(nnpfc__auxiliary__inp__idc = = 1) {
      if( nnpfc__component__last__flag = = 0 )
        inputTensor[ 0 ][ 3 ][ yP + overlapSize ][ xP + overlapSize ] =
2^((StrengthControlVal − 42)/6)
      else
        inputTensor[ 0 ][ yP + overlapSize ][ xP + overlapSize ][ 3 ] =
2^((StrengthControlVal − 42)/6)
    }
  }
```

3

```
for( yP = −overlapSize; yP < inpPatchHeight + overlapSize; yP++)
  for( xP = −overlapSize; xP < inpPatchWidth + overlapSize; xP++ ) {
    yTL = cTop + yP * 2
    xTL = cLeft + xP * 2
    yBR = yTL + 1
    xBR = xTL + 1
    yC = cTop / 2 + yP
    xC = cLeft / 2 + xP
    inpTLVal = InpY( InpSampleVal( yTL, xTL, CroppedHeight,
        CroppedWidth, CroppedYPic ) )
    inpTRVal = InpY( InpSampleVal( yTL, xBR, CroppedHeight,
        CroppedWidth, CroppedYPic ) )
    inpBLVal = InpY( InpSampleVal( yBR, xTL, CroppedHeight,
        CroppedWidth, CroppedYPic ) )
    inpBRVal = InpY( InpSampleVal( yBR, xBR, CroppedHeight,
        CroppedWidth, CroppedYPic ) )
    inpCbVal = InpC( InpSampleVal( yC, xC, CroppedHeight / 2,
        CroppedWidth / 2, CroppedCbPic ) )
    inpCrVal = InpC( InpSample Val( yC, xC, CroppedHeight / 2,
        CroppedWidth / 2, CroppedCrPic ) )
    if( nnpfc__component__last__flag = = 0 ) {
      inputTensor[ 0 ][ 0 ][ yP + overlapSize ][ xP + overlapSize ] = inpTLVal
      inputTensor[ 0 ][ 1 ][ yP + overlapSize ][ xP + overlapSize ] = inpTRVal
      inputTensor[ 0 ][ 2 ][ yP + overlapSize ][ xP + overlapSize ] = inpBLVal
      inputTensor[ 0 ][ 3 ][ yP + overlapSize ][ xP + overlapSize ] = inpBRVal
      inputTensor[ 0 ][ 4 ][ yP + overlapSize ][ xP + overlapSize ] = inpCbVal
      inputTensor[ 0 ][ 5 ][ yP + overlapSize ][ xP + overlapSize ] = inpCrVal
    } else {
      inputTensor[ 0 ][ yP + overlapSize ][ xP + overlapSize ][ 0 ] = inpTLVal
```

TABLE 23B-continued

| nnpfc_inp_order_idc | Process DeriveInputTensors( ) for deriving input tensors |
|---|---|

```
                inputTensor[ 0 ][ yP + overlapSize ][ xP + overlapSize ][ 1 ] = inpTRVal
                inputTensor[ 0 ][ yP + overlapSize ][ xP + overlapSize ][ 2 ] = inpBLVal
                inputTensor[ 0 ][ yP + overlapSize ][ xP + overlapSize ][ 3 ] = inpBRVal
                inputTensor[ 0 ][ yP + overlapSize ][ xP + overlapSize ][ 4 ] = inpCbVal
                inputTensor[ 0 ][ yP + overlapSize ][ xP + overlapSize ][ 5 ] = inpCrVal
              }
              if(nnpfc_auxiliary_inp_idc = = 1) {
                if( nnpfc_component_last_flag = = 0 )
                  inputTensor[ 0 ][ 6 ][ yP + overlapSize ][ xP + overlapSize ] =
          2^((StrengthControlVal − 42)/6)
                else
                  inputTensor[ 0 ][ yP + overlapSize ][ xP + overlapSize ][ 6 ] =
          2^((StrengthControlVal − 42)/6)
              }
            }
4         for(idx=0; idx< numInputImages; idx++) {
            for( yP = −overlapSize; yP < inpPatchHeight + overlapSize; yP++){
              for( xP = −overlapSize; xP < inpPatchWidth + overlap Size; xP++ ) {
                 inpVal = InpY( InpSampleVal( cTop + yP, cLeft + xP, CroppedHeight,
                  CroppedWidth, CroppedYPic[idx]) )
                  if( nnpfc_component_last_flag = = 0 )
                    inputTensor[idx][ 0 ][ 0 ][ yP + overlapSize ][ xP + overlapSize ] =
          inpVal
                  else
                    inputTensor[idx][ 0 ][ yP + overlapSize ][ xP + overlapSize ][0] =
          inpVal
                  if(nnpfc_auxiliary_inp_idc = = 1) {
                    if( nnpfc_component_last_flag = = 0 )
                        inputTensor[idx][ 0 ][ 1 ][ yP + overlapSize ][ xP + overlapSize ] =
          2^((StrengthControlVal − 42)/6)
                    else
                        inputTensor[idx][ 0 ][ yP + overlapSize ][ xP + overlapSize ][ 1 ] =
          2^((StrengthControlVal − 42)/6)
              }
              }
            }
5         for(idx=0; idx< numInputImages; idx++) {
            for( yP = −overlapSize; yP < inpPatchHeight + overlapSize; yP++){
              for( xP = −overlapSize; xP < inpPatchWidth + overlapSize; xP++ ) {
                  inpCbVal = InpC( InpSampleVal( cTop +yP, cLeft +xP,
          CroppedHeight / SubHeightC,
                  CroppedWidth / SubWidthC, CroppedCbPic[idx] ) )
                 inpCrVal = InpC( InpSampleVal( cTop + yP, cLeft + xP,
          CroppedHeight / SubHeightC,
                  CroppedWidth / SubWidthC, CroppedCrPic[idx] ) )
                  if( nnpfc_component_last_flag = = 0 ){
                  inputTensor[idx][ 0 ][ 0 ][ yP + overlapSize ][ xP + overlapSize ] =
          inpCbVal
                    inputTensor[idx][ 0 ][ 1 ][ yP + overlapSize ][ xP + overlapSize ] =
          inpCrVal
                  }
                  else {
                  inputTensor[idx][ 0 ][ yP + overlapSize ][ xP + overlapSize ][0] =
          inpCbVal
                    inputTensor[idx][ 0 ][ yP + overlapSize ][ xP + overlapSize ][1] =
          inpCrVal
                  }
                }
                  if(nnpfc_auxiliary_inp_idc = = 1) {
                  if( nnpfc_component_last_flag == 0)
                     inputTensor[idx][ 0 ][ 2 ][ yP + overlapSize ][ xP + overlapSize ] =
          2^((StrengthControlVal − 42)/6)
                  else
                     inputTensor[idx][ 0 ][ yP + overlapSize ][ xP + overlapSize ][ 2 ] =
          2^((StrengthControlVal − 42)/6)
                }
              }
           }
          }
6         for(idx=0; idx< numInputImages; idx++) {
            for( yP = −overlapSize; yP < inpPatchHeight + overlapSize; yP++){
              for( xP = −overlapSize; xP < inpPatchWidth + overlap Size; xP++ ) {
                  yY = cTop + yP
                 xY = cLeft + xP
                 yC = yY / SubHeightC
                 xC = xY / Sub WidthC
                 inp YVal = Inp Y( InpSample Val( yY, xY, CroppedHeight,
                  CroppedWidth, CroppedYPic[idx] ) )
```

TABLE 23B-continued

| nnpfc_inp_order_idc | Process DeriveInputTensors( ) for deriving input tensors |
|---|---|

```
          inpCbVal = InpC( InpSampleVal( yC, xC, CroppedHeight /
SubHeightC,
           CroppedWidth / SubWidthC, CroppedCbPic[idx] ) )
          inpCrVal = InpC( InpSampleVal( yC, xC, CroppedHeight /
SubHeightC,
           CroppedWidth / SubWidthC, CroppedCrPic[idx] ) )
           if( nnpfc_component_last_flag = = 0 ){
            inputTensor[idx][ 0 ][ 0 ][ yP + overlapSize ][ xP + overlapSize ] =
inpYVal
           inputTensor[idx][ 0 ][ 1 ][ yP + overlapSize ][ xP + overlapSize ] =
inpCbVal
              inputTensor[idx][ 0 ][ 2 ][ yP + overlapSize ][ xP + overlapSize ] =
inpCrVal
           }
           else {
              inputTensor[idx][ 0 ][ yP + overlapSize ][ xP + overlapSize ][0] =
inpYVal
            inputTensor[idx][ 0 ][ yP + overlapSize ][ xP + overlapSize ][1] =
inpCbVal
               inputTensor[idx][ 0 ][ yP + overlapSize ][ xP + overlapSize ][2] =
inpCrVal
           }
           if(nnpfc_auxiliary_inp_idc = = 1) {
            if( nnpfc_component_last_flag = = 0 )
               inputTensor[idx][ 0 ][ 3 ][ yP + overlapSize ][ xP + overlapSize ] =
2^((StrengthControlVal − 42)/6)
            else
               inputTensor[idx][ 0 ][ yP + overlapSize ][ xP + overlapSize ][ 3 ] =
2^((StrengthControlVal − 42)/6)
        }
      }
    }
  }
}
7
for(idx=0; idx< numInputImages; idx++) {
  for( yP = −overlapSize; yP < inpPatchHeight + overlapSize; yP++){
    for( xP = −overlapSize; xP < inpPatchWidth + overlap Size; xP++ ) {
           yTL = cTop + yP * 2
          xTL = cLeft + xP * 2
          yBR = yTL + 1
          xBR = xTL + 1
          yC = cTop / 2 + yP
          xC = cLeft / 2 + xP
          inpTLVal = InpY( InpSampleVal( yTL, xTL, CroppedHeight,
           CroppedWidth, CroppedYPic[idx] ) )
          inpTR Val = Inp Y( InpSampleVal( yTL, xBR, CroppedHeight,
           CroppedWidth, CroppedYPic[idx] ) )
          inpBL Val = InpY( InpSampleVal( yBR, xTL, CroppedHeight,
           CroppedWidth, CroppedYPic[idx] ) )
          inpBR Val = Inp Y( InpSampleVal( yBR, xBR, CroppedHeight,
           CroppedWidth, CroppedYPic[idx] ) )
          inpCbVal = InpC( InpSampleVal( yC, xC, CroppedHeight / 2,
           CroppedWidth / 2, CroppedCbPic[idx] ) )
          inpCrVal = InpC( InpSampleVal( yC, xC, CroppedHeight / 2,
           CroppedWidth / 2, CroppedCrPic[idx] ) )
           if( nnpfc_component_last_flag = = 0 ){
            inputTensor[idx][ 0 ][ 0][ yP + overlapSize ][ xP + overlapSize ] =
inpTLVal
            inputTensor[idx][ 0 ][1][ yP + overlapSize ][ xP + overlapSize ] =
inpTRVal
               inputTensor[idx][ 0 ][2][ yP + overlapSize ][ xP + overlapSize ] =
inpBLVal
               inputTensor[idx][ 0 ][3][ yP + overlapSize ][ xP + overlapSize ] =
inpBRVal
               inputTensor[idx][ 0 ][4][ yP + overlapSize ][ xP + overlapSize ] =
inpCbVal
               inputTensor[idx][ 0 ][5][ yP + overlapSize ][ xP + overlapSize ] =
inpCrVal
      }
           else {
               inputTensor[idx][ 0 ][ yP + overlapSize ][ xP + overlapSize ][0] =
inpTLVal
             inputTensor[idx][ 0 ][ yP + overlapSize ][ xP + overlapSize ][1] =
inpTRVal
               inputTensor[idx][ 0 ][ yP + overlapSize ][ xP + overlapSize ][2] =
inpBLVal
               inputTensor[idx][ 0 ][ yP + overlapSize ][ xP + overlapSize ][3] =
inpBRVal
```

TABLE 23B-continued

| nnpfc_inp_order_idc | Process DeriveInputTensors( ) for deriving input tensors |
| --- | --- |
| | inputTensor[idx][ 0 ][ yP + overlapSize ][ xP + overlapSize ][4] = inpCbVal<br>inputTensor[idx][ 0 ][ yP + overlapSize ][ xP + overlapSize ][5] = inpCrVal<br>}<br>if(nnpfc_auxiliary_inp_idc = = 1) {<br>if( nnpfc_component_last_flag = = 0)<br>inputTensor[idx][ 0 ][ 6][ yP + overlapSize ][ xP + overlapSize ] = $2^{(StrengthControlVal\ -\ 42)/6}$<br>else<br>inputTensor[idx][ 0 ][ yP + overlapSize ][ xP + overlapSize ][ 6] = $2^{(StrengthControlVal\ -\ 42)/6}$<br>}<br>}<br>}<br>} |
| 8 . . . 255 | Reserved |

nnpfc_out_normalization_range_flag equal to 1 specifies that the range of the output of the post-processing filter is [0,1]. nnpfc_out_normalization_range_flag equal to 0 specifies that the range of the output of the post-processing filter is [−1,1].

```
if(nnpfc_out_format_flag==0) {
  if(nnpfc_out_normalization_range_flag==0) {
    OutY( x ) = Clip3( 0, ( 1 << BitDepthY ) − 1, Round( (0.5*x + 0.5) * ( ( 1 << BitDepthY ) − 1 ) )
)
    OutC( x )= Clip3( 0, ( 1 << BitDepthC ) − 1, Round( (0.5*x + 0.5) * ( ( 1 << BitDepthC ) − 1 ) ) )
      }
  if(nnpfc_out_normalization_range_flag==1) {
    OutY( x ) = Clip3( 0, ( 1 << BitDepthY ) − 1, Round( x * ( ( 1 << BitDepthY ) − 1 ) ) )
    OutC( x )= Clip3( 0, ( 1 << BitDepthC ) − 1, Round( x * ( ( 1 << BitDepthC ) − 1 ) ) )
      }
}
```

nnpfc_out_format_flag equal to 1 indicates that the sample values output by the post-processing filter are unsigned integer numbers and the functions OutY and OutC are specified as follows:

```
if(nnpfc_out_format_flag==1) {
  shiftY = outTensorBitDepth − BitDepthY
  if( shiftY > 0 )
    OutY( x ) = Clip3( 0, ( 1 << BitDepthY ) − 1, ( x + ( 1 << ( shiftY − 1 ) ) ) >> shiftY )
  else
    OutY( x ) = x << ( BitDepthY − outTensorBitDepth )
  shiftC = outTensorBitDepth − BitDepthC
  if( shiftC > 0 )
    OutC( x ) = Clip3( 0, ( 1 << BitDepthC ) − 1, ( x + ( 1 << ( shiftC − 1 ) ) ) >> shiftC )
  else
    OutC( x ) = x << ( BitDepthC − outTensorBitDepth )
}
```

The variable outTensorBitDepth is derived from the syntax element nnpfc_out_tensor_bitdepth_minus8.

nnpfc_out_standardization_flag: equal 1 specifies that the output of the post processing needs to be de-standardized. nnpfc_out_standardization_flag equal 0 specifies no de-standardization is needed.

```
if(nnpfc_out_format_flag==0) {
if nnpfc_out_standardization_flag==1 ) {
OutY( x ) = Clip3( 0, ( 1 << BitDepthY ) − 1, Round( ((x * nnpfc_luma_std_val) +nnpfc_luma_mean_val) * ( (
1 << BitDepthY ) − 1 ) ) )
OutCb( x ) = Clip3( 0, ( 1 << BitDepthY ) − 1, Round( ((x * nnpfc_cb_std_val) +nnpfc_cb_mean_val) * ( (
```

-continued

```
1 << BitDepthY ) − 1 ) ) )
OutCb( x ) = Clip3( 0, ( 1 << BitDepthY ) − 1, Round( ((x * nnpfc_cr_std_val) +nnpfc_cr_mean_val) * ( (
1 << BitDepthY ) − 1 ) ) )
   }
}
```

nnpfc_out_order_idc may be based on any one of the following:

nnpfc_out_order_idc indicates the output order of samples resulting from the post-processing filter. Table 13 contains an informative description of nnpfc_out_order_idc values. The semantics of nnpfc_out_order_idc in the range of 0 to 3, inclusive, are specified in Table 14, in one example, and Table 24A and Table 24B, in one example, which specify a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc shall not be equal to 3. The value of nnpfc_out_order_idc shall be in the range of 0 to 255, inclusive. Values of nnpfc_out_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_out_order_idc.

TABLE 24A

| nnpfc_out_order_idc | Process StoreOutputTensors( ) for deriving sample values in the filtered picture from the output tensors |
|---|---|

0

```
for(idx=0; idx< numOutputImages; idx++){
  for( yP = 0; yP < outPatchHeight; yP++){
    for( xP = 0; xP < outPatch Width; xP++ ) {
      yY = cTop * outPatchHeight / inpPatchHeight + yP
      xY = cLeft * outPatchWidth / inpPatch Width + xP
      if ( yY < nnpfc_pic_height_in_luma_samples && xY <
nnpfc_pic_width_in_luma_samples ){
        if( nnpfc_component_last_flag = = 0 ){
            if(nnpfc_output_extra_dimension==0){
              FilteredYPic[idx][xY ][ yY ] = OutY( outputTensor[ 0 ][ idx ][ yP
][ xP ] )
            }
            else if(nnpfc_output_extra_dimension==1){
              FilteredYPic[idx][xY ][ yY ] = OutY( outputTensor[idx][ 0 ][ 0 ][
yP ][ xP ] )
            }
            else if(nnpfc_output_extra_dimension==2){
              FilteredYPic[idx][xY ][ yY ] = OutY( outputTensor[0][idx ][ 0 ][
yP ][ xP ] )
            }
           else{
              FilteredYPic[idx][xY ][ yY ] = OutY( outputTensor[0][0 ][ idx ][
yP ][ xP ] )
            }
          }
      else{
          if(nnpfc_output_extra_dimension==0){
              FilteredYPic[idx][xY ][ yY ] = OutY( outputTensor[ 0][ yP ][ xP
][idx] )
            }
            else if(nnpfc_output_extra_dimension==1){
              FilteredYPic[idx][xY ][ yY ] = OutY( outputTensor[idx][ 0 ][ yP
][ xP ][0] )
            }
            else{
              FilteredYPic[idx][xY ][ yY ] = OutY( outputTensor[0][ idx ][ yP
][ xP ][0] )
            }
          }
      }
    }
  }
}
```

1

```
for(idx=0; idx< numOutputImages; idx++){
  for( yP = 0; yP < outPatchHeight; yP++){
    for( xP = 0; xP < outPatch Width; xP++ ) {
      xSrc = cLeft * horCScaling + xP
      ySrc = cTop * verCScaling + yP
      if ( ySrc < nnpfc_pic_height_in_luma_samples / outSubHeightC &&
                xSrc < nnpfc_pic_width_in_luma_samples / outSubWidthC ){
        if( nnpfc_component_last_flag = = 0 ){
```

TABLE 24A-continued

| nnpfc_out_order_idc | Process StoreOutputTensors( ) for deriving sample values in the filtered picture from the output tensors |
| --- | --- |

```
                    if(nnpfc_output_extra_dimension==0){
                        FilteredCbPic[idx][ xSrc ][ ySrc ] = OutC( outputTensor[ 0 ][
idx*2 ][ yP ][xP] )
                        FilteredCrPic[idx][ xSrc ][ ySrc ] = OutC( outputTensor[ 0 ][
idx*2+1 ][ yP ][ xP ] )
                    }
                    Else if(nnpfc_output_extra_dimension==1){
                    FilteredCbPic[idx][ xSrc ][ ySrc ] = OutC( outputTensor[idx][ 0 ][
0 ][ yP ][xP] )
                        FilteredCrPic[idx][ xSrc ][ ySrc ] = OutC( outputTensor[idx][ 0
][ 1 ][ yP ][ xP ] )
                    }
                    else if(nnpfc_output_extra_dimension==2){
                     FilteredCbPic[idx][ xSrc ][ ySrc ] = OutC( outputTensor[ 0 ][idx][
0 ][ yP ][xP] )
                        FilteredCrPic[idx][ xSrc ][ ySrc ] = OutC( outputTensor[ 0
][idx][ 1 ][ yP ][ xP ] )
                    }
                   else{
                     FilteredCbPic[idx][ xSrc ][ ySrc ] = OutC( outputTensor[ 0 ][ 0
][idx][ yP ][xP] )
                        FilteredCrPic[idx][ xSrc ][ ySrc ] = OutC( outputTensor[ 0 ][ 1
][idx][ yP ][ xP ] )
                    }
                }
          else{
                if(nnpfc_output_extra_dimension==0){
                     FilteredCbPic[idx][ xSrc ][ ySrc ] = OutC( outputTensor[ 0 ][ yP
][xP][idx*2 ])
                         FilteredCrPic[idx][ xSrc ][ ySrc ] = OutC( outputTensor[ 0 ][ yP
][ xP ][idx*2+1] )
                    }
                    else if(nnpfc_output_extra_dimension==1){
                     FilteredCbPic[idx][ xSrc ][ ySrc ] = OutC( outputTensor[idx][ 0 ][
yP ][xP][0] )
                         FilteredCrPic[idx][ xSrc ][ ySrc ] = OutC( outputTensor[idx][ 0
][ yP ][ xP ][1] )
                    }
                    else{
                     FilteredCbPic[idx][ xSrc ][ ySrc ] = OutC( outputTensor[ 0 ][idx][
yP ][xP][0] )
                         FilteredCrPic[idx][ xSrc ][ ySrc ] = OutC( outputTensor[ 0
][idx][ yP ][ xP ][1] )
                    }
                }
           }
          }
        }
    }
2   for(idx=0; idx< numOutputImages; idx++){
      for( yP = 0; yP < outPatchHeight; yP++){
        for( xP = 0; xP < outPatch Width; xP++ ) {
          yY = cTop * outPatchHeight / inpPatchHeight + yP
          xY = cLeft * outPatchWidth / inpPatch Width + xP
          yC = yY / outSubHeightC
          xC = xY / outSub WidthC
          yPc = ( yP / outSubHeightC ) * outSubHeightC
          xPc = ( xP / outSubWidthC ) * outSubWidthC
          if ( yY < nnpfc_pic_height_in_luma_samples && xY <
nnpfc_pic_width_in_luma_samples){
             if( nnpfc_component_last_flag = = 0 ){
                    if(nnpfc_output_extra_dimension==0){
FilteredYPic[idx][ xY ][ yY ] = OutY( outputTensor[ 0 ][ idx*3 ][ yP ][ xP ]
)
                    FilteredCbPic[idx][ xC ][ yC ] = OutC( outputTensor[ 0 ][ idx*3+1
][ yPc ][ xPc ] )
                    FilteredCrPic[idx][ xC ][ yC ] = OutC( outputTensor[ 0 ][ idx*3+2
][ yPc ][ xPc ] )
                    }
                    else if(nnpfc_output_extra_dimension==1){
                    FilteredYPic[idx][ xY ][ yY ] = OutY( outputTensor[idx][ 0 ][ 0 ][
yP ][ xP ] )
                    FilteredCbPic[idx][ xC ][ yC ] = OutC( outputTensor[idx][ 0 ][ 1 ][
yPc ][ xPc ] )
                    FilteredCrPic[idx][ xC ][ yC ] = OutC( outputTensor[idx][ 0 ][ 2 ][
yPc ][ xPc ] )
                    }
```

TABLE 24A-continued

| nnpfc_out_order_idc | Process StoreOutputTensors( ) for deriving sample values in the filtered picture from the output tensors |
|---|---|

```
                         else if(nnpfc_output_extra_dimension==2){
                           FilteredYPic[idx][ xY ][ yY ] = OutY( outputTensor[ 0 ][idx][ 0 ][
yP ][ xP ] )
                           FilteredCbPic[idx][ xC ][ yC ] = OutC( outputTensor[ 0 ][idx][ 1
][ yPc ][ xPc ] )
                           FilteredCrPic[idx][ xC ][ yC ] = OutC( outputTensor[ 0 ][idx][ 2 ][
yPc ][ xPc ] )
                         }
                        else{
                           FilteredYPic[idx][ xY ][ yY ] = OutY( outputTensor[ 0 ][ 0 ][idx][
yP ][ xP ] )
                           FilteredCbPic[idx][ xC ][ yC ] = OutC( outputTensor[ 0 ][ 1
][idx][ yPc ][ xPc ] )
                           FilteredCrPic[idx][ xC ][ yC ] = OutC( outputTensor[ 0 ][ 2 ][idx][
yPc ][ xPc ] )
                            }
                      }
          else{
                  if(nnpfc_output_extra_dimension == 0){
                           FilteredYPic[idx][ xY ][ yY ] = OutY( outputTensor[ 0 ][ yP ][ xP
][idx*3] )
                           FilteredCbPic[idx][ xC ][ yC ] = OutC( outputTensor[ 0 ][ yPc ][
xPc ][idx*3+1] )
                           FilteredCrPic[idx][ xC ][ yC ] = OutC( outputTensor[ 0 ][ yPc ][
xPc ][idx*3+2] ) }
                         else if(nnpfc_output_extra_dimension == 1){
                           FilteredYPic[idx][ xY ][ yY ] = OutY( outputTensor[idx][ 0 ][ yP
][ xP ][ 0 ] )
                           FilteredCbPic[idx][ xC ][ yC ] = OutC( outputTensor[idx][ 0 ][
yPc ][ xPc ][ 1 ] )
                           FilteredCrPic[idx][ xC ][ yC ] = OutC( outputTensor[idx][ 0 ][
yPc ][ xPc ][ 2 ] )
                         }
                         else{
                           FilteredYPic[idx][ xY ][ yY ] = OutY ( outputTensor[ 0 ][idx][ yP
][ xP ][ 0 ] )
                           FilteredCbPic[idx][ xC ][ yC ] = OutC( outputTensor[ 0 ][idx][
yPc ][ xPc ][ 1 ] )
                           FilteredCrPic[idx][ xC ][ yC ] = OutC( outputTensor[ 0 ][idx][
yPc ][ xPc ][ 2 ] )            }
                  }
          }
        }
    }
}
```

3

```
for(idx=0; idx< numOutputImages; idx++){
  for( yP = 0; yP < outPatchHeight; yP++){
    for( xP = 0; xP < outPatch Width; xP++ ) {
      ySrc = cTop / 2 * outPatchHeight / inpPatchHeight + yP
      xSrc = cLeft / 2 * outPatch Width / inpPatchWidth + xP
      if ( ySrc < nnpfc_pic_height_in_luma_samples / 2 &&
            xSrc < nnpfc_pic_width_in_luma_samples / 2 {
        if( nnpfc_component_last_flag = = 0 ){
                 if(nnpfc_output_extra_dimension==0){
                     FilteredYPic[idx][ xSrc * 2 ][ ySrc * 2 ] = OutY( outputTensor[
0 ][ idx*6 ][ yP ][ xP ] )
                 FilteredYPic[idx][ xSrc * 2 + 1 ][ ySrc * 2 ] = OutY(
outputTensor[ 0 ][ idx*6+1 ][ yP ][ xP ] )
                 FilteredYPic[idx][ xSrc * 2 ][ ySrc * 2 + 1 ] = OutY(
outputTensor[ 0 ][ idx*6+2 ][ yP ][ xP ] )
                 FilteredYPic[idx][ xSrc * 2 + 1][ ySrc * 2 + 1 ] = OutY(
outputTensor[ 0 ][ idx*6+3 ][ yP ][ xP ] )
                 FilteredCbPic[idx][ xSrc ][ ySrc ] = OutC( outputTensor[ 0 ][
idx*6+4 ][ yP ][ xP ] )
                 FilteredCrPic[idx][ xSrc ][ ySrc ] = OutC( outputTensor[ 0 ][
idx*6+5 ][ yP ][ xP ] )
                 }
                 else if(nnpfc_output_extra_dimension==1){
                 FilteredYPic[idx][ xSrc * 2 ][ ySrc * 2 ] = OutY(
outputTensor[idx][ 0 ][ 0 ][ yP ][ xP ] )
                 FilteredYPic[idx][ xSrc * 2 + 1 ][ ySrc * 2 ] = OutY(
outputTensor[idx][ 0 ][ 1 ][ yP ][ xP ] )
                 FilteredYPic[idx][ xSrc * 2 ][ ySrc * 2 + 1 ] = OutY(
outputTensor[idx][ 0 ][ 2 ][ yP ][ xP ] )
                 FilteredYPic[idx][ xSrc * 2 + 1][ ySrc * 2 + 1 ] = OutY(
outputTensor[idx][ 0 ][ 3 ][ yP ][ xP ] )
                 FilteredCbPic[idx][ xSrc ][ ySrc ] = OutC( outputTensor[idx][ 0 ][
```

TABLE 24A-continued

| nnpfc_out_order_idc | Process StoreOutputTensors( ) for deriving sample values in the filtered picture from the output tensors |
|---|---|

```
4 ][ yP ][ xP ] )
        FilteredCrPic[idx][ xSrc ][ ySrc ] = OutC( outputTensor[idx][ 0 ][
5 ][ yP ][ xP ] )
        }
        else if(nnpfc_output_extra_dimension==2){
          FilteredYPic[idx][ xSrc * 2 ][ ySrc * 2 ] = OutY( outputTensor[ 0
][idx][ 0 ][ yP ][ xP ] )
          FilteredYPic[idx][ xSrc * 2 + 1 ][ ySrc * 2 ] = OutY(
outputTensor[ 0 ][idx][ 1 ][ yP ][ xP ] )
          FilteredYPic[idx][ xSrc * 2 ][ ySrc * 2 + 1 ] = OutY(
outputTensor[ 0 ][idx][ 2 ][ yP ][ xP ] )
          FilteredYPic[idx][ xSrc * 2 + 1][ ySrc * 2 + 1 ] = OutY(
outputTensor[ 0 ][idx][ 3 ][ yP ][ xP ] )
          FilteredCbPic[idx][ xSrc ][ ySrc ] = OutC( outputTensor[ 0 ][idx][
4 ][ yP ][ xP ] )
          FilteredCrPic[idx][ xSrc ][ ySrc ] = OutC( outputTensor[ 0 ][idx][
5 ][ yP ][ xP ] )
        }
       else{
          FilteredYPic[idx][ xSrc * 2 ][ ySrc * 2 ] = OutY( outputTensor[ 0
][ 0 ][idx][ yP ][ xP ] )
          FilteredYPic[idx][ xSrc * 2 + 1 ][ ySrc * 2 ] = OutY(
outputTensor[ 0 ][ 1 ][idx][ yP ][ xP ] )
          FilteredYPic[idx][ xSrc * 2 ][ ySrc * 2 + 1 ] = OutY(
outputTensor[ 0 ][ 2 ][idx][ yP ][ xP ] )
          FilteredYPic[idx][ xSrc * 2 + 1][ ySrc * 2 + 1 ] = OutY(
outputTensor[ 0 ][ 3 ][idx][ yP ][ xP ] )
          FilteredCbPic[idx][ xSrc ][ ySrc ] = OutC( outputTensor[ 0 ][ 4
][idx][ yP ][ xP ] )
          FilteredCrPic[idx][ xSrc ][ ySrc ] = OutC( outputTensor[ 0 ][ 5
][idx][ yP ][ xP ] )
          }
     }
   else{
     if(nnpfc_output_extra_dimension==0){
          FilteredYPic[idx][ xSrc * 2 ][ ySrc * 2 ] = OutY( outputTensor[ 0
][ yP ][ xP ][idx*6] )
          FilteredYPic[idx][ xSrc * 2 + 1 ][ ySrc * 2 ] = OutY(
outputTensor[ 0 ][ yP ][ xP ][idx*6+1] )
          FilteredYPic[idx][ xSrc * 2 ][ ySrc * 2 + 1 ] = OutY(
outputTensor[ 0 ][ yP ][ xP ][idx*6+2] )
          FilteredYPic[idx][ xSrc * 2 + 1][ ySrc * 2 + 1 ] = OutY(
outputTensor[ 0 ][ yP ][ xP ][idx*6+3] )
          FilteredCbPic[idx][ xSrc ][ ySrc ] = OutC( outputTensor[ 0 ][ yP
][ xP ][idx*6+4] )
          FilteredCrPic[idx][ xSrc ][ ySrc ] = OutC( outputTensor[ 0 ][ yP ][
xP ][idx*6+5] )
        }
        else if(nnpfc_output_extra_dimension==1){
          FilteredYPic[idx][ xSrc * 2 ][ ySrc * 2 ] = OutY(
outputTensor[idx][ 0 ][ yP ][ xP ][0] )
          FilteredYPic[idx][ xSrc * 2 + 1 ][ ySrc * 2 ] = OutY(
outputTensor[idx][ 0 ][ yP ][ xP ][1] )
          FilteredYPic[idx][ xSrc * 2 ][ ySrc * 2 + 1 ] = OutY(
outputTensor[idx][ 0 ][ yP ][ xP ][2] )
          FilteredYPic[idx][ xSrc * 2 + 1][ ySrc * 2 + 1 ] = OutY(
outputTensor[idx][ 0 ][ yP ][ xP ][3] )
        FilteredCbPic[idx][ xSrc ][ ySrc ] = OutC( outputTensor[idx][ 0 ][
yP ][ xP ][4] )
        FilteredCrPic[idx][ xSrc ][ ySrc ] = OutC( outputTensor[idx][ 0 ][
yP ][ xP ][5] )
        }
        else{
          FilteredYPic[idx][ xSrc * 2 ][ ySrc * 2 ] = OutY( outputTensor[ 0
][idx][ yP ][ xP ][0] )
          FilteredYPic[idx][ xSrc * 2 + 1 ][ ySrc * 2 ] = OutY(
outputTensor[ 0 ][idx][ yP ][ xP ][1] )
          FilteredYPic[idx][ xSrc * 2 ][ ySrc * 2 + 1 ] = OutY(
outputTensor[ 0 ][idx][ yP ][ xP ][2] )
          FilteredYPic[idx][ xSrc * 2 + 1][ ySrc * 2 + 1 ] = OutY(
outputTensor[ 0 ][idx][ yP ][ xP ][3] )
          FilteredCbPic[idx][ xSrc ][ ySrc ] = OutC( outputTensor[ 0 ][idx][
yP ][ xP ][4] )
          FilteredCrPic[idx][ xSrc ][ ySrc ] = OutC( outputTensor[ 0 ][idx][
yP ][ xP ][5] )
       }
     }
```

TABLE 24A-continued

| nnpfc_out_order_idc | Process StoreOutputTensors( ) for deriving sample values in the filtered picture from the output tensors |
|---|---|
| | } |
| | } |
| | } |
| | } |
| 4 . . . 255 | Reserved |

TABLE 24B

| nnpfc_out_order_idc | Process StoreOutputTensors( ) for deriving sample values in the filtered picture from the output tensors |
|---|---|
| 0 | for(idx=0; idx< numOutputImages; idx++) |
| | for( yP = 0; yP < outPatchHeight; yP++) |
| | for( xP = 0; xP < outPatch Width; xP++ ) { |
| | yY = cTop * outPatchHeight / inpPatchHeight + yP |
| | xY = cLeft * outPatch Width / inpPatch Width + xP |
| | if ( yY < nnpfc_pic_height_in_luma_samples && xY < nnpfc_pic_width_in_luma_samples ) |
| | if( nnpfc_component_last_flag == 0) |
| | FilteredYPic[ idx ][ xY ][yY ] = OutY ( outputTensor[ idx ][ 0 ][ 0 ][ yP ][ xP ] ) |
| | else |
| | FilteredYPic[ idx ][ xY ][ yY ] = OutY( outputTensor[ idx ][ 0 ][ yP ][ xP ][ 0 ] ) |
| | } |
| 1 | for(idx=0; idx< numOutputImages; idx++) |
| | for( yP = 0; yP < outPatchCHeight; yP++) |
| | for( xP = 0; xP < outPatchCWidth; xP++ ) { |
| | xSrc = cLeft * horCScaling + xP |
| | ySrc = cTop * verCScaling + yP |
| | if ( ySrc < nnpfc_pic_height_in_luma_samples / outSubHeightC && |
| | xSrc < nnpfc_pic_width_in_luma_samples / outSubWidthC ) |
| | if( nnpfc_component_last_flag = = 0 ) { |
| | FilteredCbPic[ idx ][ xSrc ][ ySrc ] = OutC( outputTensor[ idx ][ 0 ][ 0 ][ yP ][ xP ] ) |
| | FilteredCrPic[ idx ][ xSrc ][ ySrc ] = OutC( outputTensor[ idx ][ 0 ][ 1 ][ yP ][ xP ] ) |
| | } else { |
| | FilteredCbPic[ idx ][ xSrc ][ ySrc ] = OutC( outputTensor[ idx ][ 0 ][ yP ][ xP ][ 0 ] ) |
| | FilteredCrPic[ idx ][ xSrc ][ ySrc ] = OutC( outputTensor[ idx ][ 0 ][ yP ][ xP ][ 1 ] ) |
| | } |
| | } |
| 2 | for(idx=0; idx< numOutputImages; idx++) |
| | for( yP = 0; yP < outPatchHeight; yP++) |
| | for( xP = 0; xP < outPatch Width; xP++ ) { |
| | yY = cTop * outPatchHeight / inpPatchHeight + yP |
| | xY = cLeft * outPatch Width / inpPatch Width + xP |
| | yC = yY / outSubHeightC |
| | xC = xY / outSub WidthC |
| | yPc = ( yP / outSubHeightC ) * outSubHeightC |
| | xPc = (xP / outSubWidthC ) * outSubWidthC |
| | if ( yY < nnpfc_pic_height_in_luma_samples && xY < nnpfc_pic_width_in_luma_samples) |
| | if( nnpfc_component_last_flag = = 0 ) { |
| | FilteredYPic[ idx ][ xY ][ yY ] = OutY( outputTensor[ idx ][ 0 ][ 0 ][ yP ][ xP ] ) |
| | FilteredCbPic[ idx ][ xC ][ yC ] = OutC( outputTensor[ idx ][ 0 ][ 1 ][ yPc ][ xPc ] ) |
| | FilteredCrPic[ idx ][ xC ][ yC ] = OutC( outputTensor[ idx ][ 0 ][ 2 ][ yPc ][ xPc ] ) |
| | } else { |
| | FilteredYPic[ idx ][ xY ][ yY ] = OutY( outputTensor[ idx ][ 0 ][ yP ][ xP ][ 0 ] ) |
| | FilteredCbPic[ idx ][ xC ][ yC ] = OutC( outputTensor[ idx ][ 0 ][ yPc ][ xPc ][ 1 ] ) |
| | FilteredCrPic[ idx ][ xC ][ yC ] = OutC( outputTensor[ idx ][ 0 ][ yPc ][ xPc ][ 2 ] ) |
| | } |
| | } |
| 3 | for(idx=0; idx< numOutputImages; idx++) |
| | for( yP = 0; yP < outPatchHeight; yP++ ) |

TABLE 24B-continued

| nnpfc_out_order_idc | Process StoreOutputTensors( ) for deriving sample values in the filtered picture from the output tensors |
|---|---|
| | for( xP = 0; xP < outPatch Width; xP++ ) { ySrc = cTop / 2 * outPatchHeight / inpPatchHeight + yP xSrc = cLeft / 2 * outPatch Width / inpPatch Width + xP if ( ySrc < nnpfc_pic_height_in_luma_samples / 2 && xSrc < nnpfc_pic_width_in_luma_samples / 2) if( nnpfc_component_last_flag = = 0 ) { FilteredYPic[ idx ][ xSrc * 2 ][ ySrc * 2 ] = OutY( outputTensor[ idx ][ 0 ][ 0 ][ yP ][ xP ] ) FilteredYPic[ idx ][ xSrc * 2 + 1 ][ ySrc * 2 ] = OutY( outputTensor[ idx ][ 0 ][ 1 ][ yP ][ xP ] ) FilteredYPic[ idx ][ xSrc * 2 ][ ySrc * 2 + 1 ] = OutY( outputTensor[ idx ][ 0 ][ 2 ][ yP ][ xP ] ) FilteredYPic[ idx ][ xSrc * 2 + 1][ ySrc * 2 + 1 ] = OutY( outputTensor[ idx ][ 0 ][ 3 ][ yP ][ xP ]) FilteredCbPic[ idx ][ xSrc ][ ySrc ] = OutC( outputTensor[ idx ][ 0 ][ 4 ][ yP ][ xP ] ) FilteredCrPic[ idx ][ xSrc ][ ySrc ] = OutC( outputTensor[ idx ][ 0 ][ 5 ][ yP ][ xP ] ) } else { FilteredYPic[ idx ][ xSrc * 2 ][ ySrc * 2 ] = OutY( outputTensor[ idx ][ 0 ][ yP ][ xP ][ 0 ] ) FilteredYPic[ idx ][ xSrc * 2 + 1 ][ ySrc * 2 ] = OutY( outputTensor[ idx ][ 0 ][ yP ][ xP ][ 1 ]) FilteredYPic[ idx ][ xSrc * 2 ][ ySrc * 2 + 1 ] = OutY( outputTensor[ idx ][ 0 ][ yP ][ xP ][ 2 ]) FilteredYPic[ idx ][ xSrc * 2 + 1][ ySrc * 2 + 1 ] = OutY( outputTensor[ idx ][ 0 ][ yP ][ xP ][ 3 ]) FilteredCbPic[ idx ][ xSrc ][ ySrc ] = OutC( outputTensor[ idx ][ 0 ][ yP ][ xP ][ 4 ] ) FilteredCrPic[ idx ][ xSrc ][ ySrc ] = OutC( outputTensor[ idx ][ 0 ][ yP ][ xP ][ 5 ] ) } } |
| 4 . . . 255 | Reserved |

A base post-processing filter for a cropped decoded output picture picA is the filter that is identified by the first neural-network post-filter characteristics SEI message, in decoding order, that has a particular nnpfc_id value within a CLVS.

If there is another neural-network post-filter characteristics SEI message that has the same nnpfc_id value, has nnpfc_mode_idc equal to 1, has different content than the neural-network post-filter characteristics SEI message that defines the base post-processing filter, and pertains to the picture picA, the base post-processing filter is updated by decoding the ISO/IEC 15938-17 bitstream in that neural-network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter PostProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( nnpfc_inp_order_idc = = 0 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1 )
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 2 )
  for( cTop = 0; cTop < CroppedHeight; cTop += inpPatchHeight)
    for( cLeft = 0; cLeft < CroppedWidth; cLeft += inpPatchWidth) {
      DeriveInputTensors( )
      outputTensor = PostProcessingFilter( inputTensor )
      StoreOutputTensors( )
    }
else if( nnpfc_inp_order_idc = = 3 )
  for( cTop = 0; cTop < CroppedHeight; cTop += inpPatchHeight * 2 )
    for( cLeft = 0; cLeft < CroppedWidth; cLeft += inpPatchWidth * 2 ) {
```

-continued

```
        DeriveInputTensors( )
        outputTensor = PostProcessingFilter( inputTensor )
        StoreOutputTensors( )
    }
```

nnpfc_out_order_ide indicates the output order of samples resulting from the post-processing filter. Table 25 contains an informative description of nnpfc_out_order_idc values. The semantics of nnpfc_out_order_idc in the range of 0 to 7, inclusive, are specified in Table 26A, in one example, and Table 26B, in one example, which specify a process for deriving sample values in the filtered output sample arrays FilteredYPic, FilteredCbPic, and FilteredCrPic from the output tensors outputTensor for different values of nnpfc_out_order_idc and a given vertical sample coordinate cTop and a horizontal sample coordinate cLeft specifying the top-left sample location for the patch of samples included in the input tensors. When nnpfc_purpose is equal to 2 or 4, nnpfc_out_order_idc shall not be equal to 3. The value of nnpfc_out_order_idc shall be in the range of 0 to 255, inclusive. Values of nnpfc_out_order_idc greater than 3 are reserved for future specification by ITU-T|ISO/IEC and shall not be present in bitstreams conforming to this version of this Specification. Decoders conforming to this version of this Specification shall ignore SEI messages that contain reserved values of nnpfc_out_order_idc.

TABLE 25

| nnpfc_out_order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the chroma format is 4:2:0. |
| 4 | Only the luma matrix is present in the output tensor for each output image, thus the number of channels is 1 for each of the number of output pictures in the range of 0 to numOutputImages−1. |
| 5 | Only the chroma matrices are present in the output tensor for each output image, thus the number of channels is 2 for each of the number of output pictures in the range of 0 to numOutputImages−1. |
| 6 | The luma and chroma matrices are present in the output tensor for each output image, thus the number of channels is 3 for each of the number of output pictures in the range of 0 to numOutputImages−1. |
| 7 | Four luma matrices and two chroma matrices are present in the output tensor for each output image, thus the number of channels is 6 for each of the number of output pictures in the range of 0 to numOutputImages−1. This nnpfc_out_order_idc can only be used when the chroma format is 4:2:0. |
| 8 . . . 255 | Reserved |

TABLE 26A

| nnpfc_out_order_idc | Process StoreOutputTensors( ) for deriving sample values in the filtered picture from the output tensors |
|---|---|
| 0 | for( yP = 0; yP < outPatchHeight; yP++)<br>  for( xP = 0; xP < outPatchWidth; xP++ ) {<br>    yY = cTop * outPatchHeight / inpPatchHeight + yP<br>    xY = cLeft * outPatchWidth / inpPatchWidth + xP<br>    if ( yY < nnpfc_pic_height_in_luma_samples && xY <<br>nnpfc_pic_width_in_luma_samples )<br>      if( nnpfc_component_last_flag = = 0 )<br>        FilteredYPic[ xY ][yY ] = OutY( outputTensor[ 0 ][ 0 ][ yP ][ xP ] )<br>      else<br>        FilteredYPic[ xY ][ yY ] = OutY( outputTensor[ 0 ][ yP ][ xP ][ 0 ] )<br>  } |
| 1 | for( yP = 0; yP < outPatchCHeight; yP++)<br>  for( xP = 0; xP < outPatchCWidth; xP++ ) {<br>    xSrc = cLeft * horCScaling + xP<br>    ySrc = cTop * verCScaling + yP<br>    if ( ySrc < nnpfc_pic_height_in_luma_samples / outSubHeightC &&<br>        xSrc < nnpfc_pic_width_in_luma_samples / outSubWidthC )<br>      if( nnpfc_component_last_flag = = 0 ) {<br>        FilteredCbPic[ xSrc ][ ySrc ] = OutC( outputTensor[ 0 ][ 0 ][ yP ][ xP ]<br>)<br>        FilteredCrPic[ xSrc ][ ySrc ] = OutC( outputTensor[ 0 ][ 1 ][ yP ][ xP ]<br>)<br>      } else { |

TABLE 26A-continued

| nnpfc_out_order_idc | Process StoreOutputTensors( ) for deriving sample values in the filtered picture from the output tensors |
|---|---|

```
                              FilteredCbPic[ xSrc ][ ySrc ] = OutC( outputTensor[ 0 ][ yP ][ xP ][ 0 ]
                    )
                              FilteredCrPic[ xSrc ][ ySrc ] = OutC( outputTensor[ 0 ][ yP ][ xP ][ 1 ]
                    )
                          }
                      }
2                   for( yP = 0; yP < outPatchHeight; yP++)
                      for( xP = 0; xP < outPatchWidth; xP++ ) {
                        yY = cTop * outPatchHeight / inpPatchHeight + yP
                        xY = cLeft * outPatchWidth / inpPatchWidth + xP
                        yC = yY / outSubHeightC
                        xC = xY / outSubWidthC
                        yPc = ( yP / outSubHeightC ) * outSubHeightC
                        xPc = ( xP / outSubWidthC ) * outSubWidthC
                        if ( yY < nnpfc_pic_height_in_luma_samples && xY <
                    nnpfc_pic_width_in_luma_samples)
                          if( nnpfc_component_last_flag = = 0 ) {
                            FilteredYPic[ xY ][ yY ] = OutY( outputTensor[ 0 ][ 0 ][ yP ][ xP ] )
                            FilteredCbPic[ xC ][ yC ] = OutC( outputTensor[ 0 ][ 1 ][ yPc ][ xPc ] )
                            FilteredCrPic[ xC ][ yC ] = OutC( outputTensor[ 0 ][ 2 ][ yPc ][ xPc ] )
                          } else {
                            FilteredYPic[ xY ][ yY ] = OutY( outputTensor[ 0 ][ yP ][ xP ][ 0 ] )
                            FilteredCbPic[ xC ][ yC ] = OutC( outputTensor[ 0 ][ yPc ][ xPc ][ 1 ] )
                            FilteredCrPic[ xC ][ yC ] = OutC( outputTensor[ 0 ][ yPc ][ xPc ][ 2 ] )
                          }
                      }
3                   for( yP = 0; yP < outPatchHeight; yP++ )
                      for( xP = 0; xP < outPatchWidth; xP++ ) {
                        ySrc = cTop / 2 * outPatchHeight / inpPatchHeight + yP
                        xSrc = cLeft / 2 * outPatchWidth / inpPatchWidth + xP
                        if ( ySrc < nnpfc_pic_height_in_luma_samples / 2 &&
                            xSrc < nnpfc_pic_width_in_luma_samples / 2 )
                          if( nnpfc_component_last_flag = = 0 ) {
                            FilteredYPic[ xSrc * 2 ][ ySrc * 2 ] = OutY( outputTensor[ 0 ][ 0 ][ yP
                    ][ xP ] )
                            FilteredYPic[ xSrc * 2 + 1 ][ ySrc * 2 ] = OutY( outputTensor[ 0 ][ 1 ][
                    yP ][ xP ] )
                            FilteredYPic[ xSrc * 2 ][ ySrc * 2 + 1 ] = OutY( outputTensor[ 0 ][ 2 ][
                    yP ][ xP ] )
                            FilteredYPic[ xSrc * 2 + 1][ ySrc * 2 + 1 ] = OutY( outputTensor[ 0 ][
                    3 ][ yP ][ xP ] )
                            FilteredCbPic[ xSrc ][ ySrc ] = OutC( outputTensor[ 0 ][ 4 ][ yP ][ xP ]
                    )
                            FilteredCrPic[ xSrc ][ ySrc ] = OutC( outputTensor[ 0 ][ 5 ][ yP ][ xP ]
                    )
                          } else {
                            FilteredYPic[ xSrc * 2 ][ ySrc * 2 ] = OutY( outputTensor[ 0 ][ yP ][
                    xP ][ 0 ] )
                            FilteredYPic[ xSrc * 2 + 1 ][ ySrc * 2 ] = OutY( outputTensor[ 0 ][ yP
                    ][ xP ][ 1 ] )
                            FilteredYPic[ xSrc * 2 ][ ySrc * 2 + 1 ] = OutY( outputTensor[ 0 ][ yP
                    ][ xP ][ 2 ] )
                            FilteredYPic[ xSrc * 2 + 1][ ySrc * 2 + 1 ] = OutY( outputTensor[ 0 ][
                    yP ][ xP ][ 3 ] )
                            FilteredCbPic[ xSrc ][ ySrc ] = OutC( outputTensor[ 0 ][ yP ][ xP ][ 4 ]
                    )
                            FilteredCrPic[ xSrc ][ ySrc ] = OutC( outputTensor[ 0 ][ yP ][ xP ][ 5 ]
                    )
                          }
                      }
4                   for(idx=0; idx< numOutputImages; idx++){
                      for( yP = 0; yP < outPatchHeight; yP++){
                        for( xP = 0; xP < outPatchWidth; xP++ ) {
                          yY = cTop * outPatchHeight / inpPatchHeight + yP
                          xY = cLeft * outPatchWidth / inpPatchWidth + xP
                          if ( yY < nnpfc_pic_height_in_luma_samples && xY <
                    nnpfc_pic_width_in_luma_samples ){
                            if( nnpfc_component_last_flag = = 0 ){
                                  if(nnpfc_output_extra_dimension==0){
                                    FilteredYPic[idx][xY ][ yY ] = OutY( outputTensor[ 0 ][ idx ][ yP
                    ][ xP ] )
                                  }
                                  else if(nnpfc_output_extra_dimension==1){
                                    FilteredYPic[idx][xY ][ yY ] = OutY( outputTensor[idx][ 0 ][ 0 ][
                    yP ][ xP ] )
                                  }
                                  else if(nnpfc_output_extra_dimension==2){
```

TABLE 26A-continued

| nnpfc_out_order_idc | Process StoreOutputTensors( ) for deriving sample values in the filtered picture from the output tensors |
|---|---|
| | FilteredYPic[idx][xY ][ yY ] = OutY( outputTensor[0][idx ][ 0 ][ |
| | yP ][ xP ] ) |
| | } |
| | else{ |
| | FilteredYPic[idx][xY ][ yY ] = OutY( outputTensor[0][0 ][ idx ][ |
| | yP ][ xP ] ) |
| | } |
| | } |
| | else{ |
| | if(nnpfc_output_extra_dimension==0){ |
| | FilteredYPic[idx][xY ][ yY ] = OutY( outputTensor[ 0][ yP ][ xP |
| | ][idx] ) |
| | } |
| | else if(nnpfc_output_extra_dimension==1){ |
| | FilteredYPic[idx][xY ][ yY ] = OutY( outputTensor[idx][ 0 ][ yP |
| | ][ xP ][0] ) |
| | } |
| | else{ |
| | FilteredYPic[idx][xY ][ yY ] = OutY( outputTensor[0][ idx ][ yP |
| | ][ xP ][0] ) |
| | } |
| | } |
| | } |
| | } |
| | } |
| | } |
| 5 | for(idx=0; idx< numOutputImages; idx++){ |
| | for( yP = 0; yP < outPatchHeight; yP++){ |
| | for( xP = 0; xP < outPatchWidth; xP++ ) { |
| | xSrc = cLeft * horCScaling + xP |
| | ySrc = cTop * verCScaling + yP |
| | if ( ySrc < nnpfc_pic_height_in_luma_samples / outSubHeightC && |
| | xSrc < nnpfc_pic_width_in_luma_samples / outSubWidthC ){ |
| | if( nnpfc_component_last_flag = = 0 ){ |
| | if(nnpfc_output_extra_dimension==0){ |
| | FilteredCbPic[idx][ xSrc ][ ySrc ] = OutC( outputTensor[ 0 ][ |
| | idx*2 ][ yP ][xP] ) |
| | FilteredCrPic[idx][ xSrc ][ ySrc ] = OutC( outputTensor[ 0 ][ |
| | idx*2+1 ][ yP ][ xP ] ) |
| | } |
| | Else if(nnpfc_output_extra_dimension==1){ |
| | FilteredCbPic[idx][ xSrc ][ ySrc ] = OutC( outputTensor[idx][ 0 ][ |
| | 0 ][ yP ][xP] ) |
| | FilteredCrPic[idx][ xSrc ][ ySrc ] = OutC( outputTensor[idx][ 0 |
| | ][ 1 ][ yP ][ xP ] ) |
| | } |
| | else if(nnpfc_output_extra_dimension==2){ |
| | FilteredCbPic[idx][ xSrc ][ ySrc ] = OutC( outputTensor[ 0 ][idx][ |
| | 0 ][ yP ][xP] ) |
| | FilteredCrPic[idx][ xSrc ][ ySrc ] = OutC( outputTensor[ 0 |
| | ][idx][ 1 ][ yP ][ xP ] ) |
| | } |
| | else{ |
| | FilteredCbPic[idx][ xSrc ][ ySrc ] = OutC( outputTensor[ 0 ][ 0 |
| | ][idx][ yP ][xP] ) |
| | FilteredCrPic[idx][ xSrc ][ ySrc ] = OutC( outputTensor[ 0 ][ 1 |
| | ][idx][ yP ][ xP ] ) |
| | } |
| | } |
| | else{ |
| | if(nnpfc_output_extra_dimension==0){ |
| | FilteredCbPic[idx][ xSrc ][ ySrc ] = OutC( outputTensor[ 0 ][ yP |
| | ][xP][idx*2 ]) |
| | FilteredCrPic[idx][ xSrc ][ ySrc ] = OutC( outputTensor[ 0 ][ yP |
| | ][ xP ][idx*2+1] ) |
| | } |
| | else if(nnpfc_output_extra_dimension==1){ |
| | FilteredCbPic[idx][ xSrc ][ ySrc ] = OutC( outputTensor[idx][ 0 ][ |
| | yP ][xP][0] ) |
| | FilteredCrPic[idx][ xSrc ][ ySrc ] = OutC( outputTensor[idx][ 0 |
| | ][ yP ][ xP ][1] ) |
| | } |
| | else{ |
| | FilteredCbPic[idx][ xSrc ][ ySrc ] = OutC( outputTensor[ 0 ][idx][ |
| | yP ][xP][0] ) |
| | FilteredCrPic[idx][ xSrc ][ ySrc ] = OutC( outputTensor[ 0 |
| | ][idx][ yP ][ xP ][1] ) |

TABLE 26A-continued

| nnpfc_out_order_idc | Process StoreOutputTensors( ) for deriving sample values in the filtered picture from the output tensors |
|---|---|

```
                    }
                  }
               }
             }
           }
         }
6        for(idx=0; idx< numOutputImages; idx++){
           for( yP = 0; yP < outPatchHeight; yP++){
             for( xP = 0; xP < outPatchWidth; xP++ ) {
               yY = cTop * outPatchHeight / inpPatchHeight + yP
               xY = cLeft * outPatchWidth / inpPatchWidth + xP
               yC = yY / outSubHeightC
               xC = xY / outSubWidthC
               yPc = ( yP / outSubHeightC ) * outSubHeightC
               xPc = ( xP / outSubWidthC ) * outSubWidthC
               if ( yY < nnpfc_pic_height_in_luma_samples && xY <
nnpfc_pic_width_in_luma_samples){
                 if( nnpfc_component_last_flag = = 0 ){
                      if(nnpfc_output_extra_dimension==0){
FilteredYPic[idx][ xY ][ yY ] = OutY( outputTensor[ 0 ][ idx*3 ][ yP ][ xP ]
)
                      FilteredCbPic[idx][ xC ][ yC ] = OutC( outputTensor[ 0 ][ idx*3+1
][ yPc ][ xPc ] )
                      FilteredCrPic[idx][ xC ][ yC ] = OutC( outputTensor[ 0 ][ idx*3+2
][ yPc ][ xPc ] )
                      }
                      else if(nnpfc_output_extra_dimension==1){
                      FilteredYPic[idx][ xY ][ yY ] = OutY( outputTensor[idx][ 0 ][ 0 ][
yP ][ xP ] )
                      FilteredCbPic[idx][ xC ][ yC ] = OutC( outputTensor[idx][ 0 ][ 1 ][
yPc ][ xPc ] )
                      FilteredCrPic[idx][ xC ][ yC ] = OutC( outputTensor[idx][ 0 ][ 2 ][
yPc ][ xPc ] )
                      }
                      else if(nnpfc_output_extra_dimension == 2){
                       FilteredYPic[idx][ xY ][ yY ] = OutY( outputTensor[ 0 ][idx][ 0 ][
yP ][ xP ] )
                       FilteredCbPic[idx][ xC ][ yC ] = OutC( outputTensor[ 0 ][idx][ 1
][ yPc ][ xPc ] )
                       FilteredCrPic[idx][ xC ][ yC ] = OutC( outputTensor[ 0 ][idx][ 2 ][
yPc ][ xPc ] )
                      }
                     else{
                       FilteredYPic[idx][ xY ][ yY ] = OutY( outputTensor[ 0 ][ 0 ][idx][
yP ][ xP ] )
                       FilteredCbPic[idx][ xC ][ yC ] = OutC( outputTensor[ 0 ][ 1
][idx][ yPc ][ xPc ] )
                       FilteredCrPic[idx][ xC ][ yC ] = OutC( outputTensor[ 0 ][ 2 ][idx][
yPc ][ xPc ] )
                        }
                    }
               else{
                   if(nnpfc_output_extra_dimension==0){
                       FilteredYPic[idx][ xY ][ yY ] = OutY ( outputTensor[ 0 ][ yP ][ xP
][idx*3] )
                       FilteredCbPic[idx][ xC ][ yC ] = OutC( outputTensor[ 0 ][ yPc ][
xPc ][idx*3+1] )
                       FilteredCrPic[idx][ xC ][ yC ] = OutC( outputTensor[ 0 ][ yPc ][
xPc ][idx*3+2] )            }
                      else if(nnpfc_output_extra_dimension == 1){
                       FilteredYPic[idx][ xY ][ yY ] = OutY( outputTensor[idx][ 0 ][ yP
][ xP ][ 0 ] )
                       FilteredCbPic[idx][ xC ][ yC ] = OutC( outputTensor[idx][ 0 ][
yPc ][ xPc ][ 1 ] )
                       FilteredCrPic[idx][ xC ][ yC ] = OutC( outputTensor[idx][ 0 ][
yPc ][ xPc ][ 2 ] )
                      }
                      else{
                       FilteredYPic[idx][ xY ][ yY ] = OutY( outputTensor[ 0 ][idx][ yP
][ xP ][ 0 ] )
                       FilteredCbPic[idx][ xC ][ yC ] = OutC( outputTensor[ 0 ][idx][
yPc ][ xPc ][ 1 ] )
                       FilteredCrPic[idx][ xC ][ yC ] = OutC( outputTensor[ 0 ][idx][
yPc ][ xPc ][ 2 ] )            }
                    }
               }
             }
```

TABLE 26A-continued

| nnpfc_out_order_idc | Process StoreOutputTensors( ) for deriving sample values in the filtered picture from the output tensors |
|---|---|
| | } <br> } |
| 7 | for(idx=0; idx< numOutputImages; idx++){ <br> for( yP = 0; yP < outPatchHeight; yP++){ <br> for( xP = 0; xP < outPatchWidth; xP++ ) { <br> ySrc = cTop / 2 * outPatchHeight / inpPatchHeight + yP <br> xSrc = cLeft / 2 * outPatchWidth / inpPatchWidth + xP <br> if ( ySrc < nnpfc_pic_height_in_luma_samples / 2 && <br> xSrc < nnpfc_pic_width_in_luma_samples / 2 { <br> if( nnpfc_component_last_flag = = 0 ){ <br> if(nnpfc_output_extra_dimension==0){ <br> FilteredYPic[idx][ xSrc * 2 ][ ySrc * 2 ] = OutY( outputTensor[ 0 ][ idx*6 ][ yP ][ xP ] ) <br> FilteredYPic[idx][ xSrc * 2 + 1 ][ ySrc * 2 ] = OutY( outputTensor[ 0 ][ idx*6+1 ][ yP ][ xP ] ) <br> FilteredYPic[idx][ xSrc * 2 ][ ySrc * 2 + 1 ] = OutY( outputTensor[ 0 ][ idx*6+2 ][ yP ][ xP ] ) <br> FilteredYPic[idx][ xSrc * 2 + 1][ ySrc * 2 + 1 ] = OutY( outputTensor[ 0 ][ idx*6+3 ][ yP ][ xP ] ) <br> FilteredCbPic[idx][ xSrc ][ ySrc ] = OutC( outputTensor[ 0 ][ idx*6+4 ][ yP ][ xP ] ) <br> FilteredCrPic[idx][ xSrc ][ ySrc ] = OutC( outputTensor[ 0 ][ idx*6+5 ][ yP ][ xP ] ) <br> } <br> else if(nnpfc_output_extra_dimension == 1){ <br> FilteredYPic[idx][ xSrc * 2 ][ ySrc * 2 ] = OutY( outputTensor[idx][ 0 ][ 0 ][ yP ][ xP ] ) <br> FilteredYPic[idx][ xSrc * 2 + 1 ][ ySrc * 2 ] = OutY( outputTensor[idx][ 0 ][ 1 ][ yP ][ xP ] ) <br> FilteredYPic[idx][ xSrc * 2 ][ ySrc * 2 + 1 ] = OutY( outputTensor[idx][ 0 ][ 2 ][ yP ][ xP ] ) <br> FilteredYPic[idx][ xSrc * 2 + 1][ ySrc * 2 + 1 ] = OutY( outputTensor[idx][ 0 ][ 3 ][ yP ][ xP ] ) <br> FilteredCbPic[idx][ xSrc ][ ySrc ] = OutC( outputTensor[idx][ 0 ][ 4 ][ yP ][ xP ] ) <br> FilteredCrPic[idx][ xSrc ][ ySrc ] = OutC( outputTensor[idx][ 0 ][ 5 ][ yP ][ xP ] ) <br> } <br> else if(nnpfc_output_extra_dimension == 2){ <br> FilteredYPic[idx][ xSrc * 2 ][ ySrc * 2 ] = OutY( outputTensor[ 0 ][idx][ 0 ][ yP ][ xP ] ) <br> FilteredYPic[idx][ xSrc * 2 + 1 ][ ySrc * 2 ] = OutY( outputTensor[ 0 ][idx][ 1 ][ yP ][ xP ] ) <br> FilteredYPic[idx][ xSrc * 2 ][ ySrc * 2 + 1 ] = OutY( outputTensor[ 0 ][idx][ 2 ][ yP ][ xP ] ) <br> FilteredYPic[idx][ xSrc * 2 + 1][ ySrc * 2 + 1 ] = OutY( outputTensor[ 0 ][idx][ 3 ][ yP ][ xP ] ) <br> FilteredCbPic[idx][ xSrc ][ ySrc ] = OutC( outputTensor[ 0 ][idx][ 4 ][ yP ][ xP ] ) <br> FilteredCrPic[idx][ xSrc ][ ySrc ] = OutC( outputTensor[ 0 ][idx][ 5 ][ yP ][ xP ] ) <br> } <br> else{ <br> FilteredYPic[idx][ xSrc * 2 ][ ySrc * 2 ] = OutY( outputTensor[ 0 ][ 0 ][idx][ yP ][ xP ] ) <br> FilteredYPic[idx][ xSrc * 2 + 1 ][ ySrc * 2 ] = OutY( outputTensor[ 0 ][ 1 ][idx][ yP ][ xP ] ) <br> FilteredYPic[idx][ xSrc * 2 ][ ySrc * 2 + 1 ] = OutY( outputTensor[ 0 ][ 2 ][idx][ yP ][ xP ] ) <br> FilteredYPic[idx][ xSrc * 2 + 1][ ySrc * 2 + 1 ] = OutY( outputTensor[ 0 ][ 3 ][idx][ yP ][ xP ] ) <br> FilteredCbPic[idx][ xSrc ][ ySrc ] = OutC( outputTensor[ 0 ][ 4 ][idx][ yP ][ xP ] ) <br> FilteredCrPic[idx][ xSrc ][ ySrc ] = OutC( outputTensor[ 0 ][ 5 ][idx][ yP ][ xP ] ) <br> } <br> } <br> else{ <br> if(nnpfc_output_extra_dimension==0){ <br> FilteredYPic[idx][ xSrc * 2 ][ ySrc * 2 ] = OutY( outputTensor[ 0 ][ yP ][ xP ][idx*6] ) <br> FilteredYPic[idx][ xSrc * 2 + 1 ][ ySrc * 2 ] = OutY( outputTensor[ 0 ][ yP ][ xP ][idx*6+1] ) <br> FilteredYPic[idx][ xSrc * 2 ][ ySrc * 2 + 1 ] = OutY( outputTensor[ 0 ][ yP ][ xP ][idx*6+2] ) <br> FilteredYPic[idx][ xSrc * 2 + 1][ ySrc * 2 + 1 ] = OutY( outputTensor[ 0 ][ yP ][ xP ][idx*6+3] ) |

TABLE 26A-continued

| nnpfc_out_order_idc | Process StoreOutputTensors( ) for deriving sample values in the filtered picture from the output tensors |
| --- | --- |
| | FilteredCbPic[idx][ xSrc ][ ySrc ] = OutC( outputTensor[ 0 ][ yP ][ xP ][idx*6+4] )<br>FilteredCrPic[idx][ xSrc ][ ySrc ] = OutC( outputTensor[ 0 ][ yP ][ xP ][idx*6+5] )<br>}<br>else if(nnpfc_output_extra_dimension == 1){<br>FilteredYPic[idx][ xSrc * 2 ][ ySrc * 2 ] = OutY( outputTensor[idx][ 0 ][ yP ][ xP ][0] )<br>FilteredYPic[idx][ xSrc * 2 + 1 ][ ySrc * 2 ] = OutY( outputTensor[idx][ 0 ][ yP ][ xP ][1] )<br>FilteredYPic[idx][ xSrc * 2 ][ ySrc * 2 + 1 ] = OutY( outputTensor[idx][ 0 ][ yP ][ xP ][2] )<br>FilteredYPic[idx][ xSrc * 2 + 1][ ySrc * 2 + 1 ] = OutY( outputTensor[idx][ 0 ][ yP ][ xP ][3] )<br>FilteredCbPic[idx][ xSrc ][ ySrc ] = OutC( outputTensor[idx][ 0 ][ yP ][ xP ][4] )<br>FilteredCrPic[idx][ xSrc ][ ySrc ] = OutC( outputTensor[idx][ 0 ][ yP ][ xP ][5] )<br>}<br>else{<br>FilteredYPic[idx][ xSrc * 2 ][ ySrc * 2 ] = OutY( outputTensor[ 0 ][idx][ yP ][ xP ][0] )<br>FilteredYPic[idx][ xSrc * 2 + 1 ][ ySrc * 2 ] = OutY( outputTensor[ 0 ][idx][ yP ][ xP ][1] )<br>FilteredYPic[idx][ xSrc * 2 ][ ySrc * 2 + 1 ] = OutY( outputTensor[ 0 ][idx][ yP ][ xP ][2] )<br>FilteredYPic[idx][ xSrc * 2 + 1][ ySrc * 2 + 1 ] = OutY( outputTensor[ 0 ][idx][ yP ][ xP ][3] )<br>FilteredCbPic[idx][ xSrc ][ ySrc ] = OutC( outputTensor[ 0 ][idx][ yP ][ xP ][4] )<br>FilteredCrPic[idx][ xSrc ][ ySrc ] = OutC( outputTensor[ 0 ][idx][ yP ][ xP ][5] )<br>}<br>}<br>}<br>}<br>}<br>} |
| 8 . . . 255 | Reserved |

TABLE 26B

| nnpfc_out_order_idc | Process StoreOutputTensors( ) for deriving sample values in the filtered picture from the output tensors |
| --- | --- |
| 0 | for( yP = 0; yP < outPatchHeight; yP++)<br>for( xP = 0; xP < outPatchWidth; xP++ ) {<br>yY = cTop * outPatchHeight / inpPatchHeight + yP<br>xY = cLeft * outPatchWidth / inpPatchWidth + xP<br>if ( yY < nnpfc_pic_height_in_luma_samples && xY < nnpfc_pic_width_in_luma_samples )<br>if( nnpfc_component_last_flag = = 0 )<br>FilteredYPic[ xY ][yY ] = OutY ( outputTensor[ 0 ][ 0 ][ yP ][ xP ] )<br>else<br>FilteredYPic[ xY ][ yY ] = OutY ( outputTensor[ 0 ][ yP ][ xP ][ 0 ] )<br>} |
| 1 | for( yP = 0; yP < outPatchCHeight; yP++)<br>for( xP = 0; xP < outPatchCWidth; xP++ ) {<br>xSrc = cLeft * horCScaling + xP<br>ySrc = cTop * verCScaling + yP<br>if ( ySrc < nnpfc_pic_height_in_luma_samples / outSubHeightC &&<br>xSrc < nnpfc_pic_width_in_luma_samples / outSubWidthC )<br>if( nnpfc_component_last_flag = = 0 ) {<br>FilteredCbPic[ xSrc ][ ySrc ] = OutC( outputTensor[ 0 ][ 0 ][ yP ][ xP ] )<br>FilteredCrPic[ xSrc ][ ySrc ] = OutC( outputTensor[ 0 ][ 1 ][ yP ][ xP ] )<br>} else {<br>FilteredCbPic[ xSrc ][ ySrc ] = OutC( outputTensor[ 0 ][ yP ][ xP ][ 0 ] )<br>FilteredCrPic[ xSrc ][ ySrc ] = OutC( outputTensor[ 0 ][ yP ][ xP ][ 1 ] )<br>}<br>} |

TABLE 26B-continued

| nnpfc_out_order_idc | Process StoreOutputTensors( ) for deriving sample values in the filtered picture from the output tensors |
|---|---|
| 2 | for( yP = 0; yP < outPatchHeight; yP++)<br>for( xP = 0; xP < outPatchWidth; xP++ ) {<br>yY = cTop * outPatchHeight / inpPatchHeight + yP<br>xY = cLeft * outPatchWidth / inpPatchWidth + xP<br>yC = yY / outSubHeightC<br>xC = xY / outSubWidthC<br>yPc = ( yP / outSubHeightC ) * outSubHeightC<br>xPc = ( xP / outSubWidthC ) * outSubWidthC<br>if ( yY < nnpfc_pic_height_in_luma_samples && xY <<br>nnpfc_pic_width_in_luma_samples)<br>if( nnpfc_component_last_flag = = 0 ) {<br>FilteredYPic[ xY ][ yY ] = OutY( outputTensor[ 0 ][ 0 ][ yP ][ xP ] )<br>FilteredCbPic[ xC ][ yC ] = OutC( outputTensor[ 0 ][ 1 ][ yPc ][ xPc ] )<br>FilteredCrPic[ xC ][ yC ] = OutC( outputTensor[ 0 ][ 2 ][ yPc ][ xPc ] )<br>} else {<br>FilteredYPic[ xY ][ yY ] = OutY( outputTensor[ 0 ][ yP ][ xP ][ 0 ] )<br>FilteredCbPic[ xC ][ yC ] = OutC( outputTensor[ 0 ][ yPc ][ xPc ][ 1 ] )<br>FilteredCrPic[ xC ][ yC ] = OutC( outputTensor[ 0 ][ yPc ][ xPc ][ 2 ] )<br>}<br>} |
| 3 | for( yP = 0; yP < outPatchHeight; yP++ )<br>for( xP = 0; xP < outPatchWidth; xP++ ) {<br>ySrc = cTop / 2 * outPatchHeight / inpPatchHeight + yP<br>xSrc = cLeft / 2 * outPatchWidth / inpPatchWidth + xP<br>if ( ySrc < nnpfc_pic_height_in_luma_samples / 2 &&<br>xSrc < nnpfc_pic_width_in_luma_samples / 2 )<br>if( nnpfc_component_last_flag = = 0 ) {<br>FilteredYPic[ xSrc * 2 ][ ySrc * 2 ] = OutY( outputTensor[ 0 ][ 0 ][ yP<br>][ xP ] )<br>FilteredYPic[ xSrc * 2 + 1 ][ ySrc * 2 ] = OutY( outputTensor[ 0 ][ 1 ][<br>yP ][ xP ] )<br>FilteredYPic[ xSrc * 2 ][ ySrc * 2 + 1 ] = OutY( outputTensor[ 0 ][ 2 ][<br>yP ][ xP ] )<br>FilteredYPic[ xSrc * 2 + 1][ ySrc * 2 + 1 ] = OutY( outputTensor[ 0 ][<br>3 ][ yP ][ xP ] )<br>FilteredCbPic[ xSrc ][ ySrc ] = OutC( outputTensor[ 0 ][ 4 ][ yP ][ xP ]<br>)<br>FilteredCrPic[ xSrc ][ ySrc ] = OutC( outputTensor[ 0 ][ 5 ][ yP ][ xP ]<br>)<br>} else {<br>FilteredYPic[ xSrc * 2 ][ ySrc * 2 ] = OutY( outputTensor[ 0 ][ yP ][<br>xP ][ 0 ] )<br>FilteredYPic[ xSrc * 2 + 1 ][ ySrc * 2 ] = OutY( outputTensor[ 0 ][ yP<br>][ xP ][ 1 ] )<br>FilteredYPic[ xSrc * 2 ][ ySrc * 2 + 1 ] = OutY( outputTensor[ 0 ][ yP<br>][ xP ][ 2 ] )<br>FilteredYPic[ xSrc * 2 + 1][ ySrc * 2 + 1 ] = OutY( outputTensor[ 0 ][<br>yP ][ xP ][ 3 ] )<br>FilteredCbPic[ xSrc ][ ySrc ] = OutC( outputTensor[ 0 ][ yP ][ xP ][ 4 ]<br>)<br>FilteredCrPic[ xSrc ][ ySrc ] = OutC( outputTensor[ 0 ][ yP ][ xP ][ 5 ]<br>)<br>}<br>} |
| 4 | for(idx=0; idx< numOutputImages; idx++){<br>for( yP = 0; yP < outPatchHeight; yP++){<br>for( xP = 0; xP < outPatchWidth; xP++ ) {<br>yY = cTop * outPatchHeight / inpPatchHeight + yP<br>xY = cLeft * outPatchWidth / inpPatchWidth + xP<br>if ( yY < nnpfc_pic_height_in_luma_samples && xY <<br>nnpfc_pic_width_in_luma_samples ){<br>if( nnpfc_component_last_flag = = 0 )<br>FilteredYPic[idx][xY ][ yY ] = OutY( outputTensor[idx][ 0 ][ 0 ][ yP<br>][ xP ] )<br>else<br>FilteredYPic[idx][xY ][ yY ] = OutY( outputTensor[idx][ 0 ][ yP ][<br>xP ][0] )<br>}<br>}<br>}<br>} |
| 5 | for(idx=0; idx< numOutputImages; idx++){<br>for( yP = 0; yP < outPatchHeight; yP++){<br>for( xP = 0; xP < outPatchWidth; xP++ ) {<br>xSrc = cLeft * horCScaling + xP<br>ySrc = cTop * verCScaling + yP<br>if ( ySrc < nnpfc_pic_height_in_luma_samples / outSubHeightC && |

TABLE 26B-continued

| nnpfc_out_order_idc | Process StoreOutputTensors( ) for deriving sample values in the filtered picture from the output tensors |
|---|---|
| | xSrc < nnpfc_pic_width_in_luma_samples / outSubWidthC ){<br>if( nnpfc_component_last_flag = = 0 ){ FilteredCbPic[idx][<br>xSrc ][ ySrc ] = OutC( outputTensor[idx][ 0 ][ 0 ][ yP ][xP] )<br>FilteredCrPic[idx][ xSrc ][ ySrc ] = OutC( outputTensor[idx][ 0 ][<br>1 ][ yP ][ xP ] )<br>}<br>else{ FilteredCbPic[idx][ xSrc ][ ySrc ] = OutC(<br>outputTensor[idx][ 0 ][ yP ][xP][0] )<br>FilteredCrPic[idx][ xSrc ][ ySrc ] = OutC( outputTensor[idx][ 0 ][<br>yP ][ xP ][1] )<br>}<br>}<br>}<br>}<br>} |
| 6 | for(idx=0; idx< numOutputImages; idx++){<br>for( yP = 0; yP < outPatchHeight; yP++){<br>for( xP = 0; xP < outPatchWidth; xP++ ) {<br>yY = cTop * outPatchHeight / inpPatchHeight + yP<br>xY = cLeft * outPatchWidth / inpPatchWidth + xP<br>yC = yY / outSubHeightC<br>xC = xY / outSubWidthC<br>yPc = ( yP / outSubHeightC ) * outSubHeightC<br>xPc = ( xP / outSubWidthC ) * outSubWidthC<br>if ( yY < nnpfc_pic_height_in_luma_samples && xY <<br>nnpfc_pic_width_in_luma_samples){<br>if( nnpfc_component_last_flag = = 0 ){ FilteredYPic[idx][<br>xY ][ yY ] = OutY( outputTensor[idx][ 0 ][ 0 ][ yP ][ xP ] )<br>FilteredCbPic[idx][ xC ][ yC ] = OutC( outputTensor[idx][ 0 ][ 1 ][<br>yPc ][ xPc ] )<br>FilteredCrPic[idx][ xC ][ yC ] = OutC( outputTensor[idx][ 0 ][ 2 ][<br>yPc ][ xPc ] )<br>}<br>else{<br>FilteredYPic[idx][ xY ][ yY ] = OutY( outputTensor[idx][ 0 ][ yP ][<br>xP ][ 0 ] )<br>FilteredCbPic[idx][ xC ][ yC ] = OutC( outputTensor[idx][ 0 ][ yPc<br>][ xPc ][ 1 ] )<br>FilteredCrPic[idx][ xC ][ yC ] = OutC( outputTensor[idx][ 0 ][ yPc ][<br>xPc ][ 2 ] )<br>}<br>}<br>}<br>}<br>} |
| 7 | for(idx=0; idx< numOutputImages; idx++){<br>for( yP = 0; yP < outPatchHeight; yP++){<br>for( xP = 0; xP < outPatchWidth; xP++ ) {<br>ySrc = cTop / 2 * outPatchHeight / inpPatchHeight + yP<br>xSrc = cLeft / 2 * outPatchWidth / inpPatchWidth + xP<br>if ( ySrc < nnpfc_pic_height_in_luma_samples / 2 &&<br>xSrc < nnpfc_pic_width_in_luma_samples / 2 {<br>if( nnpfc_component_last_flag = = 0 ){<br>FilteredYPic[idx][ xSrc * 2 ][ ySrc * 2 ] = OutY( outputTensor[idx][<br>0 ][ 0 ][ yP ][ xP ] )<br>FilteredYPic[idx][ xSrc * 2 + 1 ][ ySrc * 2 ] = OutY(<br>outputTensor[idx][ 0 ][ 1 ][ yP ][ xP ] )<br>FilteredYPic[idx][ xSrc * 2 ][ ySrc * 2 + 1 ] = OutY(<br>outputTensor[idx][ 0 ][ 2 ][ yP ][ xP ] )<br>FilteredYPic[idx][ xSrc * 2 + 1][ ySrc * 2 + 1 ] = OutY(<br>outputTensor[idx][ 0 ][ 3 ][ yP ][ xP ] )<br>FilteredCbPic[idx][ xSrc ][ ySrc ] = OutC( outputTensor[idx][ 0 ][ 4<br>][ yP ][ xP ] )<br>FilteredCrPic[idx][ xSrc ][ ySrc ] = OutC( outputTensor[idx][ 0 ][ 5<br>][ yP ][ xP ] )<br>}<br>else{<br>FilteredYPic[idx][ xSrc * 2 ][ ySrc * 2 ] = OutY( outputTensor[idx][<br>0 ][ yP ][ xP ][0] )<br>FilteredYPic[idx][ xSrc * 2 + 1 ][ ySrc * 2 ] = OutY(<br>outputTensor[idx][ 0 ][ yP ][ xP ][1] )<br>FilteredYPic[idx][ xSrc * 2 ][ ySrc * 2 + 1 ] = OutY(<br>outputTensor[idx][ 0 ][ yP ][ xP ][2] )<br>FilteredYPic[idx][ xSrc * 2 + 1][ ySrc * 2 + 1 ] = OutY(<br>outputTensor[idx][ 0 ][ yP ][ xP ][3] )<br>FilteredCbPic[idx][ xSrc ][ ySrc ] = OutC( outputTensor[idx][ 0 ][<br>yP ][ xP ][4] ) |

TABLE 26B-continued

| nnpfc_out_order_idc | Process StoreOutputTensors( ) for deriving sample values in the filtered picture from the output tensors |
|---|---|
| | FilteredCrPic[idx][ xSrc ][ ySrc ] = OutC( outputTensor[idx][ 0 ][ yP ][ xP ][5] )<br>}<br>}<br>}<br>}<br>} |
| 8 . . . 255 | Reserved |

A base post-processing filter for a cropped decoded output picture picA is the filter that is identified by the first neural-network post-filter characteristics SEI message, in decoding order, that has a particular nnpfc_id value within a CLVS.

If there is another neural-network post-filter characteristics SEI message that has the same nnpfc_id value, has nnpfc_mode_idc equal to 1, has different content than the neural-network post-filter characteristics SEI message that defines the base post-processing filter, and pertains to the picture picA, the base post-processing filter is updated by decoding the ISO/IEC 15938-17 bitstream in that neural-network post-filter characteristics SEI message to obtain a post-processing filter PostProcessingFilter( ). Otherwise, the post-processing processing filter PostProcessingFilter( ) is assigned to be the same as the base post-processing filter.

The following process is used to filter the cropped decoded output picture with the post-processing filter PostProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( (nnpfc_inp_order_idc = = 0 ) | | (nnpfc_inp_order_idc = = 4 ))
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
  else if( (nnpfc_inp_order_idc = = 1 ) | | (nnpfc_inp_order_idc = = 5 ))
  for( cTop = 0; cTop < CroppedHeight / SubHeightC; cTop += inpPatchHeight )
    for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
  else if( (nnpfc_inp_order_idc = = 2 ) | | (nnpfc_inp_order_idc = = 6 ))
  for( cTop = 0; cTop < CroppedHeight; cTop += inpPatchHeight)
    for( cLeft = 0; cLeft < CroppedWidth; cLeft += inpPatchWidth) {
      DeriveInputTensors( )
      outputTensor = PostProcessingFilter( inputTensor )
      StoreOutputTensors( )
    }
  else if( (nnpfc_inp_order_idc = = 3 ) | | (nnpfc_inp_order_idc = = 7 ))
  for( cTop = 0; cTop < CroppedHeight; cTop += inpPatchHeight * 2 )
    for( cLeft = 0; cLeft < CroppedWidth; cLeft += inpPatchWidth * 2 ) {
      DeriveInputTensors( )
      outputTensor = PostProcessingFilter( inputTensor )
      StoreOutputTensors( )
    }
```

It should be noted that according to the process provided in Table 22A and Table 22B, the pseudo-code for nnpfc_inp_order_idc equal to 0, 1, 2 and 3 is modified to be general and work for both single and multiple pictures. It should be noted that according to the process provided in Table 23A, values 5-7 are defined for nnpfc_inp_order_idc to handle more than one input images (e.g. for the frame rate upsampling case). It should be noted that according to the process provided in Table 23B, the multiple input pictures are always passed as a list to the post-processing filter and the post-processing filter is responsible for the concatenation.

It should be noted that according to the process provided in Table 24A and Table 24B, the pseudo-code for nnpfc_out_order_idc equal to 0, 1, 2 and 3 is generalized to handle multi-pictures output cases. It should be noted that according to the process provided in Table 25A, values 5-7 are defined for nnpfc_out_order_idc to handle multi-pictures output cases. It should be noted that according to the process provided in Table 25B, the output of the post-processing filter is always received as a list.

With respect to Tables 16, 17, and 18, in some examples the number of input pictures may be indicated using minus 2 signaling. That is, in one example, the following syntax in Tables 16, 17, and 18:

| | |
|---|---|
| if (nnpfc_purpose = = 5) { | |
| nnpfc_number_of_input_pictures_minus1 | ue(v) |
| nnpfc_number_of_interpolated_pictures_minus1 | ue(v) |
| if (nnpfc_number_of_input_pictures_minus1 > 0) | |

-continued

```
        nnpfc__input__extra__dimension                              u(2)
    if (nnpfc__number__of__interpolated__pictures__minus1 > 0)
        nnpfc__output__extra__dimension                             u(2)
}
```

May be replaced with the following syntax:

```
if (nnpfc__purpose = = 5) {
        nnpfc__number__of__input__pictures__minus2                  ue(v)
        nnpfc__input__extra__dimension
        for( i = 0; i <=
        nnpfc__number__of__input__pictures__minus2; i++ ){
            nnpfc__interpolated__pictures[ i ]                      ue(v)
        if (nnpfc__number__of__interpolated__pictures[i] > 0)
                nnpfc__output__extra__dimension [ i ]               u(2)
    }
  }
```

Or with the following syntax:

```
    if (nnpfc__purpose = = 5) {
        nnpfc__number__of__input__pictures__minus2                  ue(v)
        for( i = 0; i <=
        nnpfc__number__of__input__pictures__minus2; i++ )
            nnpfc__interpolated__pictures[ i ]                      ue(v)
```

-continued

```
            nnpfc__input__extra__dimension
            if (numOutputImages > 0)
                nnpfc__output__extra__dimension                     u(2)
        }
```

Where, nnpfc_number_of_input_pictures_minus2 plus 2 specifies the number of decoded output pictures used as input for the post-processing filter.

nnpfc_interpolated_pictures[i] specifies the number of interpolated pictures generated by the post-processing filter between ith and (i+1)th picture used as input for the post-processing filter.

nnpfc_output_extra_dimension[i] indicates how the post-processing filter concatenates the multiple picture output. It has values between 0 and 3. The values 0 to 3 have the same semantics as the description of nnpfc_input_extra_dimension. Knowing nnpfc_output_extra_dimension value is necessary to apply the StoreOutputTensor( )routine defined later.

The variables numInputImages and numOutputImages are derived as follows:

```
numInputImages = (nnpfc__purpose = = 5) ? (nnpfc__number__of__input__pictures__minus2 + 2) : 1
  if(nnpfc__purpose = = 5)
    for( i = 0, numOutputImages=0; i <= nnpfc__number__of__input__pictures__minus2; i++ )
      numOutputImages + = nnpfc__interpolated__pictures[ i ]
  else
    numOutputImages = 1
```

In one example, according to the techniques herein, the routines DeriveInputTensors( ) and StoreOutputTensors( ) may be applied to individual pictures in the video. That is, in one example, the following process may be used to filter the cropped decoded output picture with the post-processing filter PostProcessingFilter( ) to generate the filtered picture, which contains Y, Cb, and Cr sample arrays FilteredYPic, FilteredCbPic, and FilteredCrPic, respectively, as indicated by nnpfc_out_order_idc.

```
if( nnpfc__inp__order__idc = = 0 ){
      for( cTop = 0; cTop < CroppedHeight; cTop += inpPatchHeight ){
            for( cLeft = 0; cLeft < CroppedWidth; cLeft += inpPatchWidth ) {
        for(idx=0; idx< numInputImages; idx++){
            DeriveInputTensors( )
            ConcatenateInputTensors( )
        }
              outputTensors = PostProcessingFilter( inputTensors )
          for(idx=0; idx< numOutputImages; idx++){
          SeparateOutputTensors( )
                StoreOutputTensors( )
        }
            }
      }
  }
else if( nnpfc__inp__order__idc = = 1 ){
      for( cTop = 0; cTop < CroppedHeight/ SubHeightC; cTop += inpPatchHeight ){
            for( cLeft = 0; cLeft < CroppedWidth/ SubWidthC; cLeft += inpPatchWidth ) {
        for(idx=0; idx< numInputImages; idx++){
                  DeriveInputTensors( )
          Concatenate InputTensors( )
        }
              outputTensors = PostProcessingFilter( inputTensors )
          for(idx=0; idx< numOutputImages; idx++){
          SeparateOutputTensors( )
```

-continued

```
                  StoreOutputTensors( )
        }
            }
    }
  }
else if( nnpfc__inp__order__idc = = 2 ){
    for( cTop = 0; cTop < CroppedHeight; cTop += inpPatchHeight ){
        for( cLeft = 0; cLeft < CroppedWidth; cLeft += inpPatchWidth ) {
      for(idx=0; idx< numInputImages; idx++){
              DeriveInputTensors( )
        ConcatenateInputTensors( )
      }
            outputTensors = PostProcessingFilter( inputTensors )
       for(idx=0; idx< numOutputImages; idx++){
        SeparateOutputTensors( )
                  StoreOutputTensors( )
        }
            }
    }
  }
else if( nnpfc__inp__order__idc = = 3 ){
    for( cTop = 0; cTop < CroppedHeight; cTop += inpPatchHeight * 2 ){
        for( cLeft = 0; cLeft < CroppedWidth; cLeft += inpPatchWidth * 2 ) {
      for(idx=0; idx< numInputImages; idx++){
              DeriveInputTensors( )
        ConcatenateInputTensors( )
      }
            outputTensors = PostProcessingFilter( inputTensors )
       for(idx=0; idx< numOutputImages; idx++){
        SeparateOutputTensors( )
                  StoreOutputTensors( )
        }
            }
    }
  }
```

With respect to the process above, in one example, the process ConcatenateInputTensors( ) may be based on the process provided in Table 27A or Table 27B. It should be noted that according to the process in Table 27A, the pictures are always concatenated in the first dimension and according to the process in Table 27B, the input tensors are concatenated based on the value of nnpfc_input_extra_dimension. Further, with respect to the process above, in one example, the process SeperateOutputTensors( ) may be based on the process provided in Table 28A or Table 28B. It should be noted that according to the process in Table 28A, the multiple pictures output by the post-processing filter are separated and according to the process in Table 28B, the output tensors of the post-processing filter are separated based on the value of nnpfc_output_extra_dimension.

TABLE 27A

| nnpfc_inp_order_idc | Process ConcatenateInputTensors( ) for concatenating input tensors |
|---|---|
| 0 | for( yP = 0; yP < inpPatchHeight + 2*overlapSize; yP++){<br>  for( xP = 0; xP < inpPatchWidth + 2*overlapSize; xP++ ) {<br>   if( nnpfc_component_last_flag = = 0 )<br>    inputTensors[idx][ 0 ][ 0 ][ yP ][ xP] = inputTensor[0][0][yP][xP]<br>  else<br>    inputTensors[idx][ 0 ][ yP ][ xP ][0] = inputTensor[ 0 ][ yP ][ xP ][0]<br>  if(nnpfc_auxiliary_inp_idc = = 1) {<br>    if( nnpfc_component_last_flag = = 0 )<br>     inputTensors[idx][ 0 ][ 1 ][ yP + overlapSize ][ xP + overlapSize ]<br>= inputTensor[0][1][yP][xP]<br>     else<br>     inputTensors[idx][ 0 ][ yP + overlapSize ][ xP + overlapSize ][ 1 ]<br>= inputTensor[0][yP][xP][1]<br>   }<br>  }<br>} |
| 1 | for( yP = 0; yP < inpPatchHeight + 2*overlapSize; yP++){<br>  for( xP = 0; xP < inpPatchWidth + 2*overlapSize; xP++ ) {<br>   if( nnpfc_component_last_flag = = 0 ){<br>     inputTensors[idx][ 0 ][0][ yP][ xP] = inputTensor[0][0][ yP][ xP]<br>      inputTensors[idx][ 0 ][1][ yP][ xP] = inputTensor[0][1][yP][xP]<br>  }<br>   else{<br>     inputTensors[idx][ 0 ][ yP][ xP][0] = inputTensor[0][ yP][ xP][0]<br>     inputTensors[idx][ 0 ][ yP][ xP ][1] = inputTensor[0][ yP][ xP][1]<br>  }<br>   if(nnpfc_auxiliary_inp_idc = = 1) { |

TABLE 27A-continued

| nnpfc_inp_order_idc | Process ConcatenateInputTensors( ) for concatenating input tensors |
|---|---|
| | if( nnpfc_component_last_flag = = 0 )<br>inputTensors[idx][ 0 ][ 2 ][ yP + overlapSize ][ xP + overlapSize ]<br>= inputTensor[0][2][yP][xP]<br>else<br>inputTensors[idx][ 0 ][ yP + overlapSize ][ xP + overlapSize ][ 2 ]<br>= inputTensor[0][yP][xP][2]<br>}<br>}<br>} |
| 2 | for( yP = 0; yP < inpPatchHeight + 2*overlapSize; yP++){<br>for( xP = 0; xP < inpPatchWidth + 2*overlapSize; xP++ ) {<br>if( nnpfc_component_last_flag = = 0 ){<br>inputTensors[idx][ 0 ][0][ yP][ xP] = inputTensor[0][0][yP][xP]<br>inputTensors[idx][ 0 ][1][ yP][ xP] = inputTensor[0][1][yP][xP]<br>inputTensors[idx][ 0 ][2][ yP][ xP] = inputTensor[0][2][yP][xP]<br>}<br>else{<br>inputTensors[idx][ 0 ][ yP][ xP][0] = inputTensor[0][yP][xP][0]<br>inputTensors[idx][ 0 ][ yP][ xP][1] = inputTensor[0][yP][xP][1]<br>inputTensors[idx][ 0 ][ yP][ xP][2] = inputTensor[0][yP][xP][2]<br>}<br>if(nnpfc_auxiliary_inp_idc = = 1) {<br>if( nnpfc_component_last_flag = = 0 )<br>inputTensors[idx][ 0 ][ 3 ][ yP + overlapSize ][ xP + overlapSize ]<br>= inputTensor[0][3][yP][xP]<br>else<br>inputTensors[idx][ 0 ][ yP + overlapSize ][ xP + overlapSize ][ 3 ]<br>= inputTensor[0][yP][xP][3]<br>}<br>}<br>} |
| 3 | for( yP = 0; yP < inpPatchHeight + 2*overlapSize; yP++){<br>for( xP = 0; xP < inpPatchWidth + 2*overlapSize; xP++ ) {<br>if( nnpfc_component_last_flag = = 0 ){<br>inputTensors[idx][ 0 ][0][ yP][ xP] = inputTensor[ 0 ][0][ yP][ xP]<br>inputTensors[idx][ 0 ][1][ yP][ xP] = input Tensor[ 0 ][1][ yP][ xP]<br>inputTensors[idx][ 0 ][2][ yP][ xP] = inputTensor[ 0 ][2][ yP][ xP]<br>inputTensors[idx][ 0 ][3][ yP][ xP] = inputTensor[ 0 ][3][ yP][ xP]<br>inputTensors[idx][ 0 ][4][ yP][ xP] = inputTensor[ 0 ][4][ yP][ xP]<br>inputTensors[idx][ 0 ][5][ yP][ xP] = inputTensor[ 0 ][5][ yP][ xP]<br>}<br>else{<br>inputTensors[idx][ 0 ][ yP][ xP][0] = inputTensor[ 0 ][ yP][ xP][0]<br>inputTensors[idx][ 0 ][ yP][ xP][1]= inputTensor[ 0 ][ yP][ xP][1]<br>inputTensors[idx][ 0 ][ yP][ xP][2] = inputTensor[ 0 ][ yP][ xP][2]<br>inputTensors[idx][ 0 ][ yP][ xP][3] = inputTensor[ 0 ][ yP][ xP][3]<br>inputTensors[idx][ 0 ][ yP][ xP][4] = inputTensor[ 0 ][ yP][ xP][4]<br>inputTensors[idx][ 0 ][ yP][ xP][5] = inputTensor[ 0 ][ yP][ xP][5]<br>}<br>if(nnpfc_auxiliary_inp_idc = = 1) {<br>if( nnpfc_component_last_flag = = 0 )<br>inputTensors[idx][ 0 ][ 6 ][ yP + overlapSize ][ xP + overlapSize ]<br>= inputTensor[0][6][yP][xP]<br>else<br>inputTensors[idx][ 0 ][ yP + overlapSize ][ xP + overlapSize ][ 6 ]<br>= inputTensor[0][yP][xP][6]<br>}<br>}<br>} |
| 4 . . . 255 | Reserved |

TABLE 27B

| nnpfc__inp__order__idc | Process ConcatenateInputTensors( ) for concatenating input tensors |
|---|---|
| 0 | for( yP = 0; yP < inpPatchHeight + 2*overlapSize; yP++){<br>for( xP = 0; xP < inpPatchWidth + 2*overlapSize; xP++ ) {<br>if( nnpfc__component__last__flag = = 0 ){<br>if(nnpfc__input__extra__dimension==0){<br>if(nnpfc__auxiliary__inp__idc = = 1){<br>inputTensors[0][ idx*2][ yP][xP]=inputTensor[ 0 ][0][ yP] [xP]<br>inputTensors[0][idx*2+1][yP][xP]=inputTensor[0][1][yP] [xP]<br>}<br>else{<br>inputTensors[0][idx][yP][ xP] = inputTensor[ 0 ][0][ yP][xP] |

TABLE 27B-continued nnpfc__inp__order__idc Process ConcatenateInputTensors( ) for concatenating input tensors

```
                    }
                }
                    else if(nnpfc__input__extra__dimension==1){
                        if(nnpfc__auxiliary__inp__idc = = 1){
                            inputTensors[idx][0][0][yP][xP]= inputTensor[0][0][yP][xP]
                            inputTensors[idx][0][1][yP][xP]= inputTensor[0][1][yP][xP]
                    }
                        else{
                            inputTensors[idx][0][0][yP][xP]= inputTensor[0][0][yP][xP]
                    }
                }
                    else if(nnpfc__input__extra__dimension==2){
                        if(nnpfc__auxiliary__inp__idc = = 1){
                            inputTensors[0][idx][0][ yP][xP]=inputTensor[ 0 ][0][ yP] [xP]
                            inputTensors[0][idx][1][ yP][xP]=inputTensor[ 0 ][1][ yP] [xP]
                    }
                        else{
                            inputTensors[0][idx][0][ yP][xP]=inputTensor[ 0 ][0][ yP] [xP]
                        }
                }
                    else {
                        if(nnpfc__auxiliary__inp__idc = = 1){
                            inputTensors[0][ 0 ][ idx ][ yP][ xP] = inputTensor[ 0 ][0][ yP] [xP]
                            inputTensors[0][ 1 ][idx][ yP][ xP] = inputTensor[ 0 ][1][ yP] [xP]
                    }
                        else{
                            inputTensors[0][ 0 ][ idx ][ yP][ xP ] = inputTensor[ 0 ][0][ yP] [xP]
                        }
                }
            }
                else{
                    if(nnpfc__input__extra__dimension==0){
                        if(nnpfc__auxiliary__inp__idc = = 1){
                            inputTensors[ 0 ][ yP][ xP][idx*2] = inputTensor[0][ yP][ xP][0]
                            inputTensors[ 0 ][ yP ][ xP ][idx*2+1] = inputTensor[0][ yP][ xP][1]
                    }
                        else{
                            inputTensors[ 0 ][ yP][ xP][idx] = inputTensor[0][ yP][ xP][0]
                    }
                }
                else if(nnpfc__input__extra__dimension==1){
                    if(nnpfc__auxiliary__inp__idc = = 1){
                            inputTensors[idx][ 0 ][ yP][ xP][0] = inputTensor[ 0 ][ yP][ xP][0]
                            inputTensors[idx][ 0 ][ yP ][ xP ][1] = inputTensor[ 0 ][ yP][ xP][1]
                    }
                        else{
                            inputTensors[idx][ 0 ][ yP][ xP][0] = inputTensor[ 0 ][ yP][ xP][0]
                    }
                }
                    else{
                        if(nnpfc__auxiliary__inp__idc = = 1){
                            inputTensors[ 0 ][idx][ yP][ xP][0] = inputTensor[ 0 ][ yP][ xP][0]
                            inputTensors[ 0 ][idx][ yP][ xP ][1] = inputTensor[ 0 ][ yP][ xP][1]
                    }
                        else{
                            inputTensors[ 0 ][idx][ yP][ xP][0] = inputTensor[ 0 ][ yP][ xP][0]
                    }
                }
            }
        }
    }
1   for( yP = 0; yP < inpPatchHeight + 2*overlapSize; yP++){
            for( xP = 0; xP < inpPatchWidth + 2*overlapSize; xP++ ) {
                if( nnpfc__component__last__flag = = 0 ){
                    if(nnpfc__input__extra__dimension==0){
                        if(nnpfc__auxiliary__inp__idc = = 1){
                            inputTensors[ 0 ][ idx*3][ yP][ xP] = inputTensor[ 0 ][ 0][ yP][ xP]
                            inputTensors[ 0 ][ idx*3+1][ yP][ xP] = inputTensor[ 0 ][ 1][ yP][ xP]
                            inputTensors[ 0 ][ idx*3+2 ][ yP][ xP] = inputTensor[ 0 ][ 2][ yP][ xP]
                    }
                        else{
                            inputTensors[ 0 ][ idx*2][ yP][ xP] = inputTensor[ 0 ][ 0][ yP][ xP]
                            inputTensors[ 0 ][ idx*2+1][ yP][ xP] = inputTensor[ 0 ][ 2][ yP][ xP]
                    }
                }
                    else if(nnpfc__input__extra__dimension==1){
                        if(nnpfc__auxiliary__inp__idc = = 1){
                            inputTensors[idx][ 0 ][ 0 ][ yP][ xP] = inputTensor[ 0 ][ 0 ][ yP][ xP]
```

TABLE 27B-continued

| nnpfc__inp__order__idc | Process ConcatenateInputTensors( ) for concatenating input tensors |
|---|---|

```
            inputTensors[idx][ 0 ][ 1 ][ yP][ xP] = inputTensor[ 0 ][ 1][ yP][ xP]
            inputTensors[idx][ 0 ][2][ yP][ xP] = inputTensor[ 0 ][ 2][ yP][ xP]
        }
          else{
            inputTensors[idx][ 0 ][ 0 ][ yP][ xP] = inputTensor[ 0 ][ 0 ][ yP][ xP]
            inputTensors[idx][ 0 ][ 1 ][ yP][ xP] = inputTensor[ 0 ][ 1][ yP][ xP]
        }
      }
        else if(nnpfc__input__extra__dimension==2){
          if(nnpfc__auxiliary__inp__idc = = 1){
            inputTensors[0][ idx ][ 0 ][ yP][ xP] = inputTensor[ 0 ][ 0 ][ yP][ xP]
            inputTensors[0][ idx ][ 1 ][ yP][ xP ] = inputTensor[ 0 ][ 1 ][ yP][ xP]
            inputTensors[0][ idx ][2][ yP][ xP] = inputTensor[ 0 ][ 2 ][ yP][ xP]
          }
          else{
            inputTensors[0][ idx ][ 0 ][ yP][ xP] = inputTensor[ 0 ][ 0 ][ yP][ xP]
            inputTensors[0][ idx ][ 1 ][ yP][ xP ] = inputTensor[ 0 ][ 1 ][ yP][ xP]
          }
      }
        else{
          if(nnpfc__auxiliary__inp__idc = = 1){
            inputTensors[0][ 0 ][ idx ][ yP][ xP] = inputTensor[ 0 ][ 0 ][ yP][ xP]
            inputTensors[0][ 1 ][ idx ][ yP][ xP] = inputTensor[ 0 ][ 1 ][ yP][ xP]
            inputTensors[0][ 2 ][idx][ yP][ xP] = inputTensor[ 0 ][ 2 ][ yP][ xP]
        }
          else{
            inputTensors[0][ 0 ][ idx ][ yP][ xP] = inputTensor[ 0 ][ 0 ][ yP][ xP]
            inputTensors[0][ 1 ][ idx ][ yP][ xP] = inputTensor[ 0 ][ 1 ][ yP][ xP]
          }
      }
    }
      else{
        if(nnpfc__input__extra__dimension==0){
          if(nnpfc__auxiliary__inp__idc = = 1){
            inputTensors[ 0 ][ yP ][ xP][idx*3] = inputTensor[ 0 ][ yP ][ xP][0]
            inputTensors[ 0 ][ yP][ xP][idx*3+1] = inputTensor[ 0 ][ yP ][ xP][1]
            inputTensors[ 0 ][ yP][ xP][idx*3+2] = inputTensor[ 0 ][ yP ][ xP][2]
        }
          else{
            inputTensors[ 0 ][ yP ][ xP][idx*2] = inputTensor[ 0 ][ yP ][ xP][0]
            inputTensors[ 0 ][ yP][ xP][idx*2+1] = inputTensor[ 0 ][ yP ][ xP][1]
        }
      }
       else if(nnpfc__input__extra__dimension==1){
          if(nnpfc__auxiliary__inp__idc = = 1){
            inputTensors[idx][ 0 ][ yP][ xP][0] = inputTensor[ 0 ][ yP ][ xP][0]
            inputTensors[idx][ 0 ][ yP][ xP][1] = inputTensor[ 0 ][ yP ][ xP][1]
            inputTensors[idx][ 0 ][ yP][ xP][2] = inputTensor[ 0 ][ yP ][ xP][2]
        }
          else{
            inputTensors[idx][ 0 ][ yP][ xP][0] = inputTensor[ 0 ][ yP ][ xP][0]
            inputTensors[idx][ 0 ][ yP][ xP][1] = inputTensor[ 0 ][ yP ][ xP][1]
        }
      }
      else{
          if(nnpfc__auxiliary__inp__idc = = 1){
            inputTensors[ 0 ][idx][ yP][ xP][0] = inputTensor[ 0 ][ yP ][ xP][0]
            inputTensors[ 0 ][idx][ yP][ xP][1] = inputTensor[ 0 ][ yP ][ xP][1]
            inputTensors[ 0 ][idx][ yP][ xP][2] = inputTensor[ 0 ][ yP ][ xP][2]
        }
          else{
            inputTensors[ 0 ][idx][ yP][ xP][0] = inputTensor[ 0 ][ yP ][ xP][0]
            inputTensors[ 0 ][idx][ yP][ xP][1] = inputTensor[ 0 ][ yP ][ xP][1
        }
      }
    }
   }
  }
 }
```

2

```
 for( yP = 0; yP < inpPatchHeight + 2*overlapSize; yP++){
    for( xP = 0; xP < inpPatchWidth + 2*overlapSize; xP++ ) {
      if( nnpfc__component__last__flag = = 0 ){
        if(nnpfc__input__extra__dimension==0){
          if(nnpfc__auxiliary__inp__idc = = 1){
            inputTensors[ 0 ][ idx*4][ yP ][ xP ] = inputTensor[ 0 ][ 0][ yP ][ xP ]
            inputTensors[ 0 ][ idx*4+1][ yP ][ xP] = inputTensor[ 0 ][ 1][ yP ][ xP ]
            inputTensors[ 0 ][ idx*4+2][ yP ][ xP] = inputTensor[ 0 ][ 2][ yP ][ xP ]
            inputTensors[ 0 ][ idx*4+3 ][ yP][ xP] = inputTensor[ 0 ][ 3][ yP ][ xP ]
```

TABLE 27B-continued

| nnpfc_inp_order_idc Process ConcatenateInputTensors( ) for concatenating input tensors |
|---|

```
                }
                else{
                    inputTensors[ 0 ][ idx*3][ yP ][ xP ] = inputTensor[ 0 ][ 0][ yP ][ xP ]
                    inputTensors[ 0 ][ idx*3+1][ yP ][ xP] = inputTensor[ 0 ][ 1][ yP ][ xP ]
                    inputTensors[ 0 ][ idx*3+2][ yP ][ xP] = inputTensor[ 0 ][ 2][ yP ][ xP ]
                }
        }
            else if(nnpfc_input_extra_dimension==1){
                if(nnpfc_auxiliary_inp_idc = = 1){
                    inputTensors[idx][ 0 ][ 0 ][ yP ][ xP] = inputTensor[ 0 ][ 0][ yP ][ xP ]
                    inputTensors[idx][ 0 ][ 1 ][ yP][ xP] = inputTensor[ 0 ][ 1][ yP ][ xP ]
                    inputTensors[idx][ 0 ][ 2 ][ yP][ xP] = inputTensor[ 0 ][ 2][ yP ][ xP ]
                    inputTensors[idx][ 0 ][3][ yP][ xP] = inputTensor[ 0 ][ 3][ yP ][ xP ]
                }
                else{
                    inputTensors[idx][ 0 ][ 0 ][ yP ][ xP] = inputTensor[ 0 ][ 0][ yP ][ xP ]
                    inputTensors[idx][ 0 ][ 1 ][ yP][ xP] = inputTensor[ 0 ][ 1][ yP ][ xP ]
                    inputTensors[idx][ 0 ][ 2 ][ yP][ xP] = inputTensor[ 0 ][ 2][ yP ][ xP ]
                }
        }
            else if(nnpfc_input_extra_dimension==2){
                if(nnpfc_auxiliary_inp_idc = = 1){
                    inputTensors[0][ idx ][ 0 ][ yP][ xP] = inputTensor[ 0 ][ 0][ yP ][ xP ]
                    inputTensors[0][ idx ][ 1 ][ yP ][ xP] = inputTensor[ 0 ][ 1][ yP ][ xP ]
                    inputTensors[0][ idx ][ 2 ][ yP][ xP] = inputTensor[ 0 ][ 2][ yP ][ xP ]
                    inputTensors[0][ idx ][3][ yP][ xP] = inputTensor[ 0 ][ 3][ yP ][ xP ]
                }
                else{
                    inputTensors[0][ idx ][ 0 ][ yP][ xP] = inputTensor[ 0 ][ 0][ yP ][ xP ]
                    inputTensors[0][ idx ][ 1 ][ yP ][ xP] = inputTensor[ 0 ][ 1][ yP ][ xP ]
                    inputTensors[0][ idx ][ 2 ][ yP][ xP] = inputTensor[ 0 ][ 2][ yP ][ xP ]
                    }
        }
                else {
                    if(nnpfc_auxiliary_inp_idc = = 1){
                    inputTensors[0][ 0 ][ idx ][ yP][ xP] = inputTensor[ 0 ][ 0][ yP ][ xP ]
                    inputTensors[0][ 1 ][ idx ][ yP ][ xP] = inputTensor[ 0 ][ 1][ yP ][ xP ]
                    inputTensors[0][ 2 ][ idx ][ yP ][ xP ] = inputTensor[ 0 ][ 2][ yP ][ xP ]
                    inputTensors[0][ 3 ][idx][ yP ][ xP ] = inputTensor[ 0 ][ 3][ yP ][ xP ]
                }
                    else{
                    inputTensors[0][ 0 ][ idx ][ yP][ xP] = inputTensor[ 0 ][ 0][ yP ][ xP ]
                    inputTensors[0][ 1 ][ idx ][ yP ][ xP] = inputTensor[ 0 ][ 1][ yP ][ xP ]
                    inputTensors[0][ 2 ][ idx ][ yP ][ xP ] = inputTensor[ 0 ][ 2][ yP ][ xP ]
                    }
        }
    }
        else {
            if(nnpfc_input_extra_dimension==0){
                if(nnpfc_auxiliary_inp_idc = = 1){
                    inputTensors[ 0 ][ yP][ xP][idx*4] = inputTensor[ 0 ][ yP][ xP][0]
                    inputTensors[ 0 ][ yP ][ xP][idx*4+1] = inputTensor[ 0 ][ yP][ xP][1]
                    inputTensors[ 0 ][ yP ][ xP][idx*4+2] = inputTensor[ 0 ][ yP][ xP][2]
                    inputTensors[ 0 ][ yP][ xP][idx*4+3] = inputTensor[ 0 ][ yP][ xP][3]
                }
                else{
                    inputTensors[ 0 ][ yP][ xP][idx*3] = inputTensor[ 0 ][ yP][ xP][0]
                    inputTensors[ 0 ][ yP ][ xP][idx*3+1] = inputTensor[ 0 ][ yP][ xP][1]
                    inputTensors[ 0 ][ yP ][ xP][idx*3+2] = inputTensor[ 0 ][ yP][ xP][2]
                }
        }
        else if(nnpfc_input_extra_dimension==1){
                if(nnpfc_auxiliary_inp_idc = = 1){
                    inputTensors[idx][ 0 ][ yP][ xP ][0] = inputTensor[ 0 ][ yP][ xP][0]
                    inputTensors[idx][ 0 ][ yP][ xP ][1] = inputTensor[ 0 ][ yP][ xP][1]
                    inputTensors[idx][ 0 ][ yP][ xP][2] = inputTensor[ 0 ][ yP][ xP][2]
                    inputTensors[idx][ 0 ][ yP ][ xP][3] = inputTensor[ 0 ][ yP][ xP][3]
                }
                else{
                    inputTensors[idx][ 0 ][ yP][ xP ][0] = inputTensor[ 0 ][ yP][ xP][0]
                    inputTensors[idx][ 0 ][ yP][ xP ][1] = inputTensor[ 0 ][ yP][ xP][1]
                    inputTensors[idx][ 0 ][ yP][ xP][2] = inputTensor[ 0 ][ yP][ xP][2]
                }
        }
        else{
                if(nnpfc_auxiliary_inp_idc = = 1){
                    inputTensors[ 0 ][idx][ yP][ xP ][0] = inputTensor[ 0 ][ yP][ xP][0]
                    inputTensors[ 0 ][idx][ yP][ xP][1] = inputTensor[ 0 ][ yP][ xP][1]
```

TABLE 27B-continued

| nnpfc__inp__order__idc | Process ConcatenateInputTensors( ) for concatenating input tensors |
|---|---|

```
                    inputTensors[ 0 ][idx][ yP][ xP][2] = inputTensor[ 0 ][ yP][ xP][2]
                    inputTensors[ 0 ][idx][ yP ][ xP][3] = inputTensor[ 0 ][ yP][ xP][3]
                }
                  else{
                    inputTensors[ 0 ][idx][ yP][ xP ][0] = inputTensor[ 0 ][ yP][ xP][0]
                    inputTensors[ 0 ][idx][ yP][ xP][1] = inputTensor[ 0 ][ yP][ xP][1]
                    inputTensors[ 0 ][idx][ yP][ xP][2] = inputTensor[ 0 ][ yP][ xP][2]
                }
            }
          }
        }
      }
3     for( yP = 0; yP < inpPatchHeight + 2*overlapSize; yP++){
          for( xP = 0; xP < inpPatchWidth + 2*overlapSize; xP++ ) {
            if( nnpfc__component__last__flag = = 0 ){
              if(nnpfc__input__extra__dimension==0){
                  if(nnpfc__auxiliary__inp__idc = = 1){
                    inputTensors[ 0 ][ idx*8][ yP][ xP] = inputTensor[ 0 ][0][ yP][ xP]
                    inputTensors[ 0 ][ idx*7+1][ yP][ xP] = inputTensor[ 0 ][1][ yP][ xP]
                    inputTensors[ 0 ][ idx*7+2][ yP][ xP] = inputTensor[ 0 ][ 2][ yP][ xP]
                    inputTensors[ 0 ][ idx*7+3][ yP][ xP] = inputTensor[ 0 ][ 3][ yP][ xP]
                    inputTensors[ 0 ][ idx*7+4][ yP][ xP] = inputTensor[ 0 ][ 4][ yP][ xP]
                    inputTensors[ 0 ][ idx*7+5][ yP][ xP] = inputTensor[ 0 ][ 5][ yP][ xP]
                    inputTensors[ 0 ][ idx*7+6 ][ yP][ xP] = inputTensor[ 0 ][ 6][ yP][ xP]
              }
                  else{
                    inputTensors[ 0 ][ idx*6][ yP][ xP] = inputTensor[ 0 ][0][ yP][ xP]
                    inputTensors[ 0 ][ idx*6+1][ yP][ xP] = inputTensor[ 0 ][1][ yP][ xP]
                    inputTensors[ 0 ][ idx*6+2][ yP][ xP] = inputTensor[ 0 ][ 2][ yP][ xP]
                    inputTensors[ 0 ][ idx*6+3][ yP][ xP] = inputTensor[ 0 ][ 3][ yP][ xP]
                    inputTensors[ 0 ][ idx*6+4][ yP][ xP] = inputTensor[ 0 ][ 4][ yP][ xP]
                    inputTensors[ 0 ][ idx*6+5][ yP][ xP] = inputTensor[ 0 ][ 5][ yP][ xP]
                }
            }
              else if(nnpfc__input__extra__dimension==1){
                  if(nnpfc__auxiliary__inp__idc = = 1){
                    inputTensors[idx][ 0 ][ 0][ yP][ xP] = inputTensor[ 0 ][0][ yP][ xP]
                    inputTensors[idx][ 0 ][1][ yP][ xP] = inputTensor[ 0 ][1][ yP][ xP]
                    inputTensors[idx][ 0 ][2][ yP][ xP] = inputTensor[ 0 ][2][ yP][ xP]
                    inputTensors[idx][ 0 ][3][ yP][ xP ] = inputTensor[ 0 ][3][ yP][ xP]
                    inputTensors[idx][ 0 ][4][ yP][ xP] = inputTensor[ 0 ][4][ yP][ xP]
                    inputTensors[idx][ 0 ][5][ yP ][ xP] = inputTensor[ 0 ][5][ yP][ xP]
                    inputTensors[idx][ 0 ][6 ][ yP][ xP] = inputTensor[ 0 ][6][ yP][ xP]
                }
                  else{
                    inputTensors[idx][ 0 ][ 0][ yP][ xP] = inputTensor[ 0 ][0][ yP][ xP]
                    inputTensors[idx][ 0 ][1][ yP][ xP] = inputTensor[ 0 ][1][ yP][ xP]
                    inputTensors[idx][ 0 ][2][ yP][ xP] = inputTensor[ 0 ][2][ yP][ xP]
                    inputTensors[idx][ 0 ][3][ yP][ xP ] = inputTensor[ 0 ][3][ yP][ xP]
                    inputTensors[idx][ 0 ][4][ yP][ xP] = inputTensor[ 0 ][4][ yP][ xP]
                    inputTensors[idx][ 0 ][5][ yP ][ xP] = inputTensor[ 0 ][5][ yP][ xP]
                }
            }
              else if(nnpfc__input__extra__dimension==2){
                  if(nnpfc__auxiliary__inp__idc = = 1){
                    inputTensors[ 0 ][idx][ 0][ yP ][ xP] = inputTensor[ 0 ][0][ yP][ xP]
                    inputTensors[ 0 ][idx][1][ yP][ xP] = inputTensor[ 0 ][1][ yP][ xP]
                    inputTensors[ 0 ][idx][2][ yP][ xP] = inputTensor[ 0 ][2][ yP][ xP]
                    inputTensors[ 0 ][idx][3][ yP][ xP] = inputTensor[ 0 ][3][ yP][ xP]
                    inputTensors[ 0 ][idx][4][ yP][ xP] = inputTensor[ 0 ][4][ yP][ xP]
                    inputTensors[ 0 ][idx][5][ yP][ xP] = inputTensor[ 0 ][5][ yP][ xP]
                    inputTensors[ 0 ][idx][6 ][ yP][ xP] = inputTensor[ 0 ][6][ yP][ xP]
                }
                  else{
                    inputTensors[ 0 ][idx][ 0][ yP ][ xP] = inputTensor[ 0 ][0][ yP][ xP]
                    inputTensors[ 0 ][idx][1][ yP][ xP] = inputTensor[ 0 ][1][ yP][ xP]
                    inputTensors[ 0 ][idx][2][ yP][ xP] = inputTensor[ 0 ][2][ yP][ xP]
                    inputTensors[ 0 ][idx][3][ yP][ xP] = inputTensor[ 0 ][3][ yP][ xP]
                    inputTensors[ 0 ][idx][4][ yP][ xP] = inputTensor[ 0 ][4][ yP][ xP]
                    inputTensors[ 0 ][idx][5][ yP][ xP] = inputTensor[ 0 ][5][ yP][ xP]
                  }
            }
              else {
                  if(nnpfc__auxiliary__inp__idc = = 1){
                    inputTensors[ 0 ][0][idx][ yP][ xP] = inputTensor[ 0 ][0][ yP][ xP]
                    inputTensors[ 0 ][1][idx][ yP][ xP] = inputTensor[ 0 ][1][ yP][ xP]
                    inputTensors[ 0 ][2][idx][ yP][ xP] = inputTensor[ 0 ][2][ yP][ xP]
                    inputTensors[ 0 ][3][idx][ yP][ xP] = inputTensor[ 0 ][3][ yP][ xP]
```

TABLE 27B-continued

| nnpfc_inp_order_idc | Process ConcatenateInputTensors( ) for concatenating input tensors |
|---|---|

```
                inputTensors[ 0 ][4][idx][ yP][ xP] = inputTensor[ 0 ][4][ yP][ xP]
                inputTensors[ 0 ][5][idx][ yP][ xP] = inputTensor[ 0 ][5][ yP][ xP]
                inputTensors[ 0 ][6 ][idx][ yP][ xP] = inputTensor[ 0 ][6][ yP][ xP]
            }
              else{
                inputTensors[ 0 ][0][idx][ yP][ xP] = inputTensor[ 0 ][0][ yP][ xP]
                inputTensors[ 0 ][1][idx][ yP][ xP] = inputTensor[ 0 ][1][ yP][ xP]
                inputTensors[ 0 ][2][idx][ yP][ xP] = inputTensor[ 0 ][2][ yP][ xP]
                inputTensors[ 0 ][3][idx][ yP][ xP] = inputTensor[ 0 ][3][ yP][ xP]
                inputTensors[ 0 ][4][idx][ yP][ xP] = inputTensor[ 0 ][4][ yP][ xP]
                inputTensors[ 0 ][5][idx][ yP][ xP] = inputTensor[ 0 ][5][ yP][ xP]
              }
          }
        }
          else{
            if(nnpfc_input_extra_dimension==0){
              if(nnpfc_auxiliary_inp_idc = = 1){
                inputTensors[ 0 ][ yP][ xP ][idx*7] = inputTensor[ 0 ][ yP][ xP ][0]
                inputTensors[ 0 ][ yP ][ xP ][idx*7+1] = inputTensor[ 0 ][ yP][ xP ][1]
                inputTensors[ 0 ][ yP ][ xP][idx*7+2] = inputTensor[ 0 ][ yP][ xP ][2]
                inputTensors[ 0 ][ yP ][ xP][idx*7+3] = inputTensor[ 0 ][ yP][ xP ][3]
                inputTensors[ 0 ][ yP ][ xP][idx*7+4] = inputTensor[ 0 ][ yP][ xP ][4]
                inputTensors[ 0 ][ yP ][ xP][idx*7+5] = inputTensor[ 0 ][ yP][ xP ][5]
                inputTensors[ 0 ][ yP][ xP][idx*7+6] = inputTensor[ 0 ][ yP][ xP ][6]
              }
              else{
                inputTensors[ 0 ][ yP][ xP ][idx*6] = inputTensor[ 0 ][ yP][ xP ][0]
                inputTensors[ 0 ][ yP ][ xP ][idx*6+1] = inputTensor[ 0 ][ yP][ xP ][1]
                inputTensors[ 0 ][ yP ][ xP][idx*6+2] = inputTensor[ 0 ][ yP][ xP ][2]
                inputTensors[ 0 ][ yP ][ xP][idx*6+3] = inputTensor[ 0 ][ yP][ xP ][3]
                inputTensors[ 0 ][ yP ][ xP][idx*6+4] = inputTensor[ 0 ][ yP][ xP ][4]
                inputTensors[ 0 ][ yP ][ xP][idx*6+5] = inputTensor[ 0 ][ yP][ xP ][5]
              }
          }
           else if(nnpfc_input_extra_dimension==1){
              if(nnpfc_auxiliary_inp_idc = = 1){
                inputTensors[idx][ 0 ][ yP][ xP][0] = inputTensor[ 0 ][ yP][ xP ][0]
                inputTensors[idx][ 0 ][ yP][ xP][1] = inputTensor[ 0 ][ yP][ xP ][1]
                inputTensors[idx][ 0 ][ yP][ xP][2] = inputTensor[ 0 ][ yP][ xP ][2]
                inputTensors[idx][ 0 ][ yP][ xP][3] = inputTensor[ 0 ][ yP][ xP ][3]
                inputTensors[idx][ 0 ][ yP][ xP][4] = inputTensor[ 0 ][ yP][ xP ][4]
                inputTensors[idx][ 0 ][ yP ][ xP][5] = inputTensor[ 0 ][ yP][ xP ][5]
                inputTensors[idx][ 0 ][ yP][ xP][6] = inputTensor[ 0 ][ yP][ xP ][6]
            }
              else{
                inputTensors[idx][ 0 ][ yP][ xP][0] = inputTensor[ 0 ][ yP][ xP ][0]
                inputTensors[idx][ 0 ][ yP][ xP][1] = inputTensor[ 0 ][ yP][ xP ][1]
                inputTensors[idx][ 0 ][ yP][ xP][2] = inputTensor[ 0 ][ yP][ xP ][2]
                inputTensors[idx][ 0 ][ yP][ xP][3] = inputTensor[ 0 ][ yP][ xP ][3]
                inputTensors[idx][ 0 ][ yP][ xP][4] = inputTensor[ 0 ][ yP][ xP ][4]
                inputTensors[idx][ 0 ][ yP ][ xP][5] = inputTensor[ 0 ][ yP][ xP ][5]
              }
          }
          else{
              if(nnpfc_auxiliary_inp_idc = = 1){
                inputTensors[ 0 ][idx][ yP][ xP][0] = inputTensor[ 0 ][ yP][ xP ][0]
                inputTensors[ 0 ][idx][ yP][ xP][1] = inputTensor[ 0 ][ yP][ xP ][1]
                inputTensors[ 0 ][idx][ yP ][ xP][2] = inputTensor[ 0 ][ yP][ xP ][2]
                inputTensors[ 0 ][idx][ yP][ xP][3] = inputTensor[ 0 ][ yP][ xP ][3]
                inputTensors[ 0 ][idx][ yP][ xP][4] = inputTensor[ 0 ][ yP][ xP ][4]
                inputTensors[ 0 ][idx][ yP][ xP][5] = inputTensor[ 0 ][ yP][ xP ][5]
                inputTensors[ 0 ][idx][ yP][ xP ][6] = inputTensor[ 0 ][ yP][ xP ][6]
            }
              else{
                inputTensors[ 0 ][idx][ yP][ xP][0] = inputTensor[ 0 ][ yP][ xP ][0]
                inputTensors[ 0 ][idx][ yP][ xP][1] = inputTensor[ 0 ][ yP][ xP ][1]
                inputTensors[ 0 ][idx][ yP ][ xP][2] = inputTensor[ 0 ][ yP][ xP ][2]
                inputTensors[ 0 ][idx][ yP][ xP][3] = inputTensor[ 0 ][ yP][ xP ][3]
                inputTensors[ 0 ][idx][ yP][ xP][4] = inputTensor[ 0 ][ yP][ xP ][4]
                inputTensors[ 0 ][idx][ yP][ xP][5] = inputTensor[ 0 ][ yP][ xP ][5]
            }
          }
        }
      }
    }
```

| | |
|---|---|
| 4 . . . 255 | Reserved |

TABLE 28A

| nnpfc_inp_order_idc | Process SeperateOutputTensors( ) for separating output tensors of the post-processing filter |
|---|---|
| 0 | for( yP = 0; yP < outPatchHeight; yP++){<br>for( xP = 0; xP < outPatchWidth; xP++ ) {<br>if( nnpfc_component_last_flag = = 0 )<br>outputTensor[ 0 ][ 0 ][ yP ][ xP ] = outputTensors[idx][ 0 ][ 0 ][ yP ][ xP ]<br>else<br>outputTensor[ 0 ][ yP ][ xP ][0] = outputTensors[idx][ 0 ][ yP ][ xP ][0]<br>}<br>} |
| 1 | for( yP = 0; yP < outPatchCHeight; yP++){<br>for( xP = 0; xP < outPatchCWidth; xP++ ) {<br>if( nnpfc_component_last_flag = = 0 ) {<br>outputTensor[ 0 ][ 0 ][ yP ][ xP ] = outputTensors[idx][ 0 ][ 0 ][ yP ][ xP ]<br>outputTensor[ 0 ][ 1 ][ yP ][ xP ] = outputTensors[idx][ 0 ][ 1 ][ yP ][ xP ]<br>}<br>else {<br>outputTensor[ 0 ][ yP ][ xP ][0] = outputTensors[idx][ 0 ][ yP ][ xP ][0]<br>outputTensor[ 0 ][ yP ][ xP ][1] = outputTensors[idx][ 0 ][ yP ][ xP ][1]<br>}<br>}<br>} |
| 2 | for( yP = 0; yP < outPatchHeight; yP++){<br>for( xP = 0; xP < outPatchWidth; xP++ ) {<br>if( nnpfc_component_last_flag = = 0 ) {<br>outputTensor[0][0][ yP ][ xP ] = outputTensors[idx][ 0 ][ 0][ yP ][xP]<br>outputTensor[0][1][ yP ][ xP ] = outputTensors[idx][ 0 ][1][ yP ][xP]<br>outputTensor[0][2][ yP ][ xP ] = outputTensors[idx][ 0 ][2][ yP ][xP]<br>}<br>else {<br>outputTensor[ 0 ][ yP ][ xP ][0] = outputTensors[idx][ 0 ][ yP ][ xP ][0]<br>outputTensor[ 0 ][ yP ][ xP ][1]= outputTensors[idx][ 0 ][ yP ][ xP ][1]<br>outputTensor[ 0 ][ yP ][ xP ][2]= outputTensors[idx][ 0 ][ yP ][ xP ][2]<br>}<br>}<br>} |
| 3 | for( yP = 0; yP < outPatchHeight; yP++ ){<br>for( xP = 0; xP < outPatchWidth; xP++ ) {<br>if( nnpfc_component_last_flag = = 0 ) {<br>outputTensor[ 0 ][ 0 ][ yP ][ xP ] = outputTensors[idx][ 0 ][ 0 ][ yP ][ xP ]<br>outputTensor[ 0 ][ 1 ][ yP ][ xP ] = outputTensors[idx][ 0 ][ 1 ][ yP ][ xP ]<br>outputTensor[ 0 ][ 2 ][ yP ][ xP ]= outputTensors[idx][ 0 ][ 2 ][ yP ][ xP ]<br>outputTensor[ 0 ][ 3 ][ yP ][ xP ]= outputTensors[idx][ 0 ][ 3 ][ yP ][ xP ]<br>outputTensor[ 0 ][ 4 ][ yP ][ xP ]= outputTensors[idx][ 0 ][ 4 ][ yP ][ xP ]<br>outputTensor[ 0 ][ 5 ][ yP ][ xP ] = outputTensors[idx][ 0 ][ 5 ][ yP ][ xP ]<br>}<br>else {<br>outputTensor[ 0 ][ yP ][ xP ][0] = outputTensors[idx][ 0 ][ yP ][ xP ][0]<br>outputTensor[ 0 ][ yP ][ xP ][1]= outputTensors[idx][ 0 ][ yP ][ xP ][1]<br>outputTensor[ 0 ][ yP ][ xP ][2]= outputTensors[idx][ 0 ][ yP ][ xP ][2]<br>outputTensor[ 0 ][ yP ][ xP ][3]= outputTensors[idx][ 0 ][ yP ][ xP ][3]<br>outputTensor[ 0 ][ yP ][ xP ][4]= outputTensors[idx][ 0 ][ yP ][ xP ][4]<br>outputTensor[ 0 ][ yP ][ xP ][5]= outputTensors[idx][ 0 ][ yP ][ xP ][5]<br>}<br>}<br>} |
| 4 . . . 255 | Reserved |

TABLE 28B

| nnpfc_inp_order_idc | Process SeperateOutputTensors( ) for separating output tensors of the post-processing filter |
|---|---|
| 0 | for( yP = 0; yP < outPatchHeight; yP++){<br>for( xP = 0; xP < outPatchWidth; xP++ ) {<br>if( nnpfc_component_last_flag = = 0 ){<br>if(nnpfc_output_extra_dimension==0)<br>outputTensor[ 0 ][ 0 ][ yP ][ xP ] = outputTensors[ 0 ][ idx][ yP ][ xP ]<br>else if(nnpfc_output_extra_dimension==1)<br>outputTensor[ 0 ][ 0 ][ yP ][ xP ] = outputTensors[idx][ 0 ][ 0 ][ yP ][ xP ]<br>else if(nnpfc_output_extra_dimension==2)<br>outputTensor[ 0 ][ 0 ][ yP ][ xP ] = outputTensors[ 0 ][idx][ 0 ][ yP ][ xP ]<br>else<br>outputTensor[ 0 ][ 0 ][ yP ][ xP ] = outputTensors[ 0 ][ 0 ][idx][ yP ][ xP ]<br>}<br>else<br>if(nnpfc_output_extra_dimension==0)<br>outputTensor[ 0 ][ yP ][ xP ][0] = outputTensors[ 0 ][ yP ][ xP ][idx] |

TABLE 28B-continued

| nnpfc_inp_order_idc | Process SeperateOutputTensors( ) for separating output tensors of the post-processing filter |
|---|---|
| | else if(nnpfc_output_extra_dimension==1)<br>outputTensor[ 0 ][ yP ][ xP ][0] = outputTensors[idx][ 0 ][ yP ][ xP ][0]<br>else<br>outputTensor[ 0 ][ yP ][ xP ][0] = outputTensors[ 0 ][idx][ yP ][ xP ][0]<br>}<br>}<br>} |
| 1 | for( yP = 0; yP < outPatchCHeight; yP++){<br>for( xP = 0; xP < outPatchCWidth; xP++ ) {<br>if( nnpfc_component_last_flag = = 0 ){<br>if(nnpfc_output_extra_dimension==0){<br>outputTensor[ 0 ][ 0 ][ yP ][ xP ] = outputTensors[ 0 ][ idx*2][ yP ][ xP ]<br>outputTensor[ 0 ][ 1 ][ yP ][ xP ] = outputTensors[ 0 ][ idx*2+1][ yP ][ xP ]<br>}<br>else if(nnpfc_output_extra_dimension==1){<br>outputTensor[ 0 ][ 0 ][ yP ][ xP ] = outputTensors[idx][ 0 ][ 0 ][ yP ][ xP ]<br>outputTensor[ 0 ][ 1 ][ yP ][ xP ] = outputTensors[idx][ 0 ][ 1 ][ yP ][ xP ]<br>}<br>else if(nnpfc_output_extra_dimension==2){<br>outputTensor[ 0 ][ 0 ][ yP ][ xP ] = outputTensors[ 0 ][idx][ 0 ][ yP ][ xP ]<br>outputTensor[ 0 ][ 1 ][ yP ][ xP ] = outputTensors[ 0 ][idx][ 1 ][ yP ][ xP ]<br>}<br>else{<br>outputTensor[ 0 ][ 0 ][ yP ][ xP ] = outputTensors[ 0 ][ 0 ][idx][ yP ][ xP ]<br>outputTensor[ 0 ][ 1 ][ yP ][ xP ] = outputTensors[ 0 ][ 1 ][idx][ yP ][ xP ]<br>}<br>}<br>else{<br>if(nnpfc_output_extra_dimension==0){<br>outputTensor[ 0 ][ yP ][ xP ][0] = outputTensors[ 0 ][ yP ][ xP ][idx*2]<br>outputTensor[ 0 ][ yP ][ xP ][1] = outputTensors[ 0 ][ yP ][ xP ][idx*2+1]<br>}<br>else if(nnpfc_output_extra_dimension==1){<br>outputTensor[ 0 ][ yP ][ xP ][0] = outputTensors[idx][ 0 ][ yP ][ xP ][0]<br>outputTensor[ 0 ][ yP ][ xP ][1] = outputTensors[idx][ 0 ][ yP ][ xP ][1]<br>}<br>else{<br>outputTensor[ 0 ][ yP ][ xP ][0] = outputTensors[ 0 ][idx][ yP ][ xP ][0]<br>outputTensor[ 0 ][ yP ][ xP ][1] = outputTensors[ 0 ][idx][ yP ][ xP ][1]<br>}<br>}<br>}<br>} |
| 2 | for( yP = 0; yP < outPatchCHeight; yP++){<br>for( xP = 0; xP < outPatchCWidth; xP++ ) {<br>if( nnpfc_component_last_flag = = 0 ){<br>if(nnpfc_output_extra_dimension==0){<br>outputTensor[ 0 ][ 0 ][ yP ][ xP ] = outputTensors[ 0 ][ idx*3][ yP ][ xP ]<br>outputTensor[ 0 ][ 1 ][ yP ][ xP ] = outputTensors[ 0 ][ idx*3+1][ yP ][ xP ]<br>outputTensor[ 0 ][ 2 ][ yP ][ xP ] = outputTensors[ 0 ][ idx*3+2][ yP ][ xP ]<br>}<br>else if(nnpfc_output_extra_dimension==1){<br>outputTensor[ 0 ][ 0 ][ yP ][ xP ] = outputTensors[idx][ 0 ][ 0 ][ yP ][ xP ]<br>outputTensor[ 0 ][ 1 ][ yP ][ xP ] = outputTensors[idx][ 0 ][ 1 ][ yP ][ xP ]<br>outputTensor[ 0 ][ 2 ][ yP ][ xP ] = outputTensors[idx][ 0 ][ 2 ][ yP ][ xP ]<br>}<br>else if(nnpfc_output_extra_dimension==2){<br>outputTensor[ 0 ][ 0 ][ yP ][ xP ] = outputTensors[ 0 ][idx][ 0 ][ yP ][ xP ]<br>outputTensor[ 0 ][ 1 ][ yP ][ xP ] = outputTensors[ 0 ][idx][ 1 ][ yP ][ xP ]<br>outputTensor[ 0 ][ 2 ][ yP ][ xP ] = outputTensors[ 0 ][idx][ 2 ][ yP ][ xP ]<br>}<br>else{<br>outputTensor[ 0 ][ 0 ][ yP ][ xP ] = outputTensors[ 0 ][ 0 ][idx][ yP ][ xP ]<br>outputTensor[ 0 ][ 1 ][ yP ][ xP ] = outputTensors[ 0 ][ 1 ][idx][ yP ][ xP ]<br>outputTensor[ 0 ][ 2 ][ yP ][ xP ] = outputTensors[ 0 ][ 2 ][idx][ yP ][ xP ]<br>}<br>}<br>else{<br>if(nnpfc_output_extra_dimension==0){<br>outputTensor[ 0 ][ yP ][ xP ][0] = outputTensors[ 0 ][ yP ][ xP ][idx*3]<br>outputTensor[ 0 ][ yP ][ xP ][1] = outputTensors[ 0 ][ yP ][ xP ][idx*3+1]<br>outputTensor[ 0 ][ yP ][ xP ][2] = outputTensors[ 0 ][ yP ][ xP ][idx*3+2]<br>}<br>else if(nnpfc_output_extra_dimension==1){<br>outputTensor[ 0 ][ yP ][ xP ][0] = outputTensors[idx][ 0 ][ yP ][ xP ][0]<br>outputTensor[ 0 ][ yP ][ xP ][1] = outputTensors[idx][ 0 ][ yP ][ xP ][1]<br>outputTensor[ 0 ][ yP ][ xP ][2] = outputTensors[idx][ 0 ][ yP ][ xP ][2]<br>} |

TABLE 28B-continued

| nnpfc_inp_order_idc | Process SeperateOutputTensors( ) for separating output tensors of the post-processing filter |
|---|---|

```
                    else{
                      outputTensor[ 0 ][ yP ][ xP ][0] = outputTensors[ 0 ][idx][ yP ][ xP ][0]
                      outputTensor[ 0 ][ yP ][ xP ][1] = outputTensors[ 0 ][idx][ yP ][ xP ][1]
                      outputTensor[ 0 ][ yP ][ xP ][2] = outputTensors[ 0 ][idx][ yP ][ xP ][2]
                    }
                  }
                }
              }
3             for( yP = 0; yP < outPatchCHeight; yP++){
                for( xP = 0; xP < outPatchCWidth; xP++ ) {
                  if( nnpfc_component_last_flag = = 0 ){
                    if(nnpfc_output_extra_dimension==0){
                      outputTensor[ 0 ][ 0 ][ yP ][ xP ] = outputTensors[ 0 ][ idx*6][ yP ][ xP ]
                      outputTensor[ 0 ][ 1 ][ yP ][ xP ] = outputTensors[ 0 ][ idx*6+1][ yP ][ xP ]
                      outputTensor[ 0 ][ 2 ][ yP ][ xP ] = outputTensors[ 0 ][ idx*6+2][ yP ][ xP ]
                      outputTensor[ 0 ][ 3 ][ yP ][ xP ] = outputTensors[ 0 ][ idx*6+3][ yP ][ xP ]
                      outputTensor[ 0 ][ 4 ][ yP ][ xP ] = outputTensors[ 0 ][ idx*6+4][ yP ][ xP ]
                      outputTensor[ 0 ][ 5 ][ yP ][ xP ] = outputTensors[ 0 ][ idx*6+5][ yP ][ xP ]
                    }
                    else if(nnpfc_output_extra_dimension==1){
                      outputTensor[ 0 ][ 0 ][ yP ][ xP ] = outputTensors[idx][ 0 ][ 0 ][ yP ][ xP ]
                      outputTensor[ 0 ][ 1 ][ yP ][ xP ] = outputTensors[idx][ 0 ][ 1 ][ yP ][ xP ]
                      outputTensor[ 0 ][ 2 ][ yP ][ xP ] = outputTensors[idx][ 0 ][ 2 ][ yP ][ xP ]
                      outputTensor[ 0 ][ 3 ][ yP ][ xP ] = outputTensors[idx][ 0 ][ 3 ][ yP ][ xP ]
                      outputTensor[ 0 ][ 4 ][ yP ][ xP ] = outputTensors[idx][ 0 ][ 4 ][ yP ][ xP ]
                      outputTensor[ 0 ][ 5 ][ yP ][ xP ] = outputTensors[idx][ 0 ][ 5 ][ yP ][ xP ]
                    }
                    else if(nnpfc_output_extra_dimension==2){
                      outputTensor[ 0 ][ 0 ][ yP ][ xP ] = outputTensors[ 0 ][idx][ 0 ][ yP ][ xP ]
                      outputTensor[ 0 ][ 1 ][ yP ][ xP ] = outputTensors[ 0 ][idx][ 1 ][ yP ][ xP ]
                      outputTensor[ 0 ][ 2 ][ yP ][ xP ] = outputTensors[ 0 ][idx][ 2 ][ yP ][ xP ]
                      outputTensor[ 0 ][ 3 ][ yP ][ xP ] = outputTensors[ 0 ][idx][ 3 ][ yP ][ xP ]
                      outputTensor[ 0 ][ 4 ][ yP ][ xP ] = outputTensors[ 0 ][idx][ 4 ][ yP ][ xP ]
                      outputTensor[ 0 ][ 5 ][ yP ][ xP ] = outputTensors[ 0 ][idx][ 5 ][ yP ][ xP ]
                    }
                    else{
                      outputTensor[ 0 ][ 0 ][ yP ][ xP ] = outputTensors[ 0 ][ 0 ][idx][ yP ][ xP ]
                      outputTensor[ 0 ][ 1 ][ yP ][ xP ] = outputTensors[ 0 ][ 1 ][idx][ yP ][ xP ]
                      outputTensor[ 0 ][ 2 ][ yP ][ xP ] = outputTensors[ 0 ][ 2 ][idx][ yP ][ xP ]
                      outputTensor[ 0 ][ 3 ][ yP ][ xP ] = outputTensors[ 0 ][ 3 ][idx][ yP ][ xP ]
                      outputTensor[ 0 ][ 4 ][ yP ][ xP ] = outputTensors[ 0 ][ 4 ][idx][ yP ][ xP ]
                      outputTensor[ 0 ][ 5 ][ yP ][ xP ] = outputTensors[ 0 ][ 5 ][idx][ yP ][ xP ]
                    }
                  }
                  else{
                    if(nnpfc_output_extra_dimension==0){
                      outputTensor[ 0 ][ yP ][ xP ][0] = outputTensors[ 0 ][ yP ][ xP ][idx*6]
                      outputTensor[ 0 ][ yP ][ xP ][1] = outputTensors[ 0 ][ yP ][ xP ][idx*6+1]
                      outputTensor[ 0 ][ yP ][ xP ][2] = outputTensors[ 0 ][ yP ][ xP ][idx*6+2]
                      outputTensor[ 0 ][ yP ][ xP ][3] = outputTensors[ 0 ][ yP ][ xP ][idx*6+3]
                      outputTensor[ 0 ][ yP ][ xP ][4] = outputTensors[ 0 ][ yP ][ xP ][idx*6+4]
                      outputTensor[ 0 ][ yP ][ xP ][5] = outputTensors[ 0 ][ yP ][ xP ][idx*6+5]
                    }
                    else if(nnpfc_output_extra_dimension==1){
                      outputTensor[ 0 ][ yP ][ xP ][0] = outputTensors[idx][ 0 ][ yP ][ xP ][0]
                      outputTensor[ 0 ][ yP ][ xP ][1] = outputTensors[idx][ 0 ][ yP ][ xP ][1]
                      outputTensor[ 0 ][ yP ][ xP ][2] = outputTensors[idx][ 0 ][ yP ][ xP ][2]
                      outputTensor[ 0 ][ yP ][ xP ][3] = outputTensors[idx][ 0 ][ yP ][ xP ][3]
                      outputTensor[ 0 ][ yP ][ xP ][4] = outputTensors[idx][ 0 ][ yP ][ xP ][4]
                      outputTensor[ 0 ][ yP ][ xP ][5] = outputTensors[idx][ 0 ][ yP ][ xP ][5]
                    }
                    else{
                      outputTensor[ 0 ][ yP ][ xP ][0] = outputTensors[ 0 ][idx][ yP ][ xP ][0]
                      outputTensor[ 0 ][ yP ][ xP ][1] = outputTensors[ 0 ][idx][ yP ][ xP ][1]
                      outputTensor[ 0 ][ yP ][ xP ][2] = outputTensors[ 0 ][idx][ yP ][ xP ][2]
                      outputTensor[ 0 ][ yP ][ xP ][3] = outputTensors[ 0 ][idx][ yP ][ xP ][3]
                      outputTensor[ 0 ][ yP ][ xP ][4] = outputTensors[ 0 ][idx][ yP ][ xP ][4]
                      outputTensor[ 0 ][ yP ][ xP ][5] = outputTensors[ 0 ][idx][ yP ][ xP ][5]
                    }
                  }
                }
              }
4 . . . 255   Reserved
```

According to techniques herein, in some examples, In this manner, video encoder 500 represents an example of a device configured to signal a neural network post-filter characteristics message, signal a first syntax element in the neural network post-filter characteristics specifying a number of input pictures to be used as input for a neural network post-filter picture interpolation process, and signal a second syntax element in the neural network post-filter characteristics message having a value specifying a manner in which input pictures are concatenated before being input into the neural network post-filter picture interpolation process.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
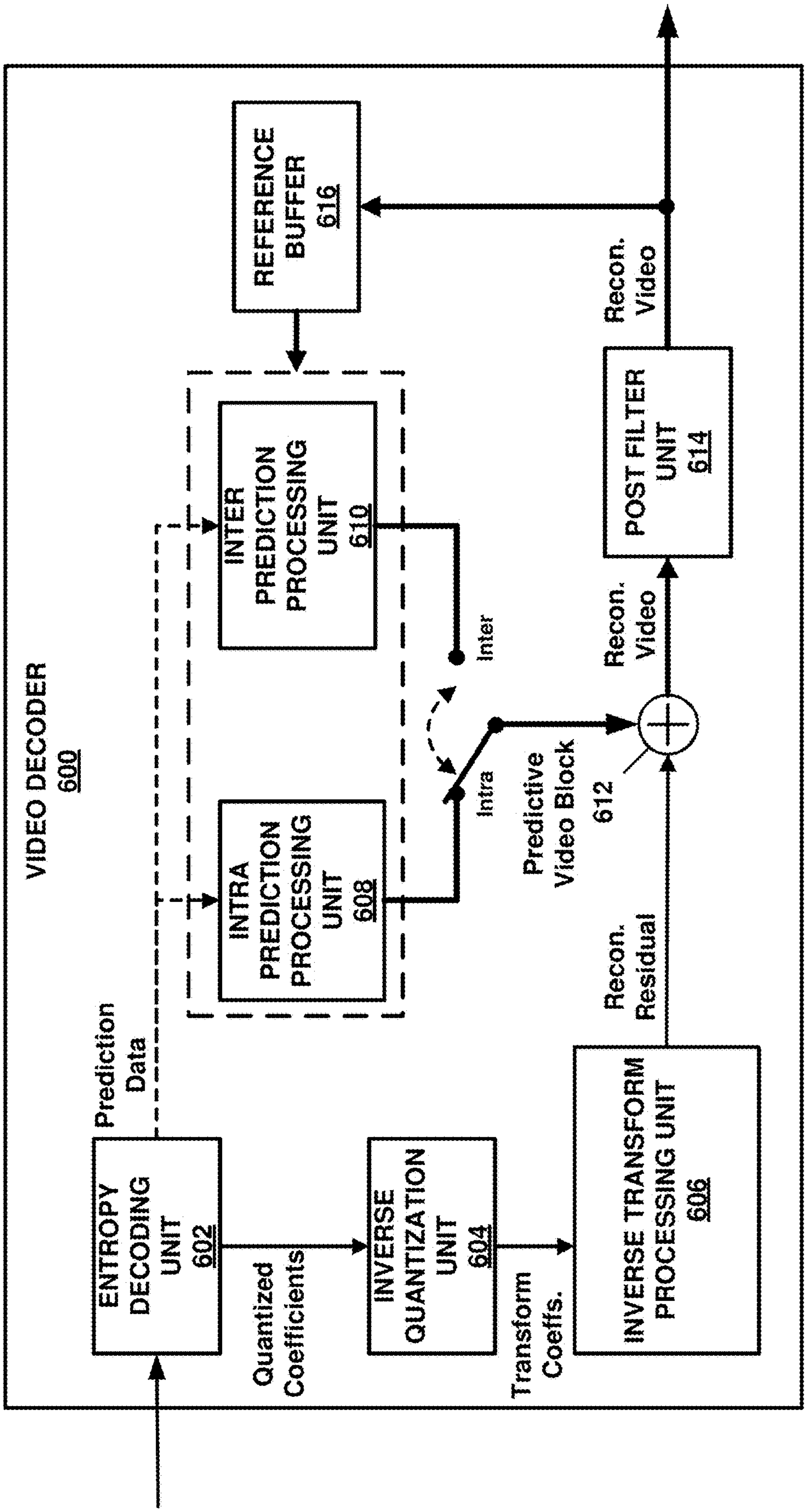
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-28B. Video decoder 600 may decode video based on or according to the processes described above, and further based on parsed values in Tables 1-28B.

In the example illustrated in FIG. 6, video decoder 600 includes an entropy decoding unit 602, inverse quantization unit 604, inverse transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example illustrated in FIG. 6, inverse quantization unit 604 and inverse transform coefficient processing unit 606 receive quantized coefficient values from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to receive a neural network post-filter characteristics message, parse a first syntax element from the neural network post-filter characteristics specifying a number of input pictures to be used as input for a neural network post-filter picture interpolation process, parse a second syntax element from the neural network post-filter characteristics message having a value specifying a manner in which input pictures are concatenated before being input into the neural network post-filter picture interpolation process, and concatenate input pictures based on the value of the second syntax element.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of performing neural network filtering for video data, the method comprising:

receiving a neural network post-filter characteristics message;

parsing a first syntax element in the neural network post-filter characteristics message, wherein the first syntax element plus 1 specifies a number of input pictures used as input for a neural network post-filter;

parsing a second syntax element in the neural network post-filter characteristics message, wherein the second syntax element is used to calculate a number of output pictures;

deriving an input tensor of dimensions, wherein one dimension of the input tensor of dimensions corresponds to the number of input pictures; and generating an output tensor of dimensions, wherein a first dimension of the output tensor of dimensions corresponds to the number of output pictures.

2. A device comprising one or more processors configured to:

receive a neural network post-filter characteristics message;

parse a first syntax element in the neural network post-filter characteristics message, wherein the first syntax element plus 1 specifies a number of input pictures used as input for a neural network post-filter;

parse a second syntax element in the neural network post-filter characteristics message, wherein the second syntax element is used to calculate a number of output pictures;

derive an input tensor of dimensions wherein one dimension of the input tensor of dimensions corresponds to the number of input pictures; and generate an output tensor of dimensions wherein a first dimension of the output tensor of dimensions corresponds to the number of output pictures.

3. The device of claim 2, wherein the device comprises a video decoder.

* * * * *